United States Patent [19]
Kumar et al.

[11] Patent Number: 5,970,069
[45] Date of Patent: Oct. 19, 1999

[54] SINGLE CHIP REMOTE ACCESS PROCESSOR

[75] Inventors: Shailendra Kumar, San Jose, Calif.; Christopher D. Sonnek, North St. Paul, Minn.

[73] Assignee: LSI Logic Corporation, Milpitas, Calif.

[21] Appl. No.: 08/840,575

[22] Filed: Apr. 21, 1997

[51] Int. Cl.[6] .................................. H04L 12/28; H04J 3/16
[52] U.S. Cl. .......................... 370/402; 370/401; 370/466
[58] Field of Search ..................................... 370/351, 355, 370/357, 360, 389, 401, 402, 465, 466, 463, 467

[56] References Cited

U.S. PATENT DOCUMENTS 5,610,910  3/1997  Focsaneanu ........................ 370/401
5,640,399  6/1997  Rostoker .............................. 370/402

*Primary Examiner*—Ajit Patel
*Assistant Examiner*—Ricardo M. Pizarro
*Attorney, Agent, or Firm*—Westman, Champlin & Kelly, P.A.

[57] ABSTRACT

A single chip integrated remote access processor circuit has a plurality of communication interface units, including a local area network (LAN) interface unit, a first multi-protocol serial wide area network (SWAN) interface unit, a telephony coder-decoder interface unit and a peripheral component interface (PCI) unit. A data routing control circuit is coupled to the plurality of communication interface units for controlling data transfer between the interface units.

18 Claims, 83 Drawing Sheets

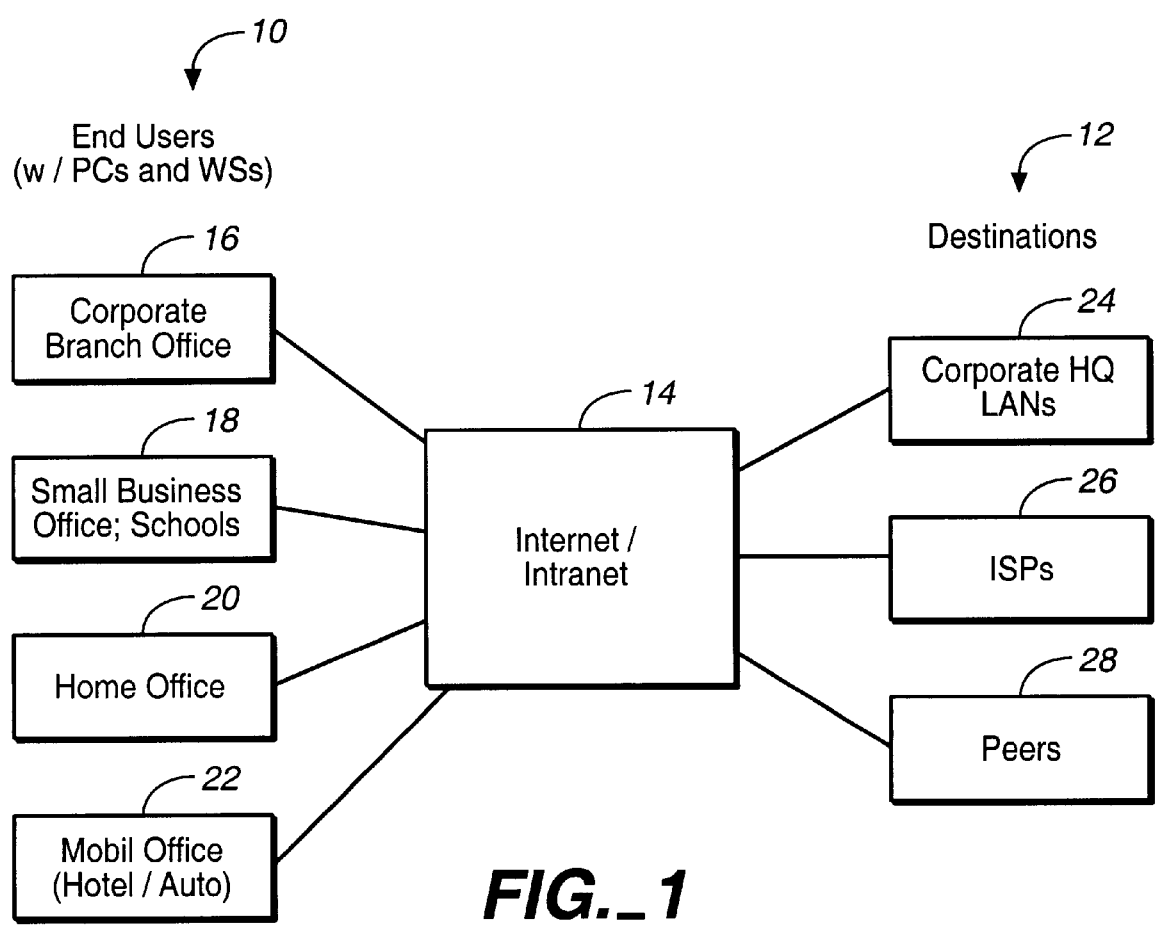
FIG._1

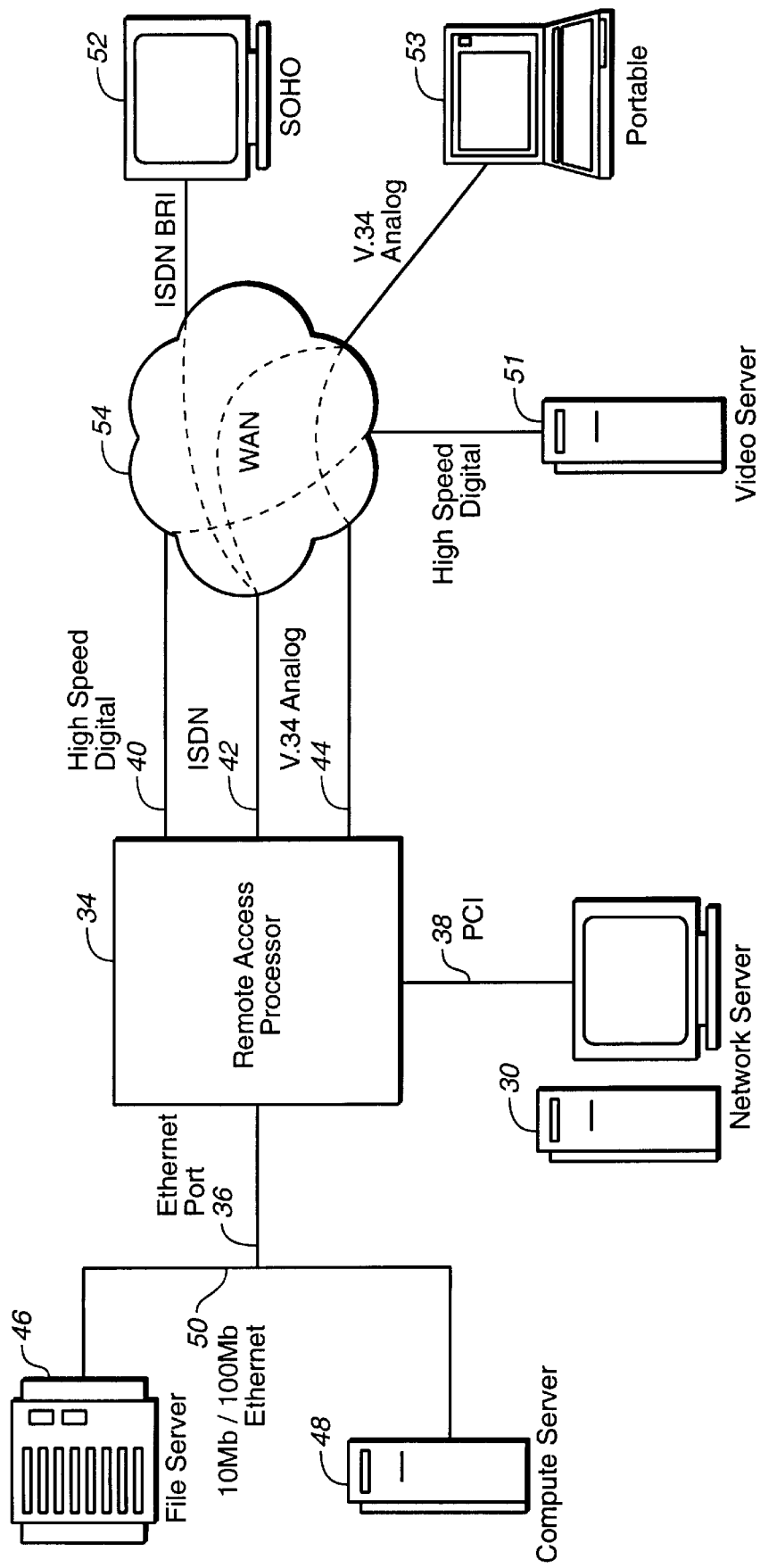
FIG._2a

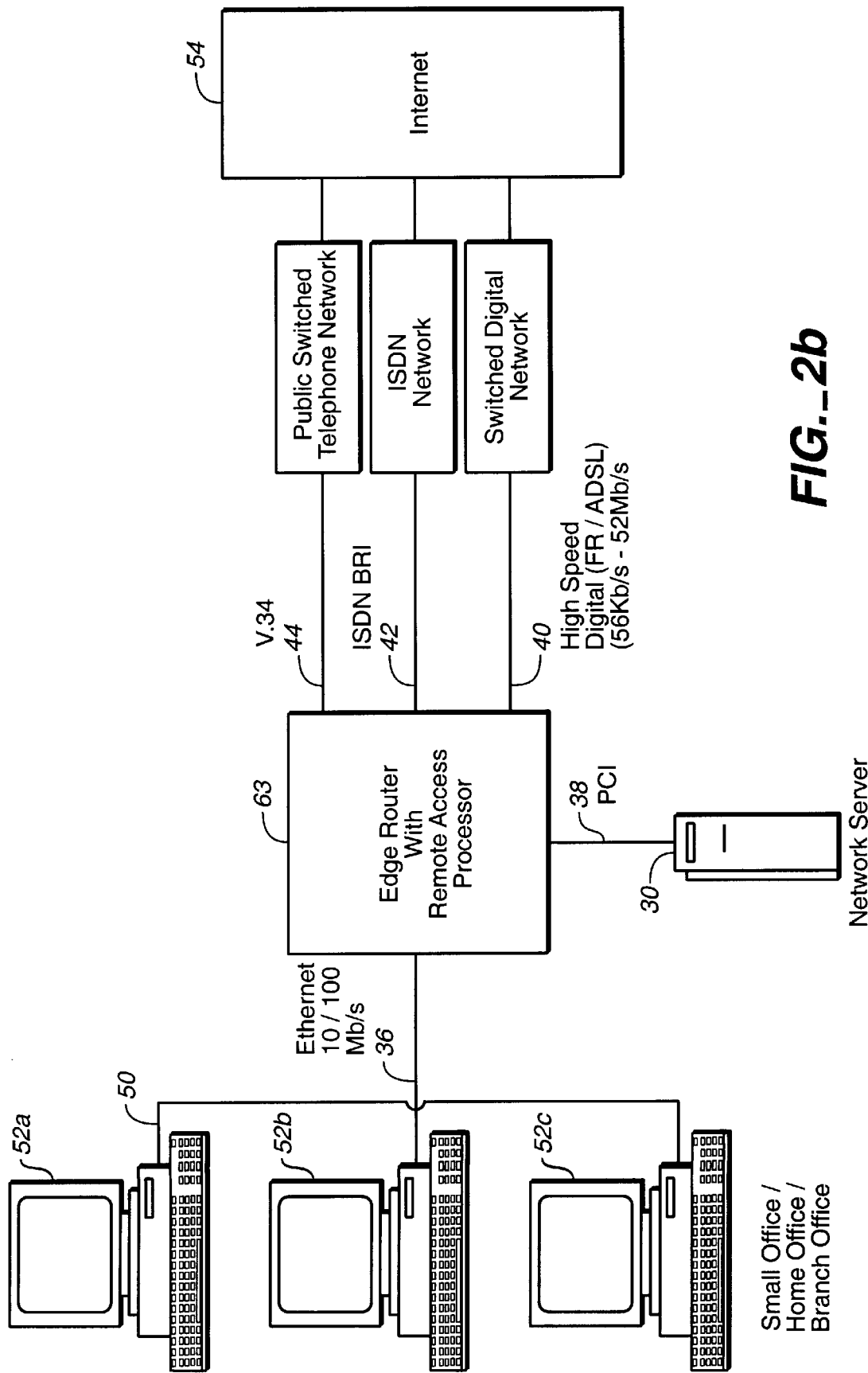
FIG._2b

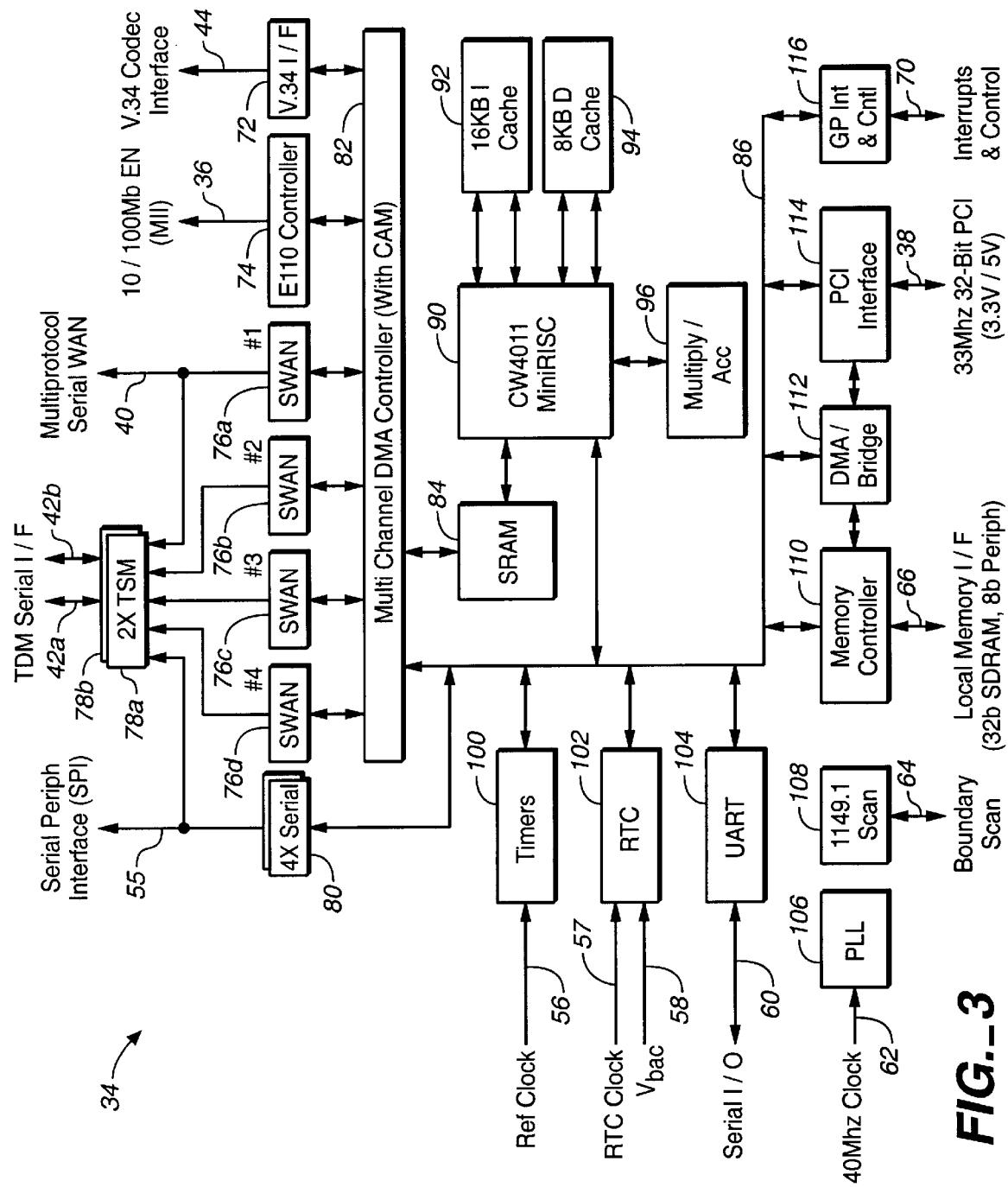
FIG._3

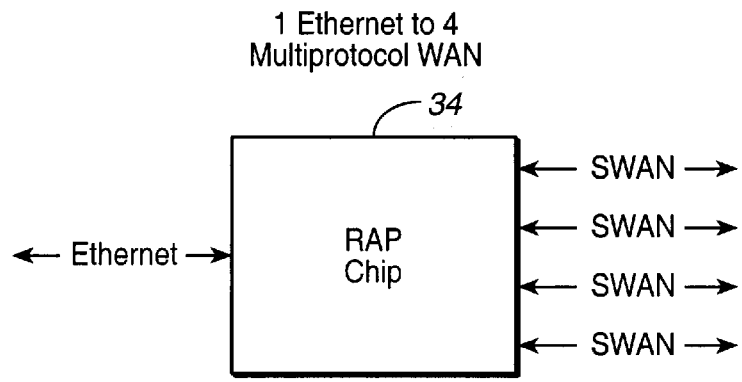
FIG._4a
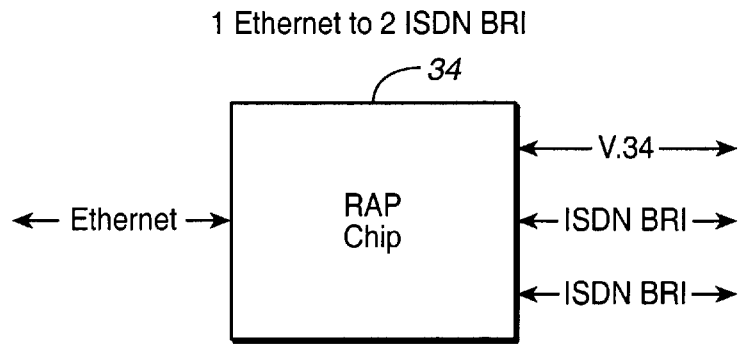
FIG._4b
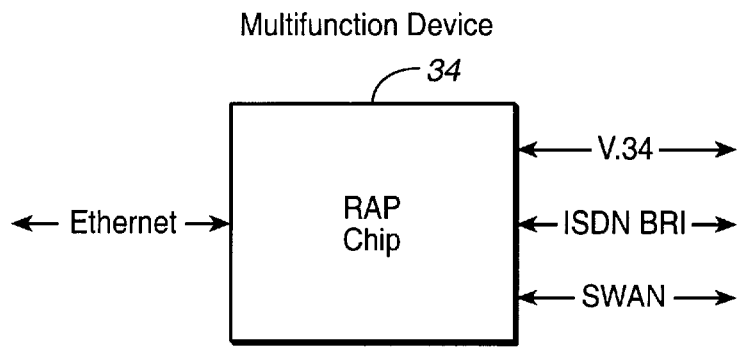
FIG._4c

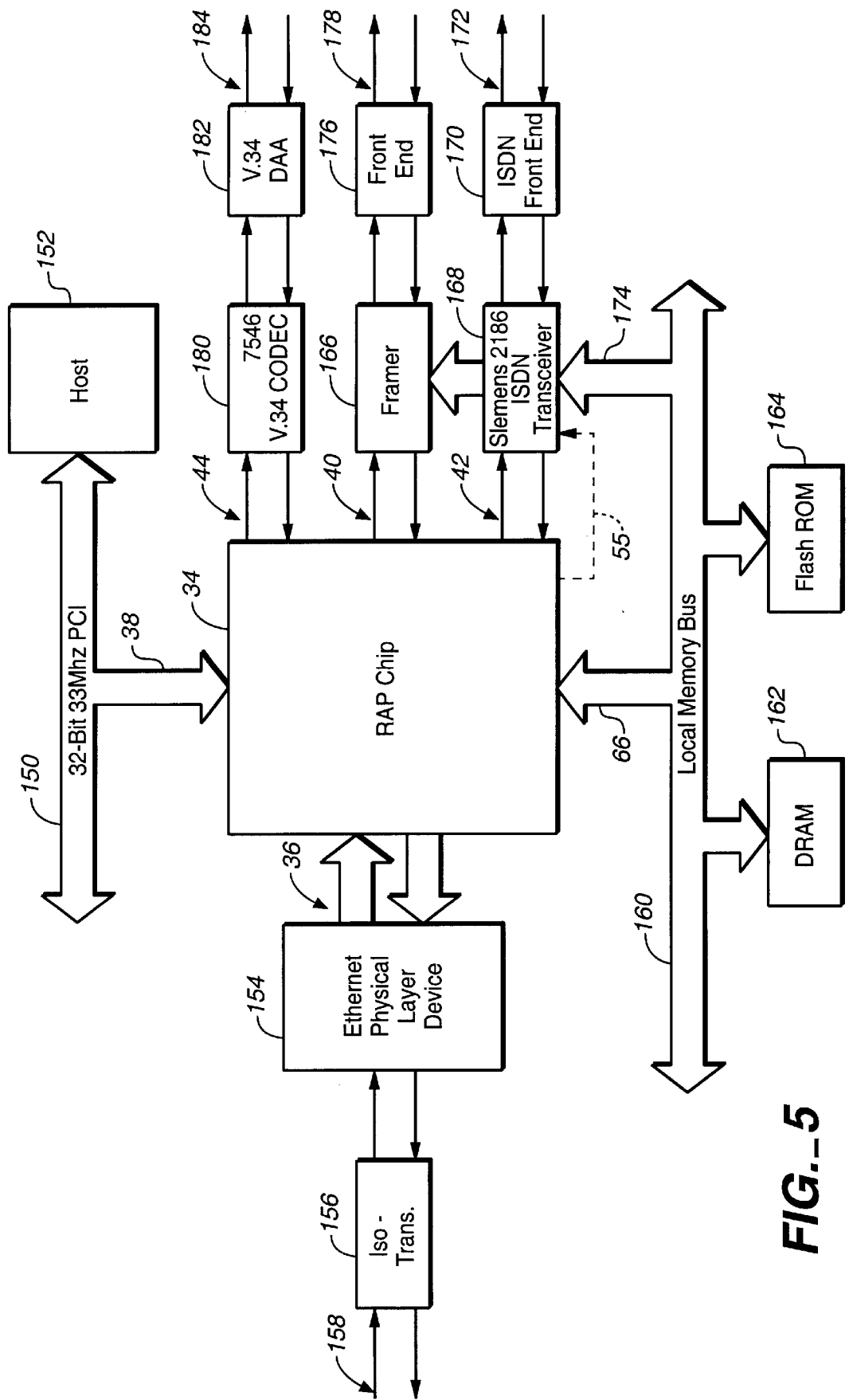
FIG._5

| Signal Name | Type | Number | Description |
|---|---|---|---|
| PCI Interface (52) | | | |
| PCI_CLK | I | 1 | 33Mhz PCI Clock |
| PCI_RSTn | I | 1 | PCI Reset |
| PCI_AD[31:0] | I/O | 32 | PCI Address and Data Bus |
| PCI_CBEn[3:0] | I/O | 4 | PCI Bus Commands and Data Byte Enables |
| PCI_PAR | I/O | 1 | PCI-PAR |
| PCI_FRAMEn | I/O | 1 | PCI Cycle Frame |
| PCI_IRDYn | I/O | 1 | PCI Initiator Ready |
| PCI_TRDYn | I/O | 1 | PCI Target Ready |
| PCI_STOPn | I/O | 1 | PCI Stop |
| PCI_IDSEL | I | 1 | PCI Initialization Device Select |
| PCI_DEVSELn | I | 1 | PCI Device Select |
| PCI_REQn[0] | I/O | 1 | PCI Request-0 |
| PCI_REQn[1] | I | 1 | PCI Request-1 |
| PCI_GNTn[0] | I/O | 1 | PCI Grant-0 |
| PCI_GNTn[1] | O | 1 | PCI Grant-1 |
| PCI_PERRn | I/O | 1 | PCI Parity Error |
| PCI_SERRn | OD | 1 | PCI System Error |
| PCI_INTn | I/O | 1 | PCI Interrupt |
| Local Memory Bus (56) | | | |
| LB_D[31:0] | I/O | 32 | Local Data Bus |
| LB_A[11:0] | O | 12 | Local Bus Address |
| LB_DQMn[3:0] | O | 4 | Local Bus Byte Control Enables |
| LB_CASn | O | 1 | Local Bus CAS |
| LB_RASn | O | 1 | Local Bus RAS |
| LB_WEn | O | 1 | Local Bus WE |
| LB_CLKEn | O | 1 | Local Bus Clock Enable |

*FIG._6a*

| Signal Name | Type | Number | Description |
|---|---|---|---|
| LB_CLKO | O | 1 | Local Bus Clock |
| LB_PCSn[2:0] | O | 3 | Local Bus Page Chip Selects |
| Clock and Utility Signals (14) | | | |
| SYS_CLK_PCI | I | 1 | PCI Clock Select |
| SYS_CLK | I | 1 | System Clock |
| SYS_PLL | I | 1 | PLL Select |
| PLL_IDDQn | I | 1 | PLL Test |
| PLI_LP2 | I | 1 | PLL Loop Filter Input |
| TM_CLK | I | 1 | Timer Reference Clock |
| RTC_CLK | I | 2 | Real Time Clock Reference Clock |
| SBRG_CLK | I | 1 | Serial WAN and SPI Baud Rate Generator Reference Clock |
| UBRG_CLK | I | 1 | UART Baud Rate Generator Reference Clock |
| SYS_OE | I | 1 | System Output Enable |
| SYS_NMIn | I | 1 | System Non-Maskable Interrupt |
| SYS_BOOT | I | 1 | System Boot Source |
| SYS_PSTALLn | O | 1 | System Pipeline Stalled |
| UART Interface (7) | | | |
| U_DTRn | O | 1 | UART Data Terminal Ready |
| U_RTSn | O | 1 | UART Request To Send |
| U_SDOUT | O | 1 | UART Serial Data Output |
| U_DCDn | I | 1 | UART Data Carrier Detect |
| U_DSRn | I | 1 | UART Data Set Ready |
| U_CTSn | I | 1 | UART Clear To Send |
| U_SDIN | I | 1 | UART Serial Data Input |
| Serial WAN Controller Port 1 (10) | | | |
| S1_DTRn | O | 1 | Serial #1 Data Terminal Ready |
| S1_RTSn / TDM1_REQ | O | 1 | Serial #1 Request To Send, TDM highway #1 D channel request |
| S1_TXD / TDM1_TXD | O | 1 | Serial #1 Transmit Data Output, TDM highway #1 transmit data |
| S1_TXCI / TDM1_TCLK | O | 1 | Serial #1 Transmit Clock Input, TDM highway #1 transmit clock |

FIG._6b

| Signal Name | Type | Number | Description |
|---|---|---|---|
| S1_DCDn / TDM1_RSYNC | I | 1 | Serial #1 Data Carrier Detect, TDM highway #1 receive frame sync pulse |
| S1_DSRn / TDM1_TSYNC | I | 1 | Serial #1 Data Set Ready, TDM highway #1 transmit frame sync pulse |
| S1_CTSn / TDM1_TGNR | I | 1 | Serial #1 Clear To Send, TDM highway #1 D channel grant |
| S1_RXC / TDM1_RCLK | I | 1 | Serial #1 Receive Clock, TDM highway #1 receive clock |
| S1_RXD / TDM1_RXD | I | 1 | Serial #1 Receive Data Input, TDM highway #1 receive data |
| S2_TXCI / TDM2_TCLK | I | 1 | Serial #1 Transmit Clock Input, TDM highway #1 transmit clock |
| Serial WAN Controller Port 2 / TSM & SPI Output Interface (10) | | | |
| S2_DTRn / SPI_SOUT | O | 1 | Serial #2 Data Terminal Ready / SPI Serial Output Data |
| S2_RTSn / TDM2_REQ | O | 1 | Serial #2 Request To Send, TDM highway #2 D channel request |
| S2_TXD / TDM2_TXD | O | 1 | Serial #2 Transmit Data Output, TDM highway #2 transmit data |
| S2_TXCO / SPI_CLK | O | 1 | Serial #2 Transmit Clock Ouput, Serial Peripheral Interface Clock |
| S2_TXCI / TDM2_TCLK | I | 1 | Serial #2 Transmit Clock Input, TDM highway #2 transmit clock |
| S2_DCDn / TDM2_RSYNC | I | 1 | Serial #2 Data Carrier Detect, TDM highway #2 receive frame sync pulse |
| S2_DSRn / TDM2_TSYNC | I | 1 | Serial #2 Data Set Ready, TDM highway #2 transmit frame sync pulse |
| S2_CTSn / TDM2_TGNR | I | 1 | Serial #2 Clear To Send, TDM highway #2 D channel grant |
| S2_RXC / TDM2_RCLK | I | 1 | Serial #2 Receive Clock, TDM highway #2 receive clock |
| S2_RXD TDM2_RXD | I | 1 | Serial #2 Receive Data Input, TDM highway #2 receive data |
| Serial WAN Controller Port 3 / V.34 Codec & SPI Input Interface (18) | | | |
| S3_DTRn / VCFS | O | 1 | Serial #3 Data Terminal Ready, V.34 VC Frame Sync |
| S3_RTSn / VCDO | O | 1 | Serial #3 Request To Send, V.34 VC Data Out |

FIG._6c

| Signal Name | Type | Number | Description |
|---|---|---|---|
| S3-TXD, LCDO | O | 1 | Serial #3 Transmit Data Output, V.34LC Data Out |
| S3_TXCO / VCCLK | O | 1 | Serial #3 Transmit Clock Output, V.34 VC Clock |
| S3_TXCI / LCCLK | I | 1 | Serial #3 Transmit Clock Input, V.34 LC Clock |
| S3_DCDn / LCFS | I | 1 | Serial #3 Data Carrier Detect, V.34 LC Frame Sync |
| S3_DSRn / VCDI | I | 1 | Serial #3 Data Set Ready, VC Data Input |
| S3_CTSn / SPI_SIN | I | 1 | Serial #3 Clear To Send, SPI Input Data |
| S3_RXC | I | 1 | Serial #3 Receive Clock |
| S3_RXD / LCDI | I | 1 | Serial #3 Receive Data Input, V.34 LC Data Input |
| SPI_EN | O | 1 | SPI Input Enable |
| RING_DET | I | 1 | V.34 Ring Detect |
| OFF_HOOK | O | 1 | V.34 Off Hook |
| SPKR_EN | O | 1 | V.34 Speaker Enable |
| SPKR_VOICE | O | 1 | V.34 Speaker Voice |
| SPKR_DATA | O | 1 | V.34 Speaker Data |
| SPK_VOL | O | 2 | V.34 Speaker Volume |
| Control/Interrupt Port Or Serial WAN Controller Port 4 (12) | | | |
| Cnt_Int[7:0] | I/O | 8 | Programmable Interrupt/LED control signals. Alternately these pins provide direct access to SWAN Controller 4. |
| Ethernet Media Independent Interface (18) | | | |
| ECOL | I | 1 | Ethernet Collision Detected |
| ECRS | I | 1 | Ethernet Carrier Sense |
| EDC | O | 1 | Ethernet Management Data CLock |
| EDI | I | 1 | Ethernet Management Data In |
| EDO | O | 1 | Ethernet Management Data Output |
| ERXC | I | 1 | Ethernet Receive Nibble or Symbol CLock |
| ERXD[3:0] | I | 4 | Ethernet Receive Nibble Data |
| ERXDV | I | 1 | Ethernet Receive Data Valid |

*FIG._6d*

| Signal Name | Type | Number | Description |
|---|---|---|---|
| ERXER | I | 1 | Ethernet Receive Error |
| ETXC | I | 1 | Ethernet Transmit Nibble or Symbol Clock |
| ETXD[3:0] | O | 4 | Ethernet Transmit Nibble Data |
| ETXEN | O | 1 | Ethernet Transmit Enable |
| ETXER | O | 1 | Ethernet Transmit Coding Error |
| ATPG & Boundary Scan Test Access Port (6) | | | |
| BS_TDI | I | 1 | Boundary Scan Test Data Input |
| BS_TDO | O | 1 | Boundary Scan Test Data Output |
| BS_TCLK | I | 1 | Boundary Scan Test Clock |
| BS_TM | I | 1 | Boundary Scan Test Mode |
| BS_TRSTn | I | 1 | Boundary Scan Test Reset |
| SCAN_EN | I | 1 | Factory Scan Test Enable |
| Power and Ground Pins (56) | | | |
| VSS | GND | 13 | Reference ground for internal logic |
| VDD | PWR | 12 | 3.3V power supply for internal logic |
| VSS2 | GND | 10 | Reference ground for I/O signals |
| VDD2 | PWR | 10 | 3.3V power supply for I/O signals |
| PLLVSS | GND | 1 | Reference ground for phase lock loop |
| PLLVDD | PWR | 1 | 3.3V power supply for phase lock loop |
| PLLAGND | GND | 1 | Reference ground for PLL analog circuitry |
| PCI_CLAMP | PWR | 7 | 5V clamp voltage for PCI interface signals |
| V_BAC | PWR | 1 | Battery back-up voltage for Real Time Clock |
| Total | | 255 | |

*FIG._6e*

| Pin | SDRAM | EPROM | PHY |
|---|---|---|---|
| LB_D[31:24] | Data[31:24] | Data[7:0] | Data[7:0]<br>(A/D not muxed) |
| LB_D[23:21] | Data[23:21] | NC | NC |
| LB_D[20:16] | Data[20:16] | Address[20:16] | address[20:16] |
| LB_D[15:8] | Data[15:8] | Address[15:8] | address[15:8] |
| LB_D[7:0] | Data[7:0] | Address[7:0] | address[7:0]<br>or (muxed bus)<br>A/D[7:0] |
| LB_DQMn[3] | DQM[3] | OE_n | OE_n |
| LB_DQMn[2] | DQM[2] | WE_n | WE_n |
| LB_DQMn[1] | DQM[1] | NC | ALE |
| LB_DQMn[0] | DQM[0] | NC | NC |
| LB_A[11:0] | Address[11:0] | NC | NC |
| LB_CASn | CAS | NC | NC |
| LB_RASn | RAS | NC | NC |
| LB_WEn | WE | NC | NC |
| LB_CLKO | CLK | NC | NC |
| LB_CLKE | CLKE | NC | NC |
| LB_PCSn[2] | CS | NC | NC |
| LB_PCSn[1] | NC | CS | NC |
| LB_PCSn[0] | NC | NC | CS |

FIG._7

| SYS_BOOT | Boot Source |
|---|---|
| 0 | EPROM |
| 1 | PCI LOAD |

FIG._8

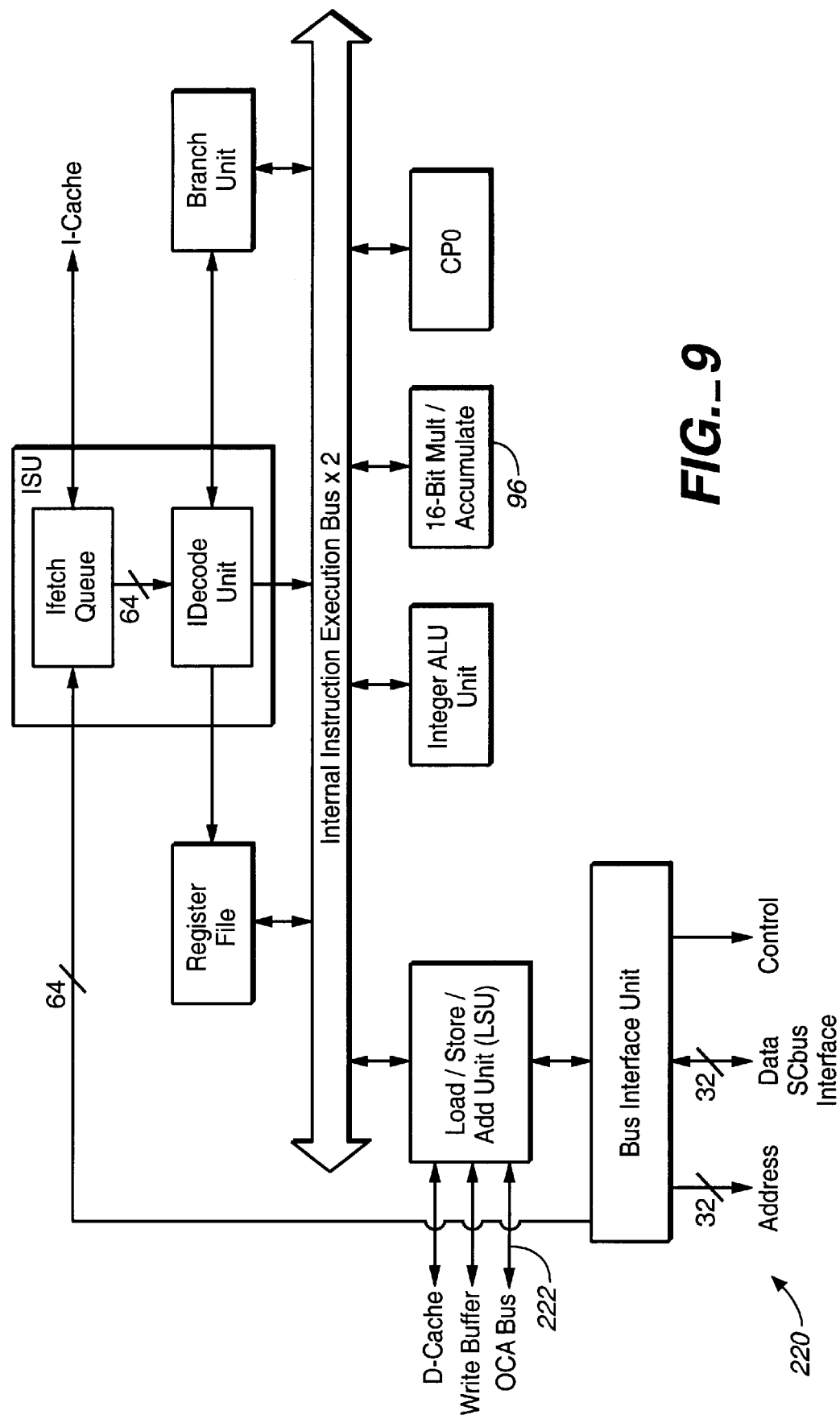
FIG._9

| Address | Size (bits) | Register |
|---|---|---|
| b800 0300 | 32 | CPU Address MAP |
| b800 0304 | 32 | CPU Status |
| b800 0308 | 32 | CPU Boot |
FIG._10
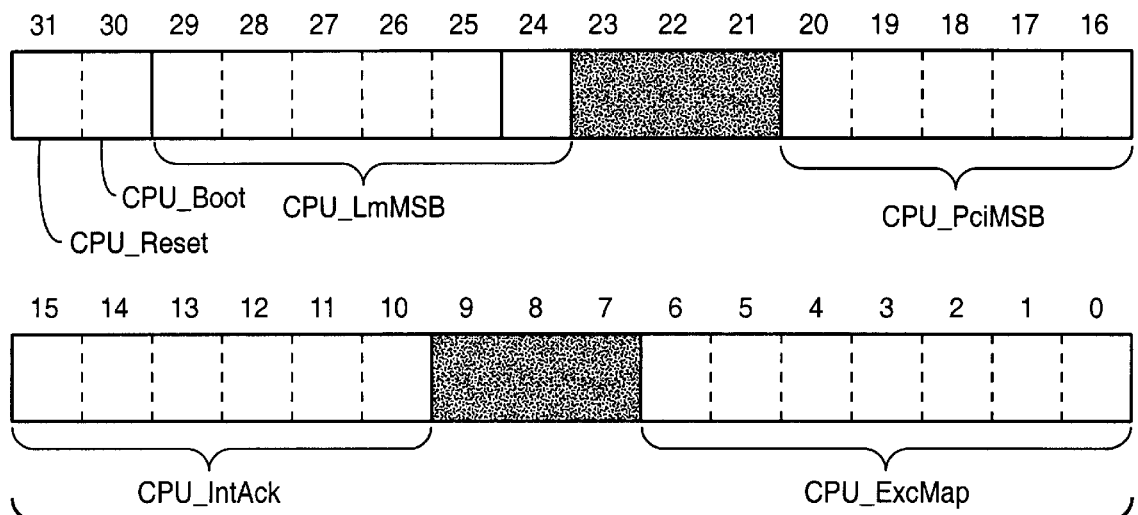
FIG._11
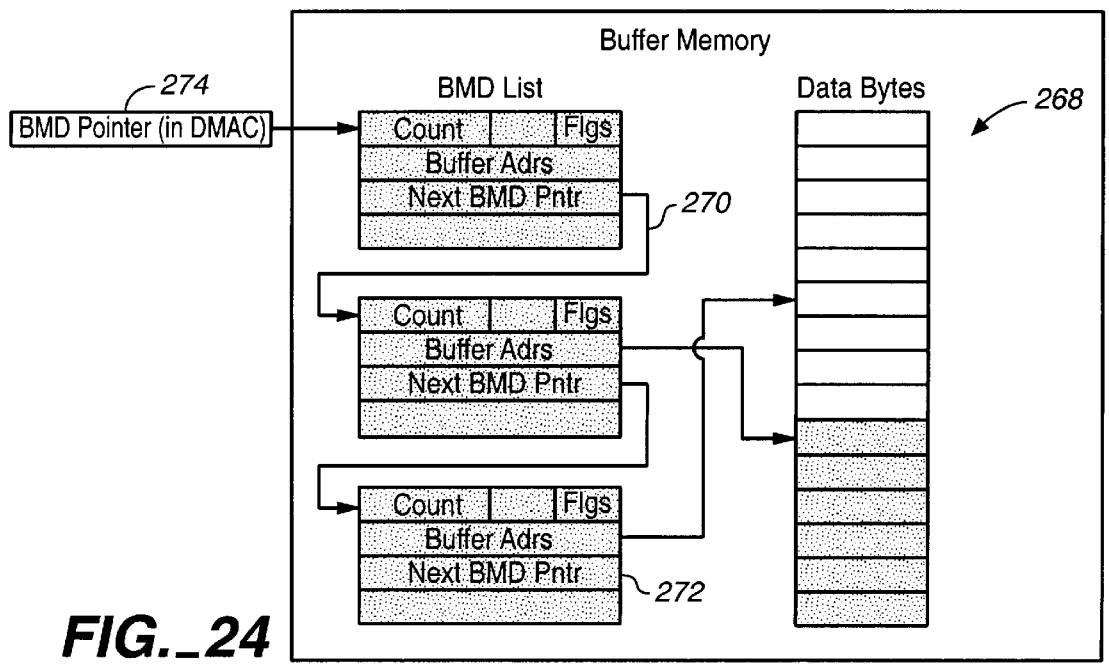
FIG._24

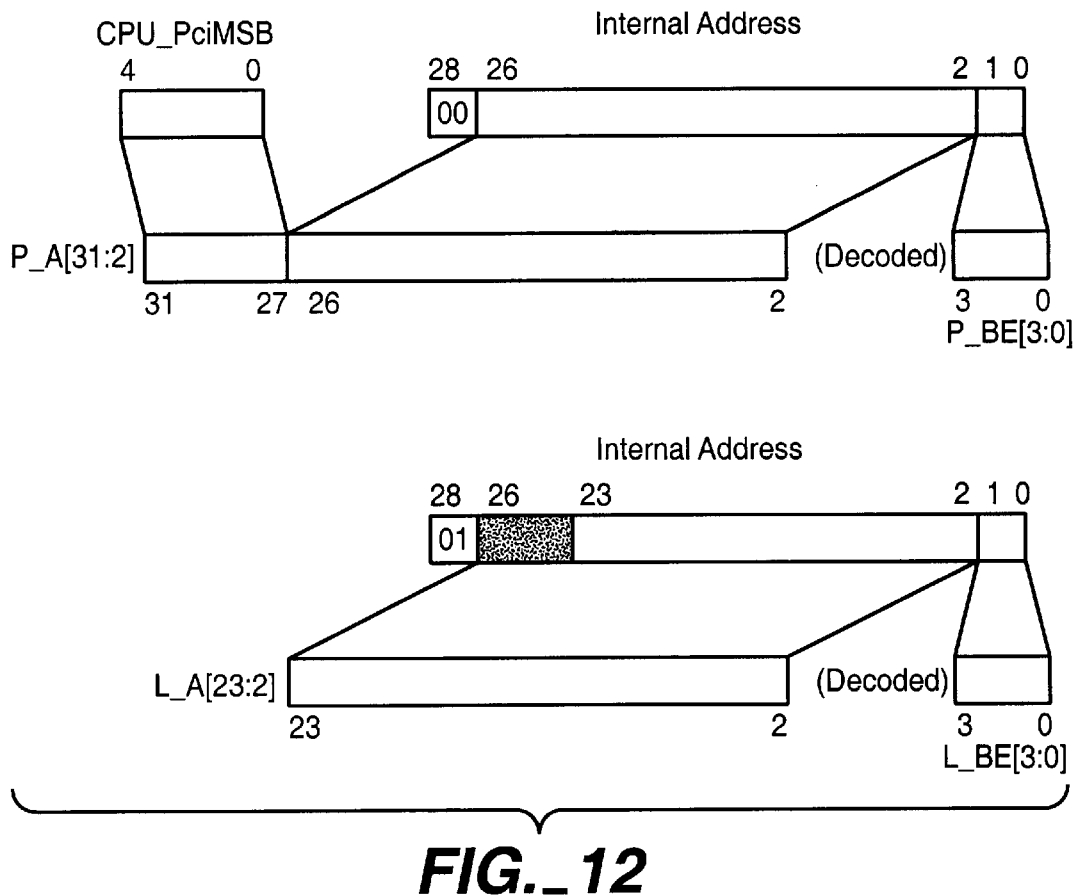
FIG._12
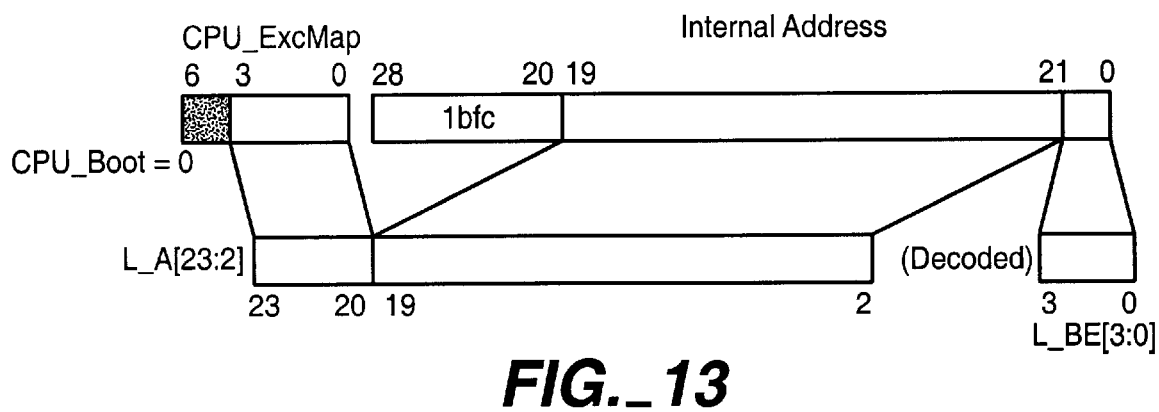
FIG._13

| Address | End Address | Size | Device Type | Bus Size |
|---|---|---|---|---|
| 0x0000 0000 | 0x000F FFFF | 1 Mbytes | EPROM | 8 |
| 0x0020 0000 | 0x002F FFFF | 1 Mbytes | PHY | 8 |
| | | | | |
| 0x0100 0000 | 0x01FF FFFF | 16 Mbytes | SDRAM | 32 |
| 0xa800 0000 | 0xaFFF FFFC | 128 Mbytes | PCI Bus | 32 |
| 0xB000 0000 | 0xB000 1FFC | 8 Mbytes | Internal SRAM Memory | 32 |
| | | | | |
| 0xBFC0 0000 | | 1 Mbyte | Exception Handling Registers | 32 |
| | | | | |
| | | | | |
| | | | | |
| 0xB800 0000 | 0xB800 00FC | 256 | PCI Config. Registers | 32 |
| 0xB800 0100 | 0xB800 01FC | 256 | Memory Controller | 32 |
| 0xB800 0200 | 0xB800 02FC | 256 | 16550 UART | 8 |
| 0xB800 0300 | | 4 | CPU Address MAP Register | 32 |
| 0xB800 0304 | | 4 | CPU Status Register | 32 |
| 0xB800 0308 | | 4 | CPU Boot Register | 32 |
| 0xB800 0400 | 0xB800 04FC | 256 | Ethernet | 8 |
| 0xB800 0500 | 0xB800 05FC | 256 | I2O | 32 |
| 0xB800 0600 | 0xB800 06FC | 256 | Mailbox | 32 |
| 0xB800 0700 | 0xB800 07FC | 256 | PCI DMA | 32 |
| 0xB800 0700 | 0xB800 1FFC | 2304 | Reserved | 32 |
| 0xB800 2000 | 0xB800 20FC | 256 | SWAN1 | 32 |
| 0xB800 2100 | 0xB800 21FC | 256 | SWAN2 | 32 |
| 0xB800 2200 | 0xB800 22FC | 256 | SWAN3 | 32 |
| 0xB800 2300 | 0xB800 23FC | 256 | SWAN4 | 32 |
| 0xB800 2400 | 0xB800 24FC | 256 | TDM | 32 |
| 0xB800 2500 | 0xB800 25FC | 256 | Timer Registers | |
| 0xB800 2600 | 0xB800 26FC | 256 | Real Time Clock | 8 |
| 0xB800 2700 | 0xB800 27FC | 256 | SPI | |
| 0xB800 2800 | 0xB800 28FC | 256 | Modem | |
| 0xB800 2900 | 0xB800 7FFC | | Reserved | |
| 0xB800 8000 | 0xB800 BFFC | 16K | nChannel DMA | 32 |
| 0xB800 C000 | 0xB800 FFFC | | reserved | 32 |

FIG._14

| Name | Number | Description |
|---|---|---|
| Int_DMA | 15 | DMA interrupt |
| Int_EN | 14 | Ethernet E110 / P110 Interrupt |
| Int_V.34 | 13 | V.34 Interrupt |
| Int_PCI | 12 | PCI Interrupt |
| Int_SWAN1 | 11 | SWAN 1 exception Interrupt |
| Int_SWAN2 | 10 | SWAN 2 exception Interrupt |
| Int_SWAN3 | 9 | SWAN 3 exception Interrupt |
| Int_SWAN4 | 8 | SWAN 4 exception Interrupt |
| Int_RTC | 7 | RTC Event |
| Int_Timer | 6 | Timer 3-0 Time-Out |
| Int_Mbx | 5 | PCI Mailbox Interrupt |
| Int_GP I/O | 4-1 | General Purpose I/O Interrupts |
| Int_UART | 0 | UART Interrupt |

FIG._15

| Start Address | End Address | Size | Device Type | Bus Size |
|---|---|---|---|---|
| 0x0000 0000 | 0x001f ffff | 1 Mbytes | EPROM | 8 |
| 0x0020 0000 | 0x002f ffff | 1 Mbytes | PHY | 8 |
| 0x0100 0000 | 0x01ff ffff | 16 Mbytes | SDRAM | 32 |

FIG._16

| Pin | SDRAM | EPROM | PHY |
|---|---|---|---|
| LB_D[31:24] | Data[31:24] | Data[7:0] | Data[7:0] (A/D not muxed) |
| LB_D[23:21] | Data[23:21] | NC | NC |
| LB_D[20:16] | Data[20:16] | Address[20:16] | address[20:16] |
| LB_D[15:8] | Data[15:8] | Address[15:8] | address[15:8] |
| LB_D[7:0] | Data[7:0] | Address[7:0] | address[7:0] or (muxed bus) A/D[7:0] |
| LB_DQMn[3] | DQM[3] | OE_n | OE_n |
| LB_DQMn[2] | DQM[2] | WE_n | WE_n |
| LB_DQMn[1] | DQM[1] | NC | ALE |
| LB_DQMn[0] | DQM[0] | NC | NC |
| LB_A[11:0] | Address[11:0] | NC | NC |
| LB_CASn | CAS | NC | NC |
| LB_RASn | RAS | NC | NC |
| LB_WEn | WE | NC | NC |
| LB_CLKO | CLK | NC | NC |
| LB_CLKE | CLKE | NC | NC |
| LB_PCSn[2] | CS | NC | NC |
| LB_PCSn[1] | NC | CS | NC |
| LB_PCSn[0] | NC | NC | CS |

*FIG._17*

| 15 | 14 | 13 | 12 | 11 | 10 | 9 | 8 |
|---|---|---|---|---|---|---|---|
| Unused | RSV22 | RSV20 | RSV19 | RSV18 | RSV15 | RSV14 | RSV13 |

*FIG._26*

| 15 | 14 | 13 | 12 | 11 | 10 | 9 | 8 |
|---|---|---|---|---|---|---|---|
| Unused | | | | | CRC_Err | Frame_Err | Abort_Err |

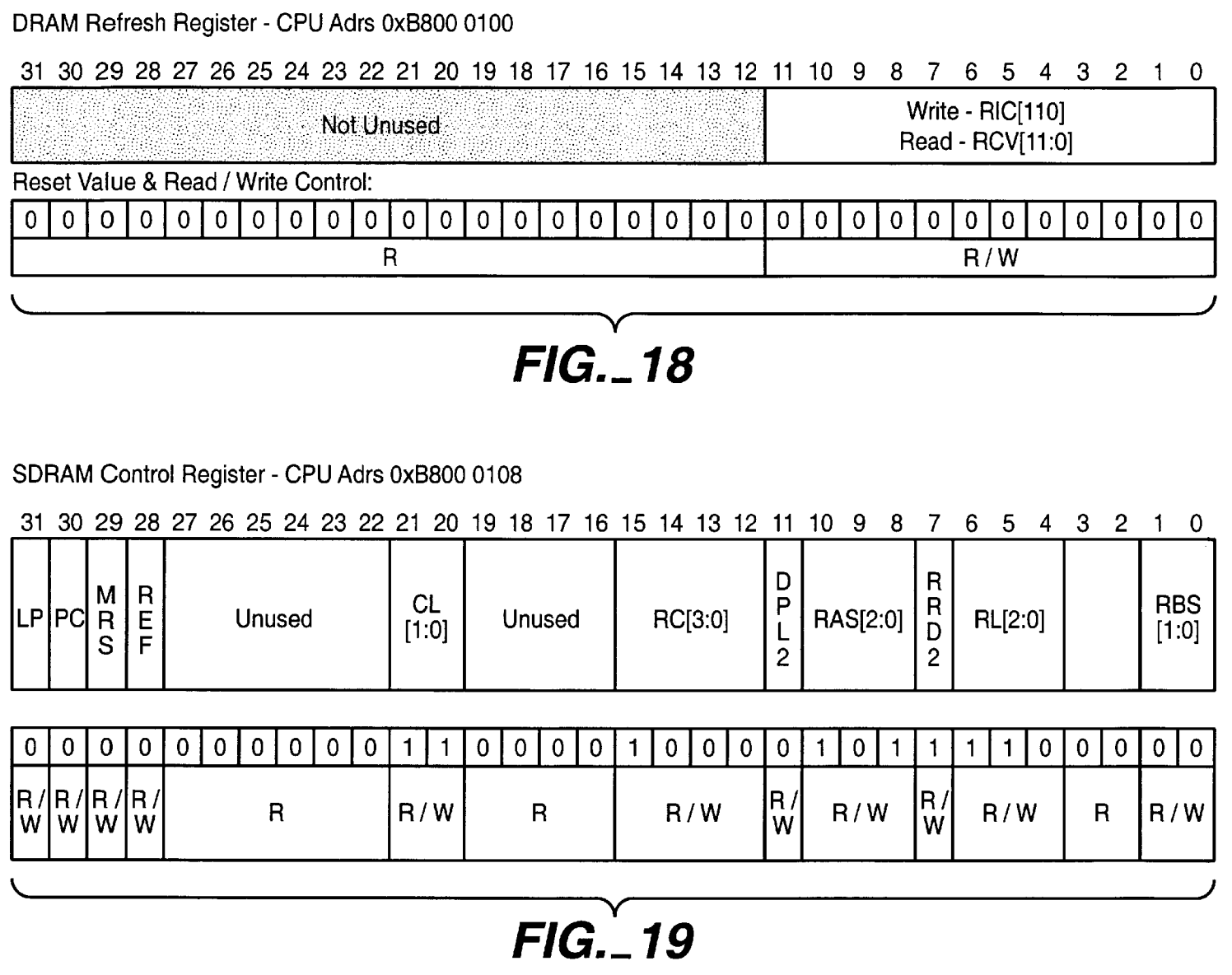

| RBS[1.0] | Memory Size | SDRAM Row Adrs Bits | ITB Row Adrs Bits | SDRAM Column Adrs Bits | ITB Column Adrs Bits | Precharge Mode Select Bit | DRAM Type |
|---|---|---|---|---|---|---|---|
| 00 | 16MB | 11:0 | 23:12 | 9:0 | 11:2 | 10 | SDRAM X4 Parts |
| 01 | 8MB | 11:0 | 22:11 | 8:0 | 10:2 | 10 | SDRAM X8 Parts |
| 10 | 4MB | 11:0 | 21:10 | 7:0 | 9:2 | 10 | SDRAM X16 Parts |
| 11 | 1MB | 9:0 | 19:10 | 7:0 | 9:2 | 8 | SGRAM X32 Parts |

*FIG._20*

EPROM Control Register - CPU Adrs 0xB800 0110

| 31 30 29 28 27 26 25 24 23 22 | 21 20 | 19 18 17 16 | 15 14 13 12 11 10 9 8 | 7 6 5 4 | 3 2 1 0 |
|---|---|---|---|---|---|
| Unused | WH_T [1:0] | WL_T[3:0] | Unused | RR_T[2:0] | R_T[3:0] |
| 0 0 0 0 0 0 0 0 0 0 | 1 1 | 1 1 1 1 | 0 0 0 0 0 0 0 0 | 0 1 1 1 | 1 1 1 1 |
| R | R/W | R/W | R | R/W | R/W |

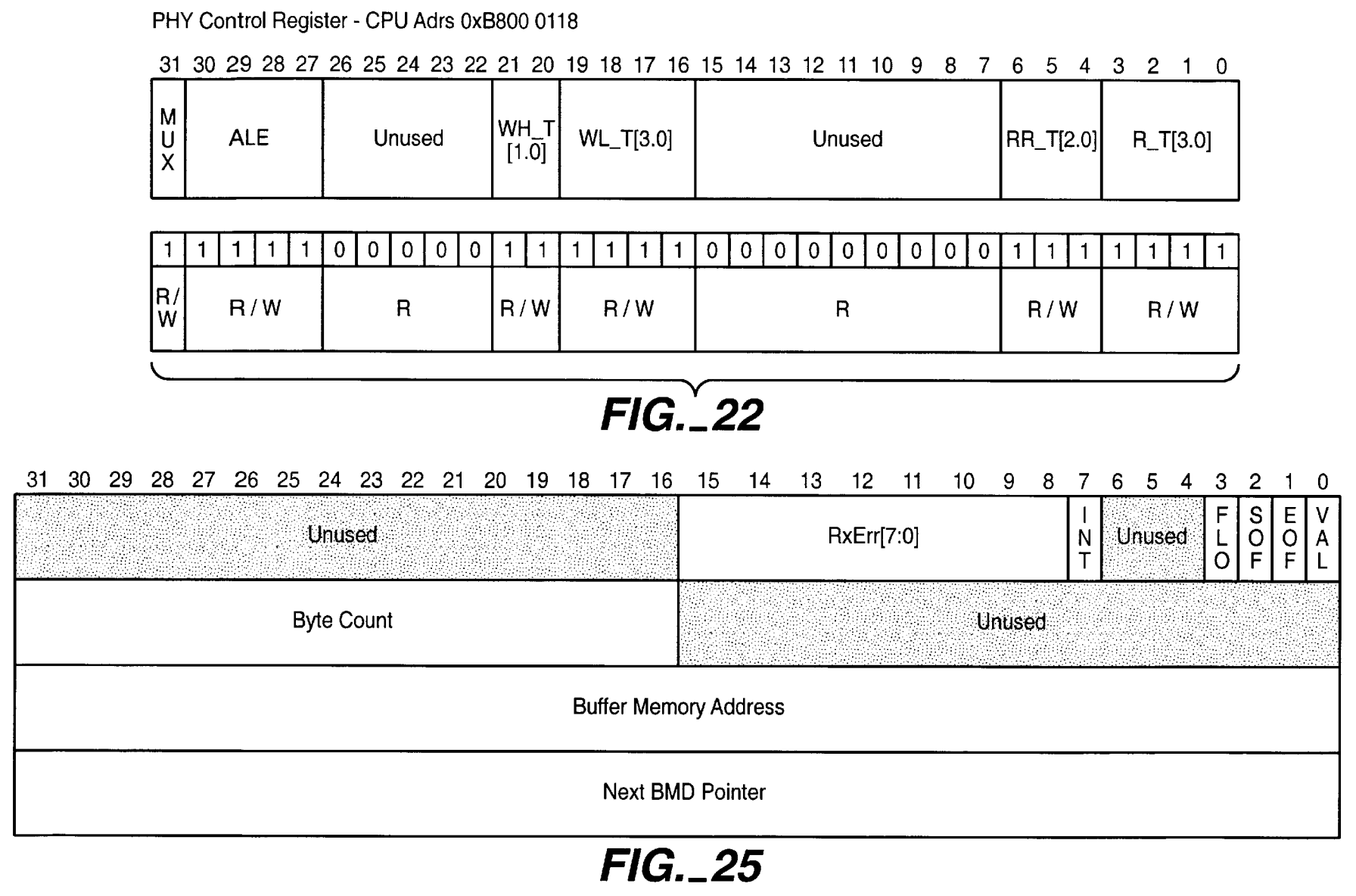

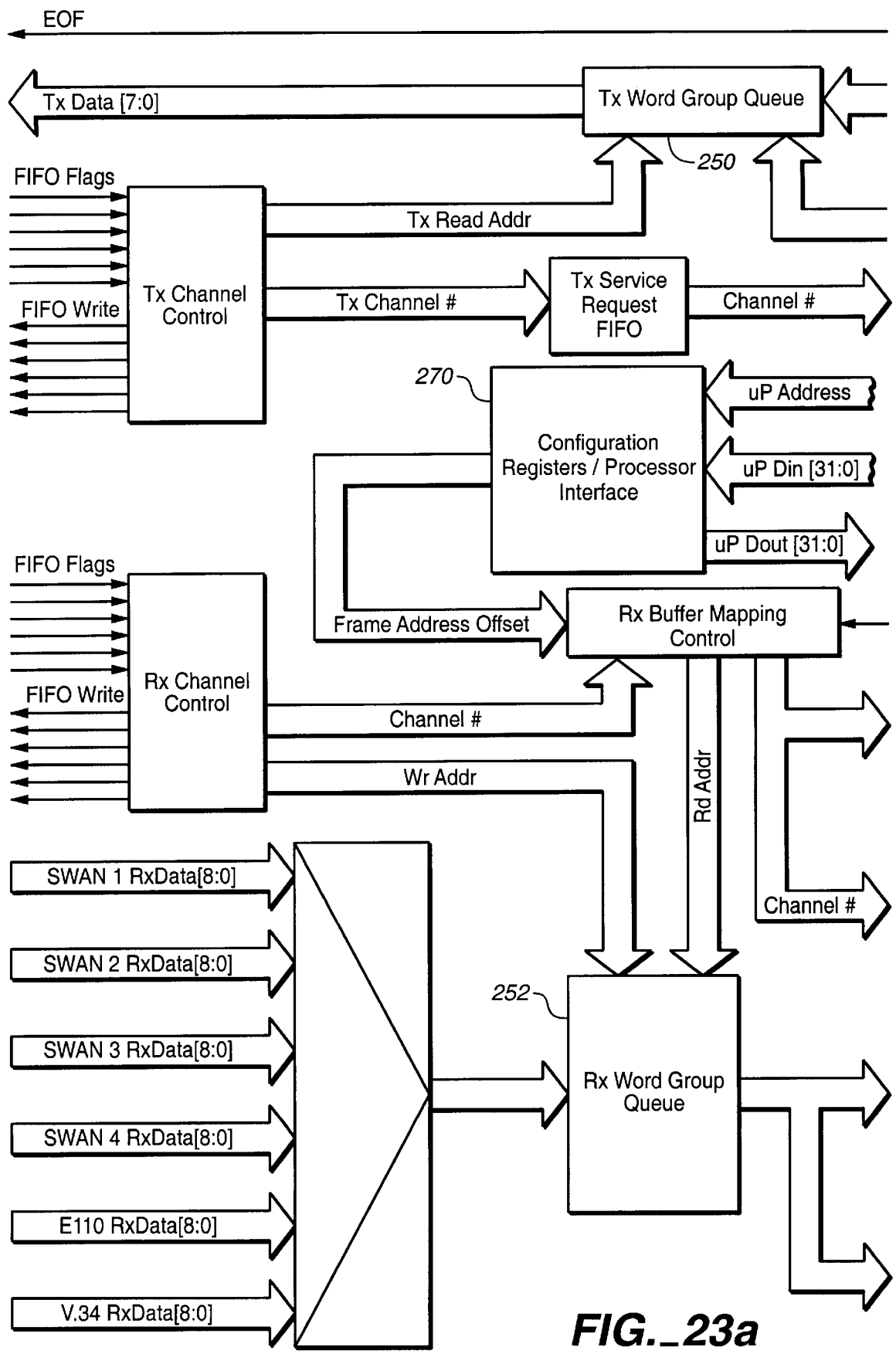
FIG._23a

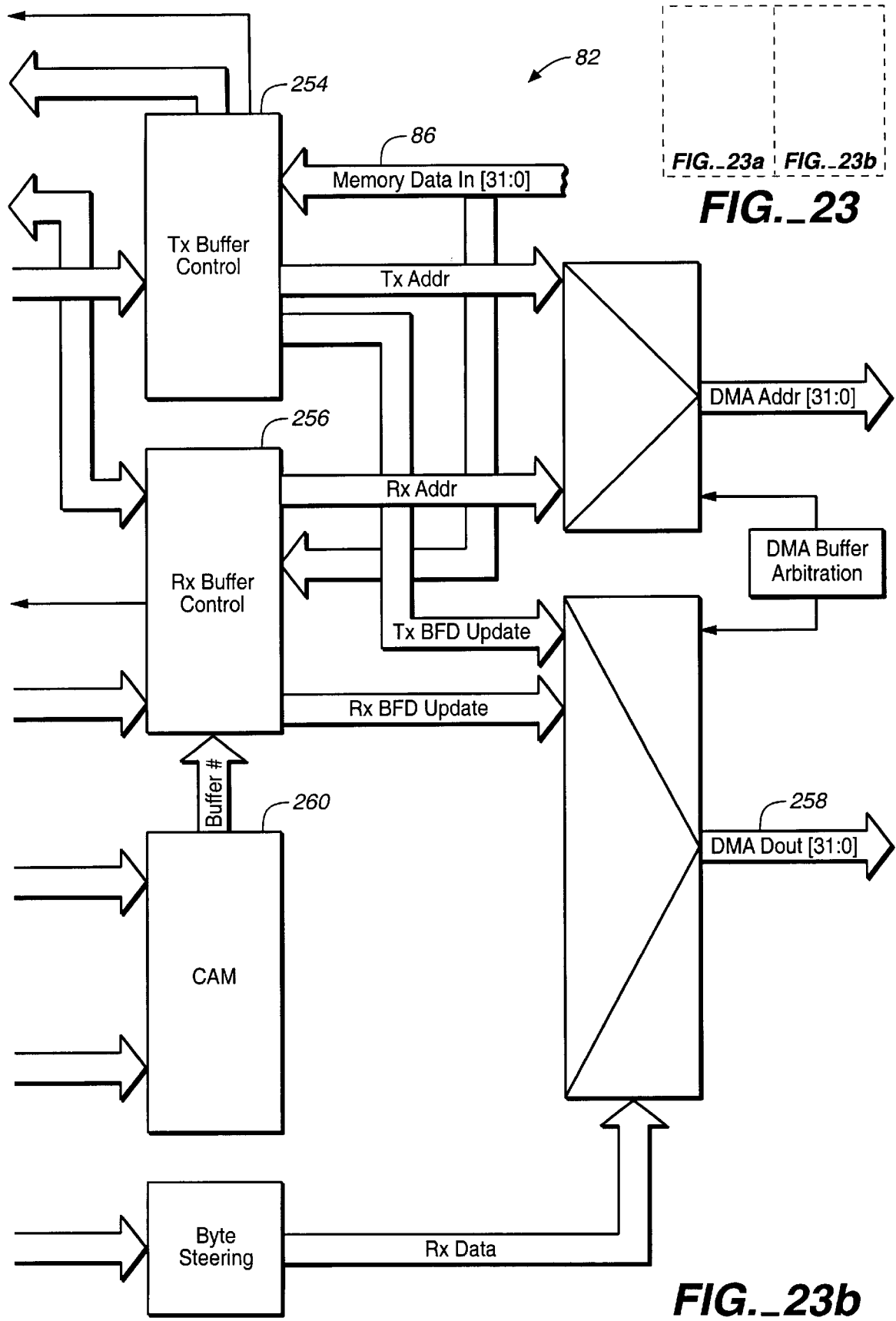
FIG._23b

DMAC Control Register

| 31 | 7 | 6 | 5 | 4 | 3 | 2 | 1 | 0 |
|---|---|---|---|---|---|---|---|---|
| Unused | | | | RST | BurstSize[1:0] | | LRDY | LREQ |

Default Value & Read / Write Access:

| 0 | | | | 0 | 0 | 0 | 0 | 0 |
|---|---|---|---|---|---|---|---|---|
| R | | | | R/W | R/W | R/W | R | R/W |

FIG._28a

DMAC Transmit Channel Enable Register

| 31 | 6 | 5 | 4 | 3 | 2 | 1 | 0 |
|---|---|---|---|---|---|---|---|
| Unused | | S1TxEN | S2TxEN | S3TxEN | S4TxEN | ETxEN | VTxEN |

Default Value & Read / Write Access:

| 0 | | 0 | 0 | 0 | 0 | 0 | 0 |
|---|---|---|---|---|---|---|---|
| R | | R/W | R/W | R/W | R/W | R/W | R/W |

FIG._29a

DMAC Receive Channel Enable Register

| 31 | 6 | 5 | 4 | 3 | 2 | 1 | 0 |
|---|---|---|---|---|---|---|---|
| Unused | | S1RxEN | S2REN | S3RxEN | S4RxEN | ERxEN | VRxEN |

Default Value & Read / Write Access:

| 0 | | 0 | 0 | 0 | 0 | 0 | 0 |
|---|---|---|---|---|---|---|---|
| R | | R/W | R/W | R/W | R/W | R/W | R/W |

FIG._30a

| Name | Bit Position | Description |
|---|---|---|
| DMA_RST | 4 | DMA Reset<br>When set, DMA_RST holds the DMA Controller in a reset state and resets the transmit FIFOs on all channels. |
| BurstSize[1:0] | 3-2 | Burst Size<br>BurstSize[1:0] specifies the number of 32-bit words in a burst to Local Memory.<br>00 = 1 word<br>01 = 2 words<br>10 = 4 words<br>11 = 8 words |
| LRDY | | Lock Out Ready<br>The DMAC sets LRDY in response to a lock out request. LRDY indicates the DMAC has suspended operation and it is safe to update buffer descriptors. |
| LREQ | | Lock Out Request<br>LREQ when set causes the DMAC to suspend operation when a buffer descriptor access is required. |

FIG._28b

| Name | Bit Position | Description |
|---|---|---|
| List_IntEn | 3 | List Completion Interrupt Enable<br>List_IntEn, when set, enables interrupt generation when a BMD is processed and the Next BMD Pointer is zero. |
| Err_IntEn | 2 | Abnormal Completion Interrupt Enable<br>When set, Err_IntEn enables interrupt generation when an error condition occurs during BMD porcessing. |
| BMD_IntEn | 1 | BMD Not Ready Interrupt Enable<br>BMD_IntEn enables interrupts when a BMD is fetched and the valid bit is not set. |
| Norm_IntEn | 0 | Normal Completion Interrupt Enable<br>When set, Norm_IntEn enables an interrupt when a BMD is completely processed without error and the interrupt enable was also set in the BMD. |

FIG._31b

| Name | Bit Position | Description |
|---|---|---|
| S1TxEN | 5 | SWAN 1 Transmit Enable<br>When set, S1TxEN enables the transmit channel to SWAN controller 1. When clear, the transmit channel is held in a reset state and the transmit FIFO for SWAN controller 1 is flushed. |
| S2TxEN | 4 | SWAN 2 Transmit Enable<br>When set, S2TxEN enables the transmit channel to SWAN controller 2. When clear, the transmit channel is held in a reset state and the transmit FIFO for SWAN controller 2 is flushed. |
| S3TxEN | 3 | SWAN 3 Transmit Enable<br>When set, S3TxEN enables the transmit channel to SWAN controller 3. When clear, the transmit channel is held in a reset state and the transmit FIFO for SWAN controller 3 is flushed. |
| S4TxEN | 2 | SWAN 4 Transmit Enable<br>When set, S4TxEN enables the transmit channel to SWAN controller 4. When clear, the transmit channel is held in a reset state and the transmit FIFO for SWAN controller 4 is flushed. |
| ETxEN | 1 | Ethernet Transmit Enable<br>When set, ETxEN enables the transmit channel to the ethenet controller. When clear, the transmit channel is held in a reset state and the ethernet transmit FIFO is flushed. |
| VTxEN | 0 | V.34 Transmit Enable<br>When set, VTxEN enables the transmit channel to the V.34 Interface controller. When clear, the transmit channel is held in a reset state and the transmit FIFO is flushed. |

FIG._29b

| Name | Bit Position | Description |
|---|---|---|
| S1RxEN | 5 | SWAN 1 Receive Enable<br>When set, S1RxEN enables the receive channel from SWAN controller 1. When clear, the receive FIFO flags from SWAN controller 1 are ignored. |
| S2RxEN | 4 | SWAN 2 Receive Enable<br>When set, S2RxEN enables the receive channel from SWAN controller 2. When clear, the receive FIFO flags from SWAN controller 2 are ignored. |
| S3RxEN | 3 | SWAN 3 Receive Enable<br>When set, S3RxEN enables the receive channel from SWAN controller 3. When clear, the receive FIFO flags from SWAN controller 3 are ignored. |
| S4RxEN | 2 | SWAN 4 Receive Enable<br>When set, S4RxEN enables the receive channel from SWAN controller 4. When clear, the receive FIFO flags from SWAN controller 4 are ignored. |
| ERxEN | 1 | Ethernet Receive Enable<br>When set, ERxEN enables the receive channel from the ethernet controller. When clear, the receive FIFO flags from the ethernet controller are ignored. |
| VRxEN | 0 | V.34 Receive Enable<br>When set, VRxEN enables the receive channel from the V.34 interface controller. When clear, the receive FIFO flags from V.34 interface controller are ignored. |

*FIG._30b*

DMAC Interrupt Enable Register

| 31 | | 4 | 3 | 2 | 1 | 0 |
|---|---|---|---|---|---|---|
| Unused | | | List_IntEn | Err_IntEn | BMD_IntEn | Norm_IntEn |

Default Value & Read / Write Access:

| 0 | | | 0 | 0 | 0 | 0 |
|---|---|---|---|---|---|---|
| R | | | R/W | R/W | R/W | R/W |

FIG._31a

DMAC Interrupt Queue Register

| 31 | 12 | 11 | 10 | 9 | 8 | 7 | 6 | 5 | 4 | 3 | 2 | 1 | 0 |
|---|---|---|---|---|---|---|---|---|---|---|---|---|---|
| Unused | | Channum[3:0] | | | | DIR | Unused | | | List_Compl | Err_Compl | BMD_Notrdy | Norm_Compl |

Default Value & Read / Write Access:

| 0 | | 0 | | | | 0 | 0 | | | 0 | 0 | 0 | 0 |
|---|---|---|---|---|---|---|---|---|---|---|---|---|---|
| R | | R | | | | R | R | | | R | R | R | R |

FIG._32a

DMAC Header Offset Lookup Table

| 31 | | 4 | 3 | | | 0 |
|---|---|---|---|---|---|---|
| Unused | | | Hdr_Offset[3:0] | | | |

Default Value & Read / Write Access:

| 0 | | | X | | | |
|---|---|---|---|---|---|---|
| R | | | R/W | | | |

FIG._33a

| Name | Bit Position | Description |
|---|---|---|
| Channum[3:0] | 11-8 | Channel Number<br>Channum[3:0] indicates the channel number of the interrupt. On transmit channel numbers are assigned as follows.<br>0 = SWAN 1<br>1 = SWAN 2<br>2 = SWAN 3<br>3 = SWAN 4<br>4 = Ethernet Controller<br>5 = V.34 interface controller<br><br>For receive, channel numbers range from 0 - B, and are mapped to the serial interface controllers by the receive action CAM. |
| DIR | 7 | Direction<br>DIR indicates the direction of the interrupt.<br>0 = receive<br>1 = transmit |
| List_Cmpl | 3 | List Completion<br>List_Cmpl indicates the DMAC completed a BMD operation in which the Next BMD Pointer was set to 0. |
| Err_Cmpl | 2 | Abnormal Completion<br>When set, Err_Cmpl indicates an abnormal termination of the transmit or receive BMD. On transmit, the only condition that will set Err_Cmpl is a serial channel FIFO overflow which is a condition that should not occur.<br>On Receive, Err_Cmpl indicates an error flag is set in word 0 of the receive BMD. |
| BMD_Notrdy | 1 | BMD Not Ready<br>BMD_Notrdy indicates a valid BMD was not available when required for transmit or receive. |
| Norm_Cmpl | 0 | Normal Completion<br>When set, Norm_Cmpl indicates normal buffer completion and an interrupt was enabled in the buffer descriptor. |

*FIG._32b*

| Name | Bit Position | Description |
|---|---|---|
| Hdr_Offset[3:0] | 3-0 | Receive Header Offset<br>Hdr_Offset[3:0] specifies the number of bytes prior to the start of the header address field to be compared by the Receive Frame Action CAM. Legal values are 0 - A. |

FIG._33b

| Name | Bit Position | Description |
|---|---|---|
| Header1[7:0] | 31-24 | Header Byte 1<br>Header1[7:0] specifies the compare data for the first byte of the frame address. |
| Header2[7:0] | 23-16 | Header Byte 2<br>Header2[7:0] specifies the compare data for the second byte of the frame address. |
| Header3[7:0] | 15-8 | Header Byte 3<br>Header3[7:0] specifies the compare data for the third byte of the frame address. |
| Header4[7:0] | 7-0 | Header Byte 4<br>Header4[7:0] specifies the compare data for the fourth byte of the frame address. |

FIG._34b

| Name | Bit Position | Description |
|---|---|---|
| Header5[7:0] | 31-24 | Header Byte 5<br>Header5[7:0] specifies the compare data for the fifth byte of the frame address. |
| Header6[7:0] | 23-16 | Header Byte 6<br>Header6[7:0] specifies the compare data for the sixth byte of the frame address. |
| Channel#[2:0] | 2-0 | Channel Number<br>Channel#[2:0] specifies the channel number associated with this CAM entry. |

FIG._35b

Receive Frame Action CAM Compare Data Register 1

| 31 | 24 | 23 | 16 | 15 | 8 | 7 | 0 |
|---|---|---|---|---|---|---|---|
| Header1[7:0] | | Header2[7:0] | | Header3[7:0] | | Header4[7:0] | |

Default Value & Read / Write Access:

| X | X | X | X |
|---|---|---|---|
| R/W | R/W | R/W | R/W |

FIG. _ 34a

Receive Frame Action CAM Compare Data Register 2

| 31 | 24 | 23 | 16 | 15 | 3 | 2 | 0 |
|---|---|---|---|---|---|---|---|
| Header5[7:0] | | Header6[7:0] | | Unused | | Channel#[2:0] | |

Default Value & Read / Write Access:

| X | X | 0 | X |
|---|---|---|---|
| R/W | R/W | R | R/W |

FIG. _ 35a

Receive Frame Action CAM Compare Mask Register

| 31 | 24 | 23 | 16 | 15 | 8 | 3 | 2 | 1 | 0 |
|---|---|---|---|---|---|---|---|---|---|
| Mask1[7:0] | | Mask2[7:0] | | Unused | | Mask3 | Mask4 | Mask5 | Mask6 |

Default Value & Read / Write Access:

| X | X | 0 | X |
|---|---|---|---|
| R/W | R/W | R | R/W |

FIG. _ 36a

| Name | Bit Position | Description |
|---|---|---|
| Mask1[7:0] | 31-24 | Mask Byte 1<br>Mask1[7:0] specifies a bit for bit mask for comparing the first byte of the frame address. When a Mask1 bit is set, the corresponding bit of frame address byte 1 is compared against the header compare data bit. |
| Mask2[7:0] | 23-16 | Mask Byte 2<br>Mask1[7:0] specifies a bit for bit mask for comparing the second byte of the frame address. When a Mask2 bit is set, the corresponding bit of frame address byte 2 is compared against the header compare data bit. |
| Mask3 | 3 | Mask Bit 3<br>Mask3 enables compare of the compare data for the third byte of the frame address. When set, Header3[7:0] is compared against the third frame address byte. |
| Mask4 | 2 | Mask Bit 4<br>Mask4 enables compare of the compare data for the fourth byte of the frame address. When set, Header4[7:0] is compared against the fourth frame address byte. |
| Mask5 | 1 | Mask Bit 5<br>Mask5 enables compare of the compare data for the fifth byte of the frame address. When set, Header5[7:0] is compared against the fifth frame address byte. |
| Mask6 | 0 | Mask Bit 6<br>Mask6 enables compare of the compare data for the sisth byte of the frame address. When set, Header6[7:0] is compared against the sixth frame address byte. |

FIG._36b

| Name | Bit Position | Description |
|---|---|---|
| DROP | 4 | Discard Current Receive Frame<br>DROP, when set, specifies the receive frame is discarded when the frame address matches the compare condition. Otherwise, the frame is transferred to the buffer list specified by RxBuffer#[3:0]. |
| RxBuffer#[3:0] | 3-0 | Receive Buffer List<br>RxBuffer# specifies the buffer list for the receive frame. Valid entries are 0 - B. |

Receive Frame Action Register

| 31 | 4 | 3 | 2 | 1 | 0 |
|---|---|---|---|---|---|
| Unused | DROP | RxBuffer#[3:0] | | | |

Default Value & Read / Write Access:

| Unused | 0 | X | X |
|---|---|---|---|
| | R | R/W | R/W |

FIG._40

| Address | 31 | 24 | 23 | 16 | 15 | 8 | 7 | 0 |
|---|---|---|---|---|---|---|---|---|
| 00 | Unused | | | | | | MII Control / Status | |
| 04 | Unused | | | | | | Register Address | |
| 08 | Unused | | | Cntl Status | | | | |
| 0C | Unused | | | Status Data | | | | |
| 10 | Unused | | | | | | Rx Status | |
| 14 | Unused | | | | Rx CRC | | | |
| 18 | Unused | | | RNG Seed | | | | |
| 1C | Unused | | | | | | Tx Control | |
| 20 | Unused | | | | | | IPG Part 1 | |
| 24 | Unused | | | | | | IPG Part 2 | |
| 28 | Unused | | | | | | Back to Back IPG | |
| 2C | | | | | Rx Statistics | | | |
| 30 | Unused | | | Tx Statistics | | | | |
| 34 | Unused | | | | | | Rx Interrupt | |

300

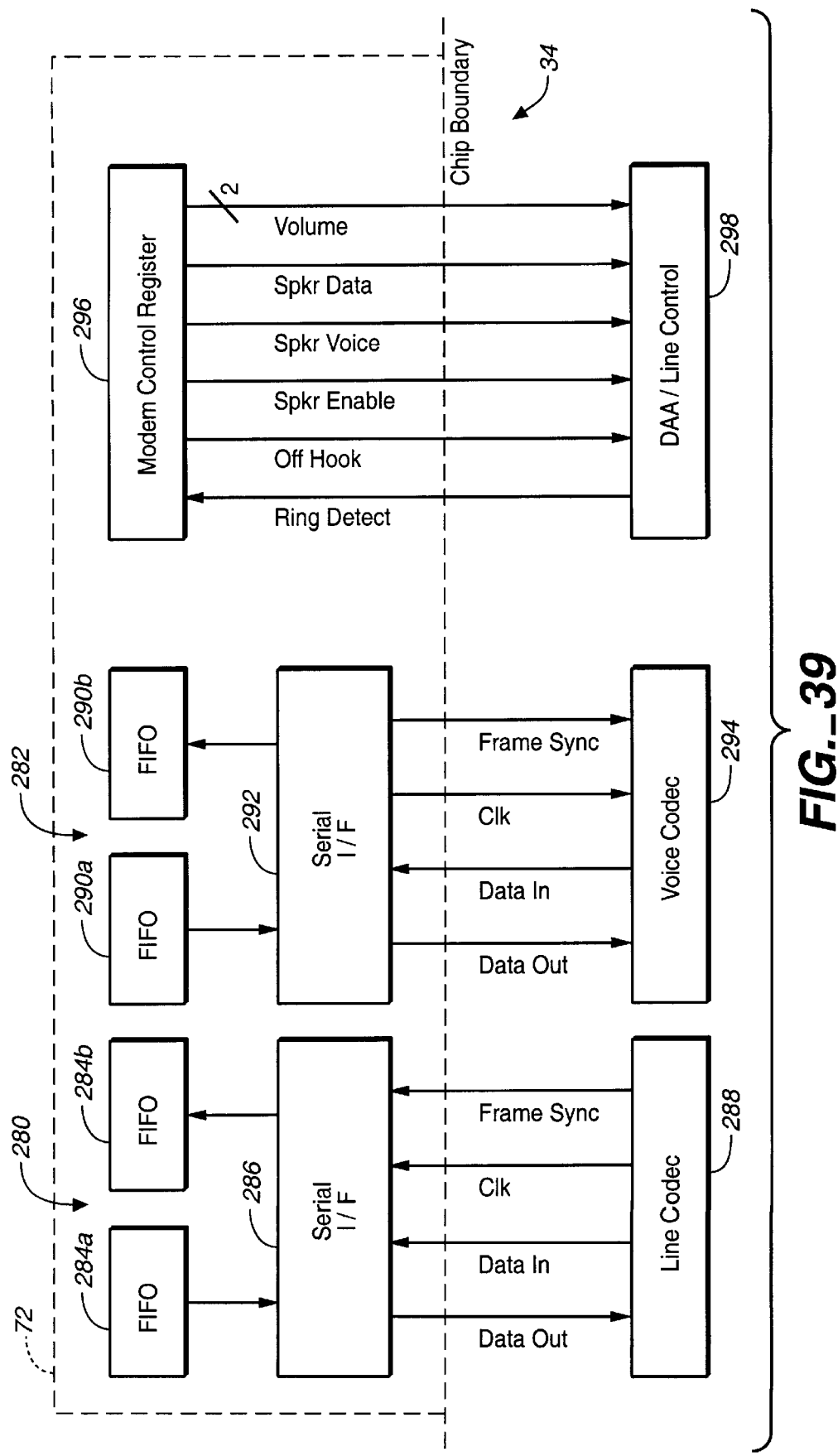
FIG._39

Ethernet Control / Status Register

| 31 | | | | | | | | 8 | 7 | 6 | 5 | 4 | 3 | 2 | 1 | 0 |
|---|---|---|---|---|---|---|---|---|---|---|---|---|---|---|---|---|
| Unused | | | | | | | | | NVALID | MIILF | SCAN | RSTAT | LCTLD | BUSY |

Default Value & Read / Write Access:

| | | | | | | | | 0 | | | | | | | | |
|---|---|---|---|---|---|---|---|---|---|---|---|---|---|---|---|---|
| | | | | | | | | R | R | R | R/W | R/W | R/W | R |

FIG._41a

Ethernet Register Address Register

| 31 | | | | | | | | 8 | 7 | 6 | 5 | 4 | 3 | 2 | 1 | 0 |
|---|---|---|---|---|---|---|---|---|---|---|---|---|---|---|---|---|
| Unused | | | | | | | | | | | RGAD[4:0] | | | | | |

Default Value & Read / Write Access:

| | | | | | | | | 0 | | | | | | | | |
|---|---|---|---|---|---|---|---|---|---|---|---|---|---|---|---|---|
| | | | | | | | | R | R | R | R/W | R/W | R/W | R/W | R/W | R/W |

FIG._41b

Ethernet Control Data Register

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| CTLD[15:0] | | | | | | | | | | | | | | | |

Default Value & Read / Write Access:

| X | X | X | X | X | X | X | X | X | X | X | X | X | X | X | X |
|---|---|---|---|---|---|---|---|---|---|---|---|---|---|---|---|
| R/W | R/W | R/W | R/W | R/W | R/W | R/W | R/W | R/W | R/W | R/W | R/W | R/W | R/W | R/W | R/W |

FIG._41c

Ethernet Status Data Register

| 15 | 14 | 13 | 12 | 11 | 10 | 9 | 8 | 7 | 6 | 5 | 4 | 3 | 2 | 1 | 0 |
|----|----|----|----|----|----|----|----|----|----|----|----|----|----|----|----|
| | | | | | | | PRSD[15:8] | | | | | | | | |

Default Value & Read / Write Access:

| X | X | X | X | X | X | X | X | X | X | X | X | X | X | X | X |
|---|---|---|---|---|---|---|---|---|---|---|---|---|---|---|---|
| R | R | R | R | R | R | R | R | R | R | R | R | R | R | R | R |

FIG._41d

Ethernet Receive Status Register

| 31 | ... | 8 | 7 | 6 | 5 | 4 | 3 | 2 | 1 | 0 |
|----|-----|---|---|---|---|---|---|---|---|---|
| Unused | | | | | | | | MCO | BCO | Unused |

Default Value & Read / Write Access:

| 0 | X | X | X | X | X | 0 | X | 0 |
|---|---|---|---|---|---|---|---|---|
| R | R | R | R | R | R | R | R | R |

FIG._41e

Ethernet Receive CRC Register

| 31 | ... | 9 | 8 | 7 | 6 | 5 | 4 | 3 | 2 | 1 | 0 |
|----|-----|---|---|---|---|---|---|---|---|---|---|
| Unused | | | | CRCO[9:1] | | | | | | | |

Default Value & Read / Write Access:

| 0 | X | X | X | X | X | X | X | X | X |
|---|---|---|---|---|---|---|---|---|---|
| R | R | R | R/W | R/W | R/W | R/W | R/W | R/W | R/W |

FIG._41f

Ethernet RNG Seed Register

| 31 | | | | | | | | | | 10 | | | 7 | | | | | | | | 0 |
|---|---|---|---|---|---|---|---|---|---|---|---|---|---|---|---|---|---|---|---|---|---|
| LRNG | Unused | | | | | | | | | HWD[10:8] | | | HWD[7:0] | | | | | | | | |

Default Value & Read / Write Access:

| X | X | X | X | X | X | X | 0 | 0 | 0 | X | X | X | X | X | X | X | X | X | X | X | X |
|---|---|---|---|---|---|---|---|---|---|---|---|---|---|---|---|---|---|---|---|---|---|
| R/W | R | R | R | R | R | R | R | R | R | R/W | R/W | R/W | R/W | R/W | R/W | R/W | R/W | R/W | R/W | R/W | R/W |

FIG._41g

Ethernet Transmit Control Register

| 31 | | | | | | | | | 5 | 4 | 3 | 2 | 1 | 0 |
|---|---|---|---|---|---|---|---|---|---|---|---|---|---|---|
| Unused | | | | | | | | | | RTRYL | PADEN | NOPRE | HUGEN | CRCEN |

Default Value & Read / Write Access:

| 0 | X | X | X | X | X |
|---|---|---|---|---|---|
| R | R/W | R/W | R/W | R/W | R/W |

FIG._41h

Ethernet IPG Part 1 Register

| 31 | | | | | | | 7 | 6 | 5 | 4 | 3 | 2 | 1 | 0 |
|---|---|---|---|---|---|---|---|---|---|---|---|---|---|---|
| Unused | | | | | | | | IPGR1[6:0] | | | | | | |

Default Value & Read / Write Access:

| 0 | X | X | X | X | X | X | X |
|---|---|---|---|---|---|---|---|
| R | R/W | R/W | R/W | R/W | R/W | R/W | R/W |

FIG._41i

Ethernet IPG Part 2 Register

| 31 | ... | 8 | 7 | 6 | 5 | 4 | 3 | 2 | 1 | 0 |
|---|---|---|---|---|---|---|---|---|---|---|
| Unused | | | | | IPGR2[6:0] | | | | | |

Default Value & Read / Write Access:

| | | | | 0 | | | | | | |
|---|---|---|---|---|---|---|---|---|---|---|
| R | | | | X | X | X | X | X | X | X |
| | | | | R/W | R/W | R/W | R/W | R/W | R/W | R/W |

FIG._41j

Ethernet Back To Back IPG Register

| 31 | ... | 8 | 7 | 6 | 5 | 4 | 3 | 2 | 1 | 0 |
|---|---|---|---|---|---|---|---|---|---|---|
| Unused | | | | | IPGT[6:0] | | | | | |

Default Value & Read / Write Access:

| | | | | 0 | | | | | | |
|---|---|---|---|---|---|---|---|---|---|---|
| R | | | | X | X | X | X | X | X | X |
| | | | | R/W | R/W | R/W | R/W | R/W | R/W | R/W |

FIG._41k

Ethernet Rx Statistics Vector

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| RSV[15:8] | | | | | | | | RSV[7:0] | | | | | | | |

Default Value & Read / Write Access:

| X | X | X | X | X | X | X | X | X | X | X | X | X | X | X | X |
|---|---|---|---|---|---|---|---|---|---|---|---|---|---|---|---|
| R/W | R/W | R/W | R/W | R/W | R/W | R/W | R/W | R/W | R/W | R/W | R/W | R/W | R/W | R/W | R/W |

FIG._41l

Ethernet Rx Statistics Vector

| 31 | 23 | 22 | 21 | 20 | 19 | 18 | 17 | 16 |
|---|---|---|---|---|---|---|---|---|
| Unused | | RSV[22:16] | | | | | | |

Default Value & Read / Write Access:

| 0 | X | X | X | X | X | X | X |
|---|---|---|---|---|---|---|---|
| R | R/W | R/W | R/W | R/W | R/W | R/W | R/W |

FIG._41m

Ethernet Tx Statistics Vector

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| TSV[15:8] | | | | | | | | TSV[7:0] | | | | | | | |

Default Value & Read / Write Access:

| X | X | X | X | X | X | X | X | X | X | X | X | X | X | X | X |
|---|---|---|---|---|---|---|---|---|---|---|---|---|---|---|---|
| R/W | R/W | R/W | R/W | R/W | R/W | R/W | R/W | R/W | R/W | R/W | R/W | R/W | R/W | R/W | R/W |

FIG._41n

Ethernet Tx Statistics Vector

| 31 | 28 | 27 | 26 | 25 | 24 | 23 | 22 | 21 | 20 | 19 | 18 | 17 | 16 |
|---|---|---|---|---|---|---|---|---|---|---|---|---|---|---|
| Unused | | TSV[27:24] | | | | TSV[23:16] | | | | | | | |

Default Value & Read / Write Access:

| 0 | X | X | X | X | X | X | X | X | X | X | X | X |
|---|---|---|---|---|---|---|---|---|---|---|---|---|
| R | R/W | R/W | R/W | R/W | R/W | R/W | R/W | R/W | R/W | R/W | R/W | R/W |

FIG._41o

Ethernet Rx Interrupt Register

| 31 | 8 | 7 | 2 | 1 | 0 |
|---|---|---|---|---|---|
| Unused | | | | | RxInt |

Default Value & Read / Write Access:

| 0 | X |
|---|---|
| R | R |

FIG._41p

SWAN Configuration Register

| 31 | 8 | 7 | 6 | 5 | 4 | 3 | 2 | 1 | 0 |
|---|---|---|---|---|---|---|---|---|---|
| Unused | | TxClkSel[1:0] | | RxClkSel[1:0] | | BRG_RefSel | RTS_Timer | Loop Back | Async |

Default Value & Read / Write Access:

| 0 | 00 | 00 | 0 | 0 | 0 | 0 |
|---|---|---|---|---|---|---|
| R | R/W | R/W | R/W | R/W | R/W | R/W |

FIG._44a

SWAN Baud Rate Generator Register

| 31 | 21 | 20 | 19 | 0 |
|---|---|---|---|---|
| Unused | | BRG_PS | BRG_Cnt[19:0] | |

Default Value & Read / Write Access:

| 0 | 0 | 0 |
|---|---|---|
| R | R/W | R/W |

FIG._45a

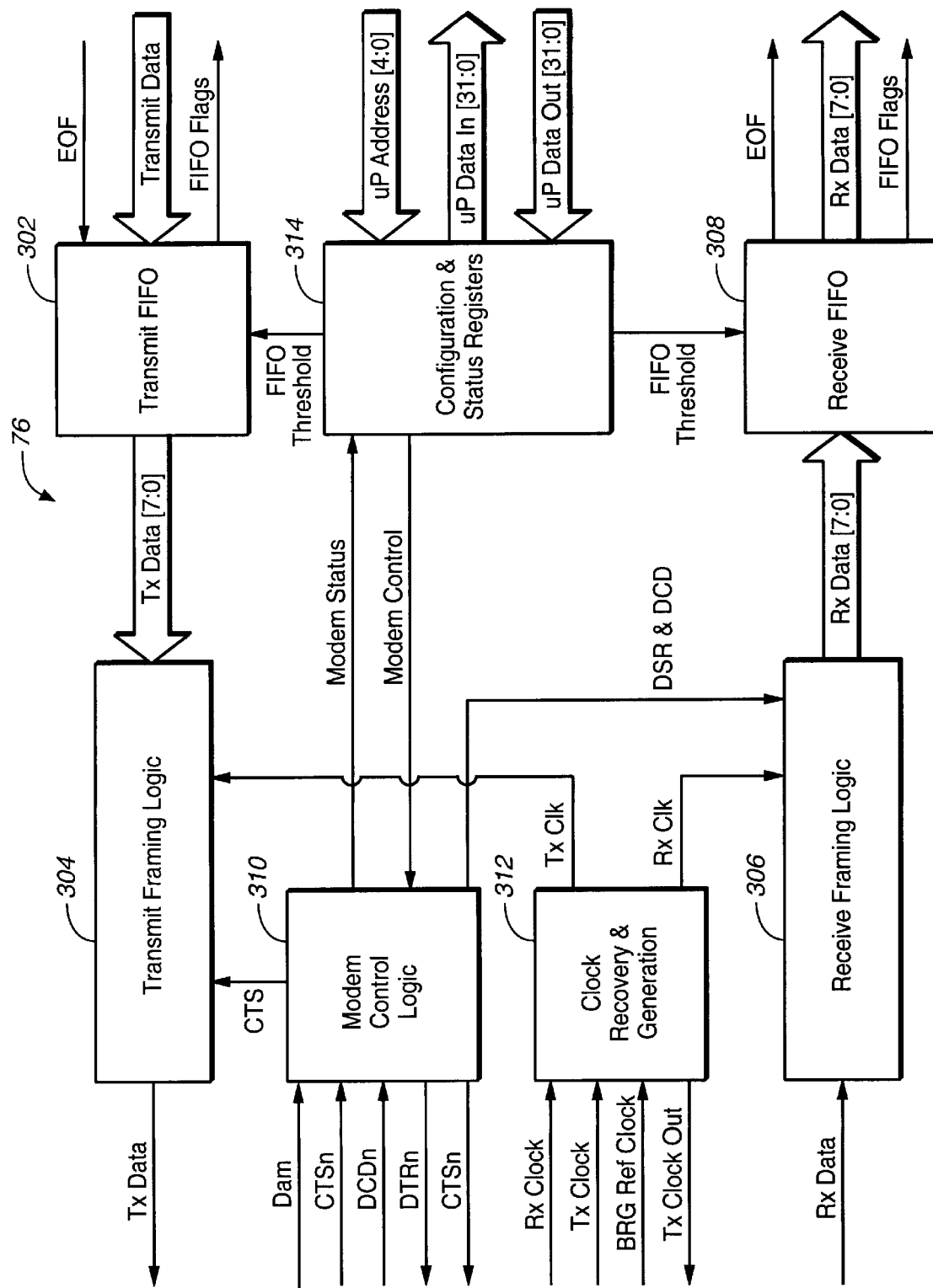
FIG._42

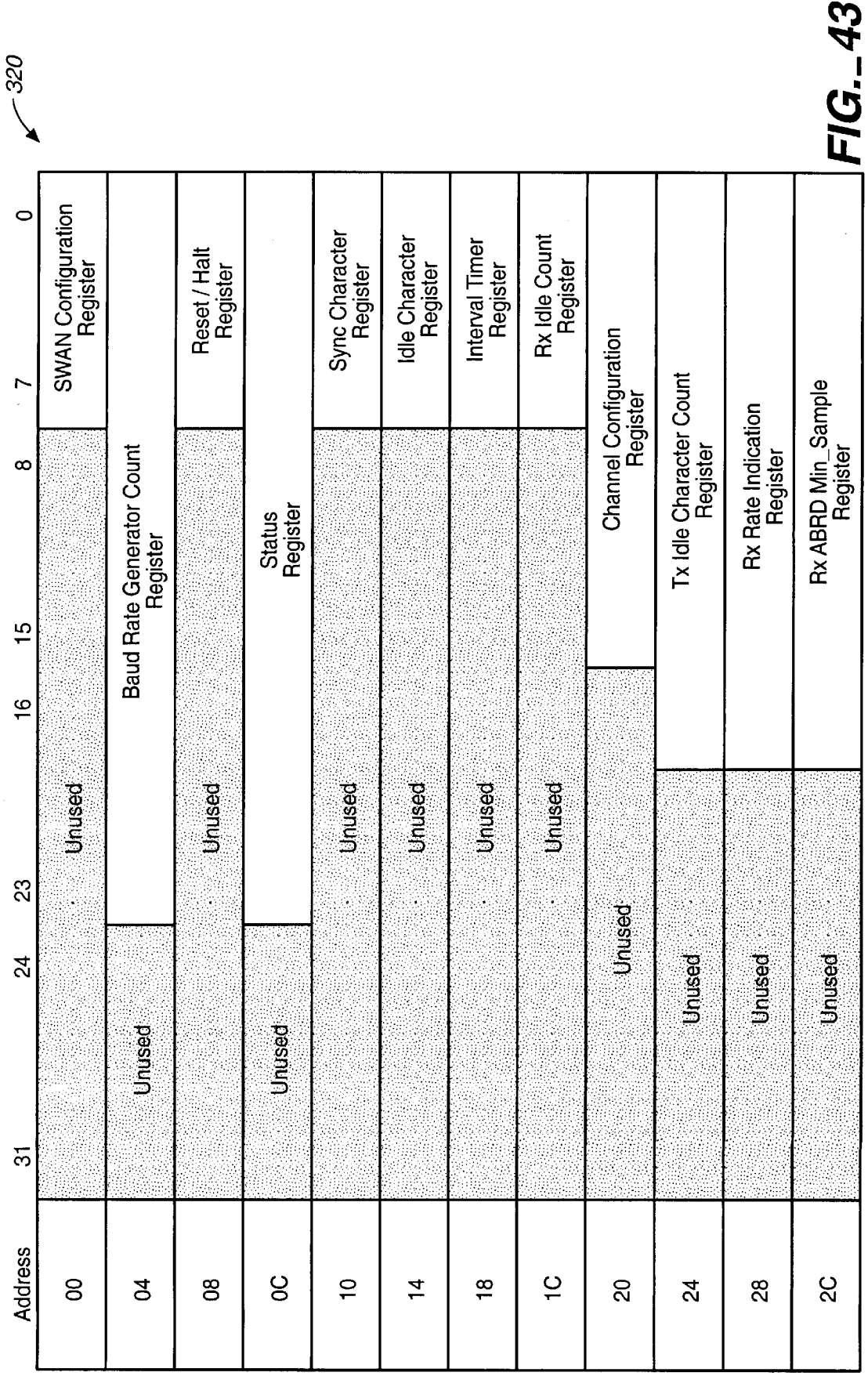
FIG._43

| Name | Bit Position | Description |
|---|---|---|
| TxClkSel[1:0] | 7-6 | Transmit Clock Select<br>00 selects RX_CLK input pin<br>01 selects Baud Rate Generator rate divided by 16<br>10 selects TX_CLKI input pin<br>11 selects no clock (low power mode) |
| RxClkSel[1:0] | 5-4 | Receive Clock Select<br>00 selects RX_CLK input pin<br>01 selects Baud Rate Generator rate divided by 16<br>10 selects DPLL<br>11 selects no clock (low power mode) |
| BRG_RefSel | 3 | Baud Rate Generator Reference Clock Select<br>0 selects BRG_CLK input pin<br>1 selects System Clock |
| RTS_Timer | 2 | RTS Deactivation Timer Enable<br>0 selects interval timer mode, an expiring count generates interval timer interrupt.<br><br>1 selects RTS deactivation mode, RTS is deasserted when interval count expires following end of frame transmission. |
| LoopBack | 1 | Loopback Mode<br>0 disables loopback<br>1 selects data loopback of serial transmit data to serial receive data. |
| Async | 0 | Asynchronous Mode<br>0 selects synchronous mode (HDLC, PPP, Bisync)<br>1 selects start-stop mode |

*FIG._44b*

| Name | Bit Position | Description |
|---|---|---|
| BRG_PS | 20 | Baud Rate Generator Reference Clock Prescalar<br>0 = BRG counts at same rate as BRG reference clock<br>1 = BRG reference clock divided by 16 |
| BRG_Cnt[19:0] | 19-0 | Baud Rate Generator Count<br>The 20-bit value used to specify the 16 X sample rate for start/stop and the DPLL. The BRG is further divided by 16 to generate TxClk and RxClk if selected in the SWAN Configuration Register. When BRG_Cnt = 0, the baud rate generator is idle. |

FIG._45b

| Name | Bit Position | Description |
|---|---|---|
| TxHalt | 2 | Halt Transmit<br>When set, TxHalt resets the transmit state machines and marks the serial transmit data. This bit must be cleared to reactivate transmission. When cleared, the transmitter enters the idle state. The duration TxHalt is set should guarantee far end receiver recognizes abort of an active frame. |
| RxHalt | 1 | Halt Receive<br>When set, RxHalt resets the receive state machines and holds the receiver in an idle state. No interrupts are generated due to aborted frames. When RxHalt is cleared, the receiver enters the look for preamble or look for sync state, depending on configuration. The minimum duration Rxhalt must be set is 2 bit times. |
| Reset | 0 | SWAN Reset<br>When set, Reset generates a global reset to SWAN controller. All registers are set to their default values, the transmitter and receiver are held in an idle state. Serial transmit data is held in a mark state. When cleared, the receiver enters the look for preamble/sync state and the transmitter enters the idle state. The minimum duration of Reset assertion is one system clock time. |

FIG._46b

SWAN Reset / Halt Register

| 31 | | 3 | 2 | 1 | 0 |
|---|---|---|---|---|---|
| Unused | | | TxHalt | RxHalt | Reset |

Default Value & Read / Write Access:

| | | 1 | 1 | 0 |
|---|---|---|---|---|
| 0 | | R/W | R/W | R/W |
| R | | | | |

FIG._46a

SWAN Status Register (Bits 15-0)

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| Unused | | Break_Det | DTR | RTS | DSR | CTS | DCD | Rx_Idle | DSR_Int | CTS_Int | DCD_Int | Intvl_Timeout | Tx_Err | Tx_Urun | Rx_Orun |

Default Value & Read / Write Access:

| 00 | | 0 | 0 | 0 | X | X | X | 0 | 0 | 0 | 0 | 0 | 0 | 0 | 0 |
|---|---|---|---|---|---|---|---|---|---|---|---|---|---|---|---|
| R | | R | R/W | R/W | R | R | R | R | R/W | R/W | R/W | R/W | R/W | R/W | R/W |

FIG._47a

SWAN Status Register (Bits 31-16)

| 31 | | 23 | 22 | 21 | 20 | 19 | 18 | 17 | 16 |
|---|---|---|---|---|---|---|---|---|---|
| Unused | | DSR_IntEn | CTS_IntEn | DCD_IntEn | Unused | DSR_IntCnd | CTS_IntCnd | DCD_IntCnd |

Default Value & Read / Write Access:

| 0 | | 0 | 0 | 0 | 0 | 0 | 0 | 0 | 0 |
|---|---|---|---|---|---|---|---|---|---|
| R | | R/W | R/W | R/W | R/W | R | R/W | R/W | R/W |

FIG._48a

| Name | Bit Position | Description |
|---|---|---|
| Break_Det | 13 | Break Detect<br>Break_Det indicates break was received in start stop protocol. Break_Det is set when a missing stop bit is received and cleared when the recieve data transitions high. |
| DTR | 12 | Data Terminal Ready<br>This bit provides software control of the DTR output signal. When DTR is set, the DTR output signal is asserted high. |
| RTS | 11 | Request to Send<br>This bit allows direct software control of the RTS lead when the Ignore_CTS bit is set in the SWAN Channel Configuration Register (bit7). |
| DSR | 10 | Data Set Ready<br>DSR is the state of the DSRn input. When set, DSRn is asserted (low). The receiver remains in an idle state until both DSR and DCD are asserted. |
| CTS | 9 | Clear To Send<br>CTS is the state of the CTSn input. When set, CTSn is asserted (low). The transmitter waits until CTSn is asserted to start frame transmission. |
| DCD | 8 | Data Carrier Detect<br>DSR is the state of the DCDn input. When set, DCDn is asserted (low). The receiver remains in an idle state until both DSR and DCD are asserted. |
| Rx_Idle | 7 | Receiver Idle<br>Rx_Idle indicates the state of the receiver. In synchronous mode, Rx_idle indicates the receiver is in the look for preamble or look for sync states. In asynchronous mode, Rx_Idle indicates the receiver is in the look for start bit state. |
| DSR_Int | 6 | Data Set Ready Interrupt<br>DSR_Int is the state of the DSR interrupt. A DSR interrupt is generated when the condition specified by DSR_IntCnd is detected and the interrupt enable, DSR_IntEn, is also set. When set, DSR_Int remains set until cleared by writing a zero to this bit position. Writing a one to this bit position has no effect. |

*FIG._47b*

| Name | Bit Position | Description |
|---|---|---|
| CTS_Int | 5 | Clear To Send Interrupt<br>CTS_Int is the state of the CTS interrupt. A CTS interrupt is generated when the condition specified by CTS_IntCnd is detected and the interrupt enable, CTS_IntEn, is also set. When set, CTS_Int remains set until cleared by writing a zero to this bit position. Writing a one to this bit position has no effect. |
| DCD_Int | 4 | Data Carrier Detect Interrupt<br>DCD_Int is the state of the DCD interrupt. A DCD interrupt is generated when the condition specified by DCD_IntCnd is detected and the interrupt enable, DCD_IntEn, is also set. When set, DCD_Int remains set until cleared by writing a zero to this bit position. Writing a one to this bit position has no effect. |
| Intvl_Timeout | 3 | Interval Timer Expiration<br>Intvl_Timeout indicates the interval timer expired when not in RTS Timer mode (refer to SWAN Configuration Register, bit 2). When set, Intvl_Timeout remains set until cleared by writing a zero to this bit position. Writing a one to this bit position has no effect. |
| Tx_Err | 2 | Transmit Error<br>The Tx_Err interrupt indicates CTS went inactive while the transmitter was actively transmitting a frame. |
| Tx_Urun | 1 | Transmit Underrun<br>Tx_Urun indicates the transmit FIFO went empty without End Of Frame being set. When set, Tx_Urun remains set until cleared by writing a zero to this bit position. Writing a one to this bit position has no effect. |
| Rx_Orun | 0 | Receive Overrun<br>Rx_Orun indicates the receive FIFO overflowed during frame reception. When set, Rx_Orun remains set until cleared by writing a zero to this bit position. Writing a one to this bit position has no effect. |

FIG._47c

| Name | Bit Position | Description |
| --- | --- | --- |
| DSR_IntEn | 22 | Data Set Ready Interrupt Enable<br>DSR_IntEn, when set, enables the DSR interrupt. |
| CTS_IntEn | 21 | Clear To Send Interrupt Enable<br>CTS_IntEn, when set, enables the CTS interrupt. |
| DCD_IntEn | 20 | Data Carrier Detect Interrupt Enable<br>DCD_IntEn, when set, enables the DCD interrupt. |
| DSR_IntCnd | 18 | Data Set Ready Interrupt Condition<br>DSR_IntCnd specifies the DSR signal state which causes the DSR interrupt. |
| CTS_IntCnd | 17 | Clear To Send Interrupt Condition<br>CTS_IntCnd specifies the CTS signal state which causes the CTS interrupt. |
| DCD_IntCnd | 16 | Data Carrier Detect Interrupt Condition<br>DCD_IntCnd specifies the DCD signal state which causes the DCD interrupt. |

*FIG._48b*

| Name | Bit Position | Description |
| --- | --- | --- |
| Sync_Char | 7-0 | Sync Character<br>Sync_Char is the character used for frame delineation in synchronous protocols. For HDLC protocols, this byte must contain the flag character (7E). For Bisync this byte contains the first sync character. |

*FIG._49b*

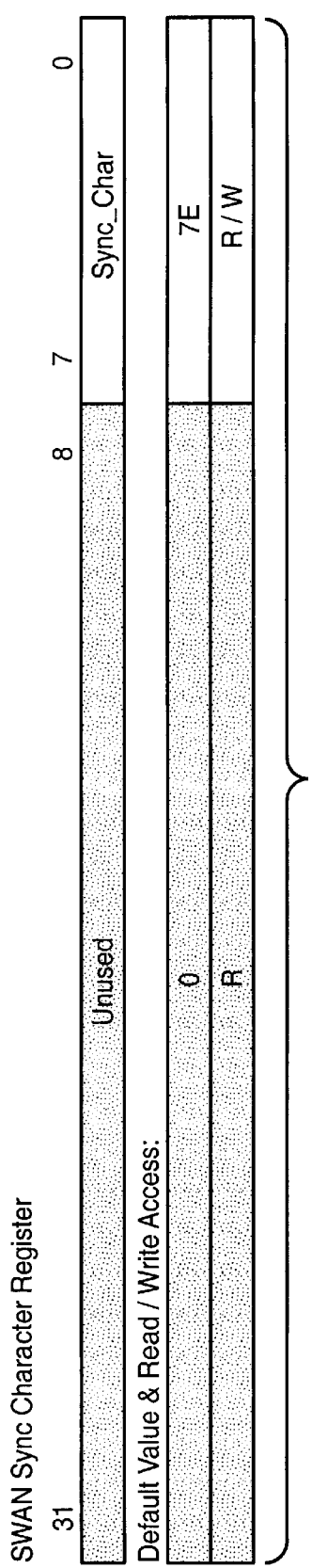
FIG._49a
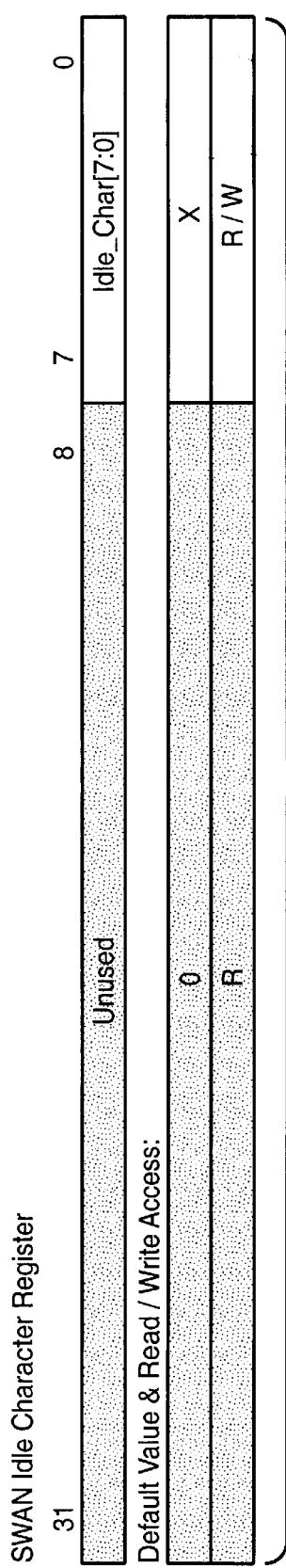
FIG._50a
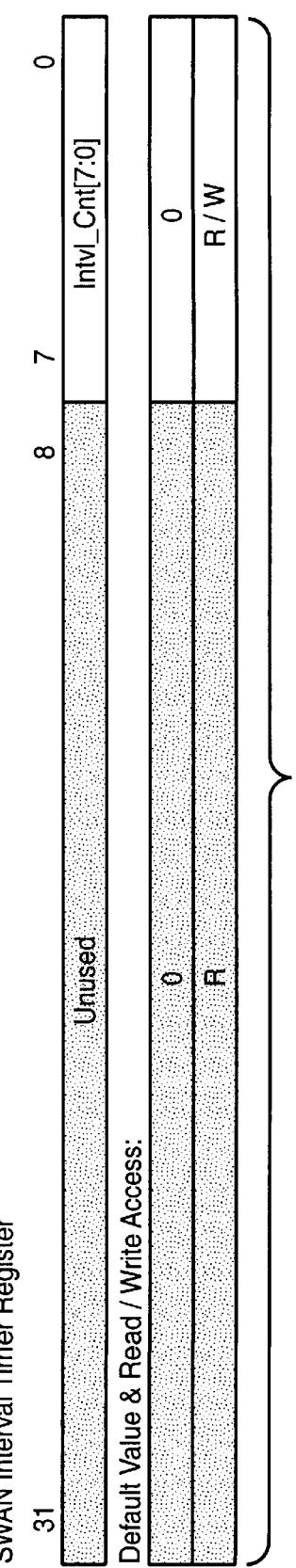
FIG._51a

| Name | Bit Position | Description |
|---|---|---|
| Idle_Char[7:0] | 7-0 | Idle Character<br>Idle_Char is the idle character transmitted between frames. For HDLC, the typical idle characters are 7E or FF. HDLC one's insertion is disabled when idle characters are transmitted.<br><br>On receive, idle characters are suppressed following an end of frame character. |

FIG._50b

| Name | Bit Position | Description |
|---|---|---|
| Intvl_Cnt[7:0] | 7-0 | Interval Timer Count<br>When in RTS Deactivation Mode, Intvl_Cnt specifies the number of transmit clock periods following end of frame prior to RTS deassertion. When RTS Deactivation Mode is disabled (refer to SWAN Configuration Register, bit 2), Intvl_Cnt specifies the number of transmit bit times before an interval timer interrupt is generated. The interval timer remains idle when expires, or when set to the value 0. |

FIG._51b

| Name | Bit Position | Description |
|---|---|---|
| Idle_Cnt[7:0] | 7-0 | Idle Count<br>Idle_Cnt[7:0] specifies the number of consecutive one bits required before EOF is generated by the receiver in start stop protocol. |

FIG._52b

SWAN Idle Count Register

| 31 | | 8 | 7 | | 0 |
|---|---|---|---|---|---|
| | Unused | | | Intvl_Cnt[7:0] | |

Default Value & Read / Write Access:

| 0 | 0 |
|---|---|
| R | R/W |

FIG._52a

SWAN Channel Configuration Register

| 31-15 | 14 | 13 12 | 11 | 10 | 9 | 8 | 7 | 6 | 5 | 4 | 3 | 2 | 1 | 0 |
|---|---|---|---|---|---|---|---|---|---|---|---|---|---|---|
| | Tx_Pre_En | Line_Code[1:0] | Tx_Mark | Tx_Break | Unused | CRC_Sel | Ignore_CTS | Unused | Ignore_DCD | Tx_CRC | Cntl1 | Cntl2 | Cntl3 | Cntl4 |

Default Value & Read / Write Access:

| 0 | 0 | 00 | 1 | 0 | 0 | 0 | 0 | 0 | 0 | 1 | 0 | 1 | 0 | 0 |
|---|---|---|---|---|---|---|---|---|---|---|---|---|---|---|
| R | R/W | R/W | R/W | R/W | R | R/W | R/W | R | R/W | R/W | R/W | R/W | R/W | R/W |

FIG._53a

SWAN Channel Pacing Register

| 31 | | 17 | 16 | | 0 |
|---|---|---|---|---|---|
| | Unused | | | Idle_Cnt[16:0] | |

Default Value & Read / Write Access:

| 0 | 001 |
|---|---|
| R | R/W |

FIG._54a

| Name | Bit Position | Description |
|---|---|---|
| Tx_PreEn | 14 | Transmit Preamble Enable<br>Tx_PreEn enables transmission of preamble prior to start of frame. |
| Line_Code[1:0] | 13-12 | Line Code Select<br>00 = Non Return to Zero (NRZ)<br>01 = Non return to Zero Inverted (NRZI)<br>10 = Manchester (FM0)<br>11 = Manchester (FM1) |
| Tx_Mark | 11 | Transmit Mark<br>Tx_Mark forces the transmit data to be set to a high level independent of line coding. |
| Tx_Break | 10 | Transmit Break<br>When set, Tx_Break forces the transmit data to a 0. When Tx_Break is cleared, the transmit data will return to the idle state. This bit is used to force break transmission for start stop protocol. |
| CRC_Sel | 8 | CRC Polynomial Select<br>0 = CRC-CCITT<br>1 = CRC-32 |
| Ignore_CTS | 7 | Ignore CTS<br>When set, the transmit state machine ignores the Clear To Send signal and transfers data as soon as it is available in the transmit FIFO. Also RTS is not automatically asserted. RTS is software controlled by Status Register bit 11.<br>When clear, the transmitter will not initiate transmission until CTS is asserted and will generate Tx_Err if CTS is deasserted prior to an End of Frame. |
| Ignore_DCD | 5 | Ignore DCD<br>When set, the receive state machine ignores Data Carrier Detect. |
| Tx_CRC | 4 | Transmit CRC Enable<br>Tx_CRC enables CRC generation on transmit frames. |

*FIG._53b*

| Name | Bit Position | Description |
|---|---|---|
| Cntl3 | 3 | Protocol Control 3<br>The definition of Cntl3 is protocol dependent. For asynchronous (start/stop) mode Cntl 3 specifies parity polarity.<br>0 = odd parity<br>1 = even parity<br><br>For synchronous mode, Cntl3 enables octet stuffing for PPP character transparency mode.<br>0 = octet stuffing disabled<br>1 = octet stuffing enabled |
| Cntl2 | 2 | Protocol Control 2<br>The definition of Cntl2 is protocol dependent. For asynchronous (start/stop) mode Cntl2 enables parity bit insertion/checking.<br>0 = parity generation/checking disabled<br>1 = parity generation/checking enabled<br><br>For synchronous mode, Cntl2 enables zero bit insertion and deletion for HDLC frames.<br>0 = zero insertion/deletion disabled<br>1 = zero insertion/deletion enabled |
| Cntl1 | 1 | Protocol Control 1<br>The definition of Cntl1 is protocol dependent. For asynchronous (start/stop) mode Cntl1 selects the number of bits per character.<br>0 = 7 bits<br>1 = 8 bits<br><br>For synchronous mode, Cntl1 selects transparent (no framing) mode.<br>0 = Transparency disabled<br>1 = Transparency enabled |
| Cntl0 | 0 | Protocol Control 0<br>The definition of Cntl0 is protocol dependent. For asynchronous (start/stop) mode Cntl0 selects the number of stop bits.<br>0 = 2 stop bits<br>1 = 1 stop bit<br><br>For synchronous mode, Cntl0 specifies the number of sync characters.<br>0 = 0 sync character<br>1 = 1 sync characters |

FIG._53c

| Name | Bit Position | Description |
|---|---|---|
| Idle_Cnt[16:0] | 16-0 | Idle Character Count Value<br>Idle_Cnt[16:0] specifies the minimum number of characters between successive transmit frames. When Idle_Cnt[16:0] = 0x000, the transmitter will share trailing and leading flags on back to back frames. When Idle_Cnt[16:0] = 0x001, separate trailing and leading flags will be transmitted on successive frames. When Idle_Cnt is greater than 0x001, Idle_cnt-1 idle characters are transmitted between trailing and leading flags. |

FIG._54b

| Name | Bit Position | Description |
|---|---|---|
| Rate_Ind[15:0] | 15-0 | Rate Indication Count<br>Rate_Ind[15:0] indicates the number of Rx_Clk periods sampled in 65,536 cycles of the Baud Rate Generator clock.<br>Rate_Ind[15:0] is a saturating counter that resets and samples the Rx_Clk each time it is read. |

FIG._55b

| Name | Bit Position | Description |
|---|---|---|
| Rx_Full [7:0] | 23-16 | Receive FIFO Almost Full Threshold<br>Rx_Full specifies the minimum number of bytes in the receive FIFO when the SWAN will assert the Rx FIFO almost full flag to the DMA controller. |
| Tx_Empty[7:0] | 15-8 | Transmit FIFO Almost Empty Threshold<br>Tx_Empty specifies the maximum number of bytes in the transmit FIFO when the SWAN will assert the Tx FIFO almost full flag to the DMA controller. |
| Tx_Start[7:0] | 7-0 | Transmit FIFO Start Threshold<br>Tx_Start specifies the minimum number of bytes in the transmit FIFO when the SWAN will initiate frame transmission. |

FIG._56b

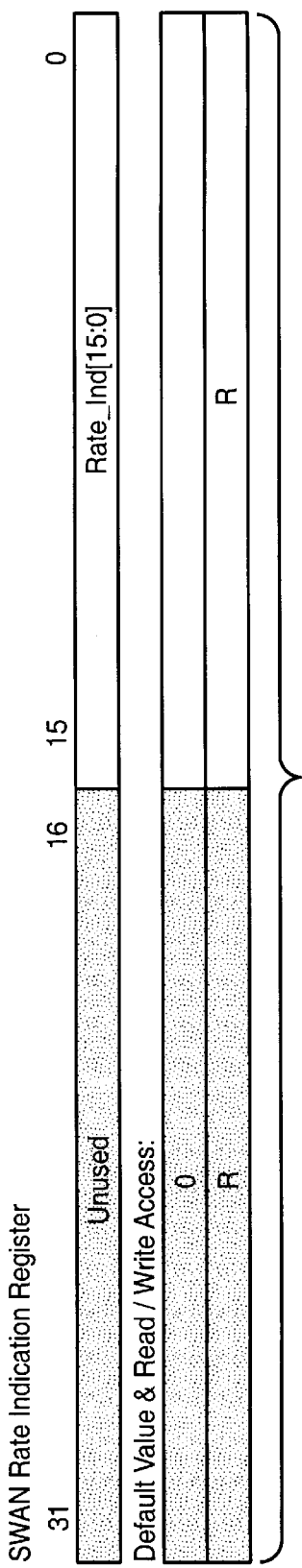
FIG._55a
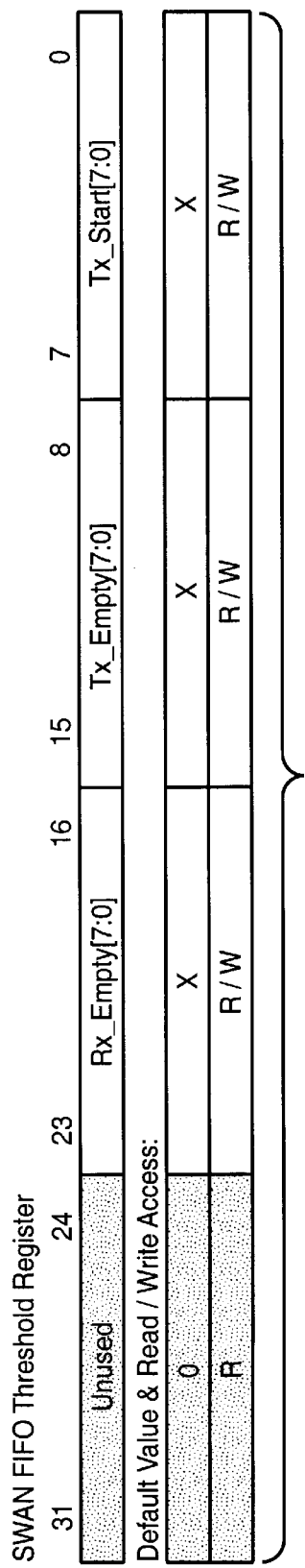
FIG._56a
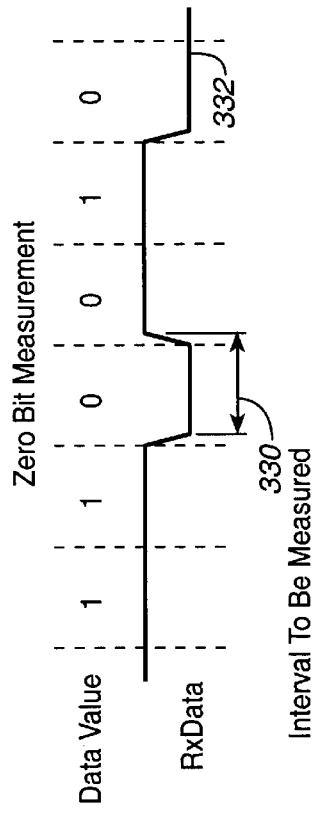
FIG._57

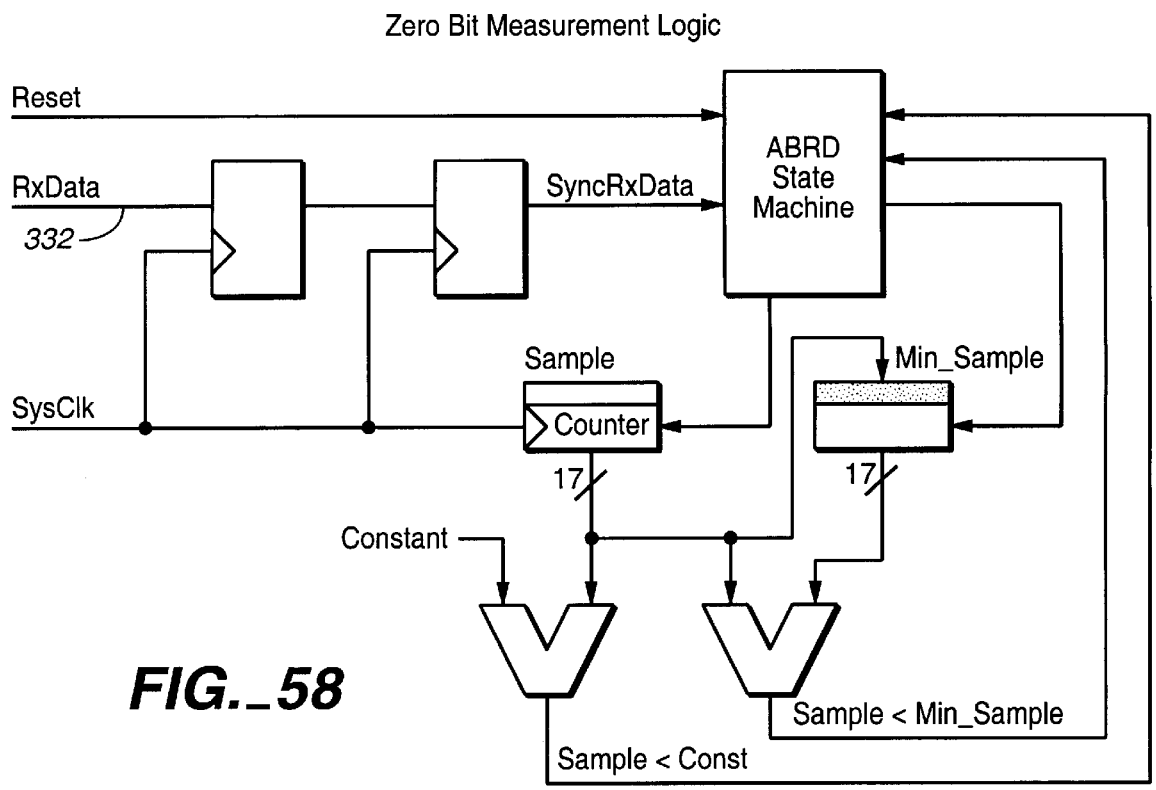
FIG._58  Zero Bit Measurement Logic
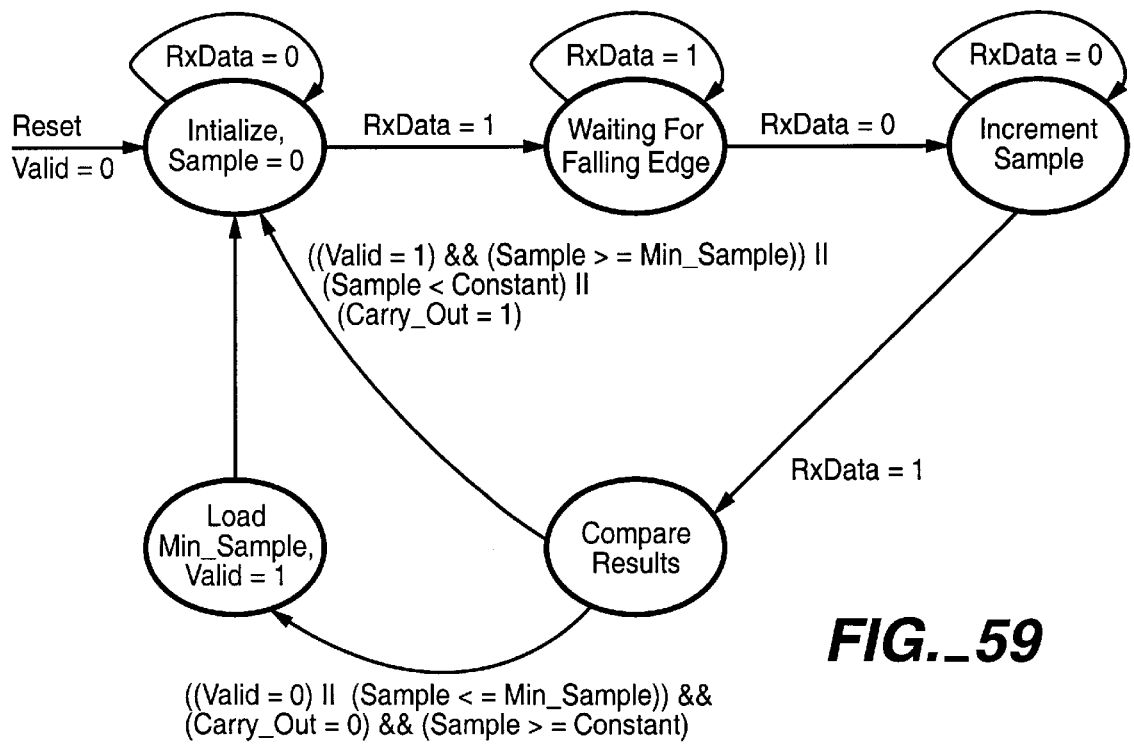
FIG._59

| Min_Sample Value (Dec) | Min_Sample Value (Hex) | System Clock Rate (MHz) | Measured Baud Rate |
|---|---|---|---|
| 41,666 | A2C2 | 50 | 1200.019 |
| 66,666 | 1046A | 80 | 1200.012 |
| 5208 | 1458 | 50 | 9600.614 |
| 8333 | 208D | 80 | 9600.384 |
| 2604 | A2C | 50 | 19201.229 |
| 4166 | 1046 | 80 | 19203.072 |
| 1302 | 516 | 50 | 38402.458 |
| 2083 | 823 | 80 | 38406.145 |
| 868 | 364 | 50 | 57603.687 |
| 1388 | 56C | 80 | 57636.888 |
| 434 | 1B2 | 50 | 115207.373 |
| 695 | 2B6 | 80 | 115107.913 |
| 111 | 6F | 50 | 450450.450 |
| 177 | B1 | 80 | 451977.401 |

*FIG. _60*

| SPI1SEL1 | SPI1SEL0 | WAN Port |
|---|---|---|
| 0 | 0 | None - Power Down Mode |
| 0 | 1 | TSM #1 |
| 1 | 0 | TSM #2 |
| 1 | 1 | External Signal Pins |

*FIG. _63a*

| SPI2SEL1 | SPI2SEL0 | WAN Port |
|---|---|---|
| 0 | 0 | None - Power Down Mode |
| 0 | 1 | TSM #1 |
| 1 | 0 | TSM #2 |
| 1 | 1 | Not Defined |

*FIG. _63b*

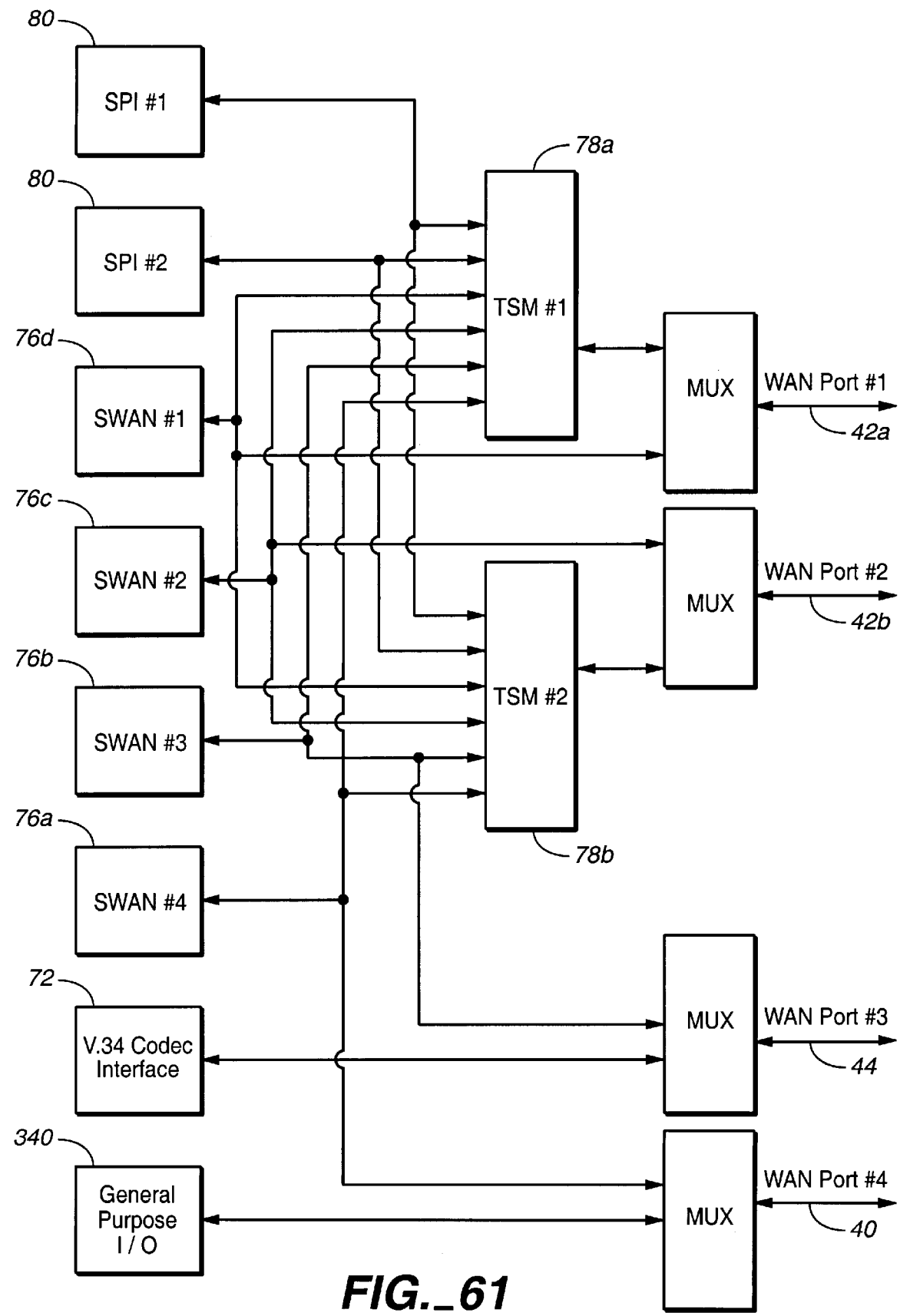
FIG._61

WAN Port Configuration Register

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| | | | | SPI1SEL [1:0] | | SPI2SEL [1:0] | | SWAN1SEL [1:0] | | SWAN2SEL [1:0] | | SWAN3SEL [1:0] | | SWAN4SEL [1:0] | |

Default Value & Read / Write Access:

| 0 | 0 | 0 | 0 | 0 | 0 | 0 | 0 | 0 | 0 | 0 | 0 | 0 | 0 | 0 | 0 |
|---|---|---|---|---|---|---|---|---|---|---|---|---|---|---|---|
| R | R | R | R | R/W | R/W | R/W | R/W | R/W | R/W | R/W | R/W | R/W | R/W | R/W | R/W |

FIG._62

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| CHEN | XTR | STRB | | | CH#[2:0] | | | CNT[7:0] | | | | | | | |

Default Value & Read / Write Access:

| X | X | X | X | X | X | X | X | X | X | X | X | X | X | X | X |
|---|---|---|---|---|---|---|---|---|---|---|---|---|---|---|---|
| R/W | R/W | R/W | R | R | R/W | R/W | R/W | R/W | R/W | R/W | R/W | R/W | R/W | R/W | R/W |

FIG._64

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| | | | Unused | | | | TSME | 1CLK | 2XCLK | CLKP | FSP | RFSD[1:0] | | TFSD[1:0] | |

Default Value & Read / Write Access:

| X | X | X | X | X | X | X | X | 0 | 0 | 0 | 0 | 0 | 0 | 0 | 0 |
|---|---|---|---|---|---|---|---|---|---|---|---|---|---|---|---|
| R/W | R/W | R/W | R/W | R/W | R/W | R/W | R/W | R/W | R/W | R/W | R/W | R/W | R/W | R/W | R/W |

FIG._65

| SWANnSEL1 | SWANnSEL0 | WAN Port |
|---|---|---|
| 0 | 0 | None - Power Down Mode |
| 0 | 1 | TSM #1 |
| 1 | 0 | TSM #2 |
| 1 | 1 | External Signal Pins |
*FIG._63c*
| RFSD1 | RFSD0 | Delay |
|---|---|---|
| 0 | 0 | 0 Clocks (Frame Starts When Sync Asserted) |
| 0 | 1 | 1 Clocks |
| 1 | 0 | 2 Clocks |
| 1 | 1 | 3 Clocks |
*FIG._66*
| TFSD1 | TFSD0 | Delay |
|---|---|---|
| 0 | 0 | 0 Clocks (Frame Starts When Sync Asserted) |
| 0 | 1 | 1 Clocks |
| 1 | 0 | 2 Clocks |
| 1 | 1 | 3 Clocks |
*FIG._67*
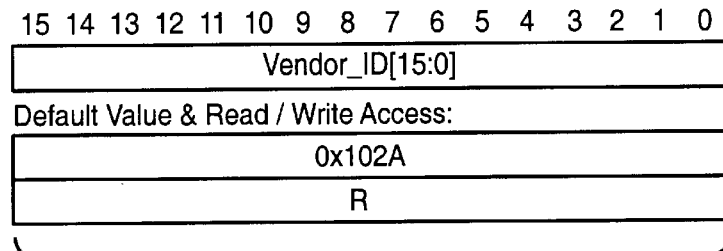
*FIG._69a*
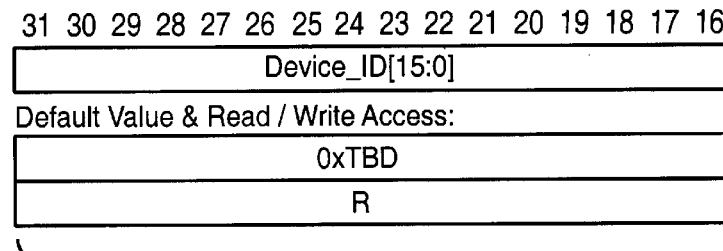
*FIG._70a*

|      | 31 | 16 | 15 | 0 |
|------|----|----|----|---|
| 0x00 | Device ID | | Vendor ID | |
| 0x04 | Status | | Command | |
| 0x08 | Class Code | | | Revision ID |
| 0x0c | BIST | Header Type | Latency Timer | Cache Line Size |
| 0x10 | Base Address Register 1 | | | |
| 0x14 | Base Address Register 2 | | | |
| 0x18 | Base Address Register 3 | | | |
| 0x1c | Base Address Register 4 | | | |
| 0x20 | Base Address Register 5 | | | |
| 0x24 | Base Address Register 6 | | | |
| 0x28 | Cardbus CIS Pointer | | | |
| 0x2c | Subsystem ID | | Subsystem Vendor ID | |
| 0x30 | Expansion ROM Base Address | | | |
| 0x34 | Reserved | | | |
| 0x38 | Reserved | | | |
| 0x3c | Max Latency | Min Grant | Interrupt Pin | Interrupt Line |

FIG._68

| Name | Bit Position | Description |
|---|---|---|
| Vendor_ID[15:0] | 15:0 | LSI Logic's Vendor ID as specified by the PCI Special Interest Group is 0x102A |

FIG._69b

| Name | Bit Position | Description |
|---|---|---|
| Device_ID[15:0] | 31:16 | The RAP Chip has a PCI device ID of 0xTBD. |

FIG._70b

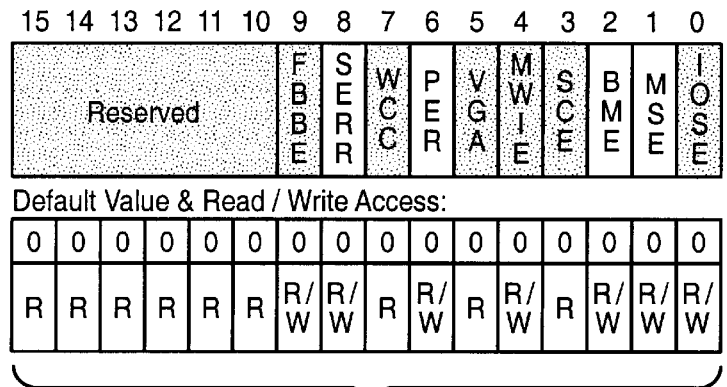

FIG._71a

| Name | Bit Position | Description |
|---|---|---|
| Reserved | 15:10 | Reserved Bits. |
| FBBE | 9 | Fast Back to Back Enable - The RAP will not master fast back to back transactions. |
| SERR | 8 | System Error Enable - SERR enables assertion of PCI_SERRn (SERR#) when an address parity error is detected. PER (bit 6) must also be set to enable parity detection. |
| WCC | 7 | Wait Cycle Control - The RAP does not support address/data stepping. This bit should remain set to 0. |

FIG._71b

| Name | Bit Position | Description |
|---|---|---|
| PER | 6 | Parity Error Response - PER enables detection of PCI address and data parity errors. When set, the RAP will assert the PCI_SERRn pin when an address parity error is detected and SERR (bit 8) is set. PCI data parity errors detected during Master Read or Slave Write transfers will cause assertion of the PCI_PERRn (PERR#) pin. PER enables generation of CPU exceptions when data parity errors are detected. |
| VGA | 5 | VGA Palette Snoop - Not used. This bit should remain set to 0. |
| MWIE | 4 | Memory Write & Invalidate Enable - Memory Write and Invalidate not supported. This bit should remain set to 0. |
| SCE | 3 | Special Cycle Enable - Special cycles are not supported. This bit should remain set to 0 |
| BME | 2 | Bus Master Enable - When MSE is clear, the RAP will not request the PCI bus. The RAP will respond to slave transactions. |
| MSE | 1 | Memory Space Enable - MSE enables the RAP to respond to slave transactions targeting the memory space selected by Base Address Register 1 or Base Address Register 2 |
| IOSE | 0 | I/O Space Enable - The RAP does not use I/O Space. This bit should remain set to 0 |

FIG._71c

| 31 | 30 | 29 | 28 | 27 | 26 25 | 24 | 23 | 22 | 21 | 20 19 18 17 16 |
|---|---|---|---|---|---|---|---|---|---|---|
| DPE | SSE | RMA | RTA | STA | DEV SEL [1:0] | DPED | FBBC | UDFS | 66MC | Reserved |

Default Value & Read / Write Access:

| 0 | 0 | 0 | 0 | 0 | 0 | 0 | 0 | 1 | 0 | 0 | 0 | 0 | 0 | 0 |
|---|---|---|---|---|---|---|---|---|---|---|---|---|---|---|
| R/W | R/W | R/W | R/W | R | R | R | R/W | R | R | R | R | R | R | R |

FIG._72a

| Name | Bit Position | Description |
|---|---|---|
| DPE | 31 | Detected Parity Error - DPE is set when address or data parity errors are detected, independent of the parity enable bits in the Command Register. |
| SSE | 30 | Signaled System Error - SSE is set when the RAP asserts the PCI_SERRn (SERR#) pin |
| RMA | 29 | Received Master Abort - RMA is set when the RAP terminates a transfer with Master Abort. This condition will occur if PCI_DEVSELn is not returned within 6 PCI clocks from the time the RAP asserts PCI_FRAMEn during Master Read or Master Write transactions. |
| RTA | 28 | Received Target Abort - The RAP will set RTA when a Master Read or Master Write transaction is terminated by a Target Abort. |
| STA | 27 | Signal Target Abort - The RAP will not signal target abort. The STA bit will always be 0. |
| DEVSEL[1:0] | 26:25 | DEVSEL Timing - DEVSEL[1:0] specifies the maximum number of PCI cycles required for the RAP to generate PCI_DEVSELn in response to PCI_FRAMEn during Slave Read/Write transactions. DEVSEL[1:0] is hardwired to 0b01 for medium timing. |
| DPED | 24 | Data Parity Error Detected - DPED is set when the RAP detects PCI_PERRn during Master Read or master Write transactions and the Parity Error Response bit is set in the Command Register (bit 6). |
| FBBC | 23 | Fast Back-to-Back Capable - The RAP is Fast Back-to-Back capable. This bit will always be 1. |
| UDFS | 22 | UDF Supported - User Definable Features are not supported. This bit will always be 0. |
| 66MC | 21 | 66MHz Capable - The RAP does not support the 66MHz PCI bus. This bit will always be 0. |
| Reserved | 20:16 | Reserved Bits. |

*FIG._72b*

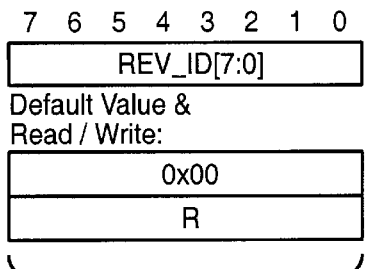

FIG._73a

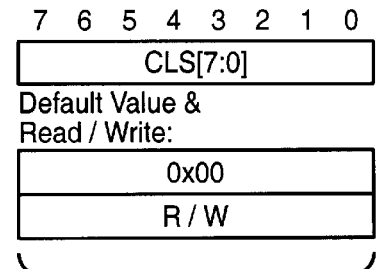

FIG._75a

| Name | Bit Position | Description |
|---|---|---|
| REV_ID | 7:0 | Revision ID - The RAP revision ID is 0x00. |

FIG._73b

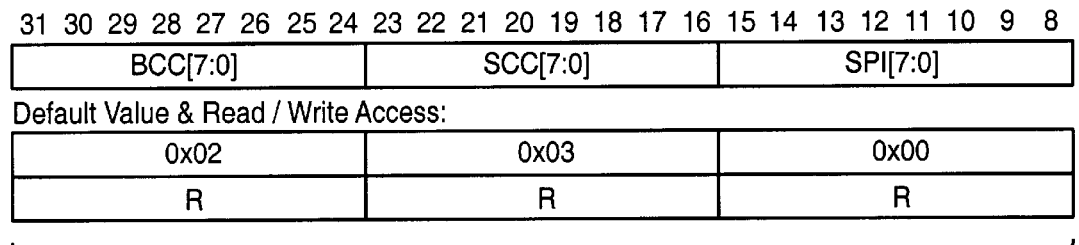

FIG._74a

| Name | Bit Position | Description |
|---|---|---|
| BCC[7:0] | 31:24 | Base Class Code - The RAP is classified as a network controller. BCC[7:0] is hardwired to 0x02. |
| SCC[7:0] | 23:16 | Sub-Class Code - The sub-class code for the RAP is 0x80, Other Controller. |
| SPI[7:0] | 15:8 | Specific Programming Interface - There are no specific programming interfaces defined for network controllers. SPI[7:0] will always be 0x00. |

FIG._74b

| Name | Bit Position | Description |
|---|---|---|
| CLS[7:0] | 7:0 | Cache Line Size - CLS[7:0] specifies the number of 32-bit words in the system cache line. The RAP uses CLS[7:0] to determine whether to issue Memory Read or Memory Read Line commands on Master read transactions. |

FIG._75b

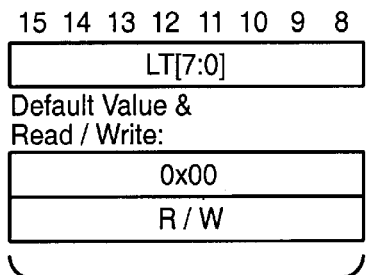

FIG._76a

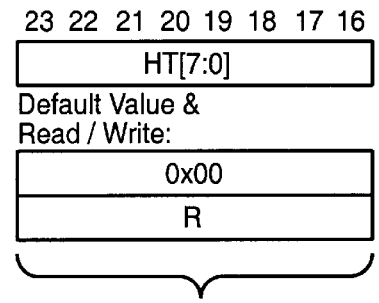

FIG._77a

| Name | Bit Position | Description |
|---|---|---|
| LT[7:0] | 15:8 | Latency Timer Value - LT[7:0] specifies the maximum number of PCI clocks that the RAP may retain bus ownership after PCI_GNTn is deasserted on Master read and write transfers. |

FIG._76b

| Name | Bit Position | Description |
|---|---|---|
| HT[7:0] | 23:16 | Header Type - HT[7:0] is hardwired to 0x00, indicating the RAP supports type 0 configuration space accesses. |

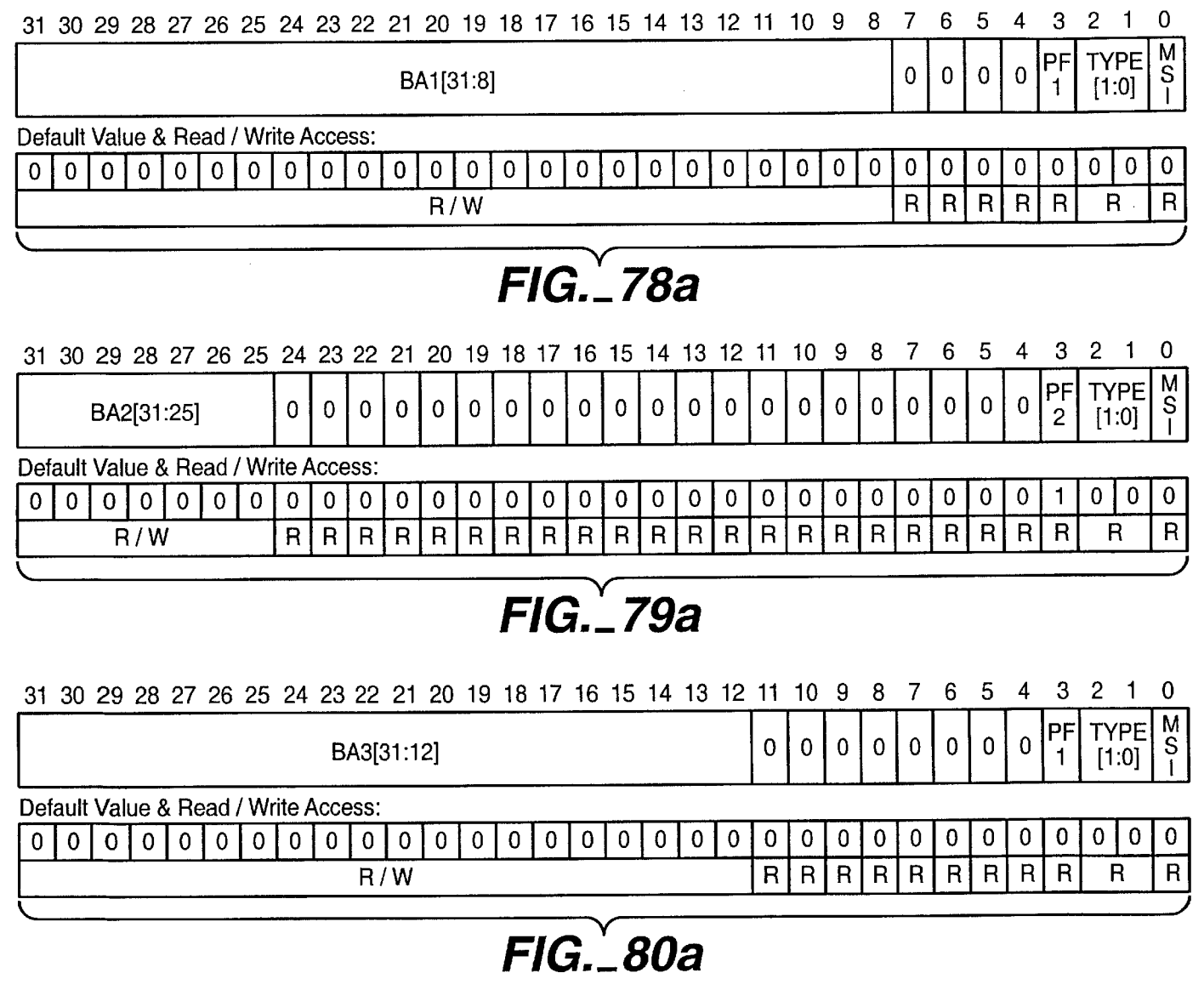

| Name | Bit Position | Description |
|---|---|---|
| BA1[31:8] | 31:8 | Base Address 1 - BA1[31:8] specifies the PCI base address for the RAP's Mailbox and XPCI_Cntl register. The RAP utilizes 256B of PCI memory space for access of these locations. |
| PF1 | 3 | The RAP does not support burst reads of the Cell Buffer Memory or Mailbox FIFO. The PF1 bit is always set to 0. |
| TYPE[1:0] | 2:1 | Base Address Type - TYPE[1:0] is hardwired to 0b00, indicating Base Address Register 1 is 32 bits long and base address is locatable anywhere in the 32-bit memory space. |
| MSI | 0 | Memory Space identifier - MSI is hardwired to 0, indicating Base Address 1 is in Memory Space, rather than I/O Space. |

FIG._78b

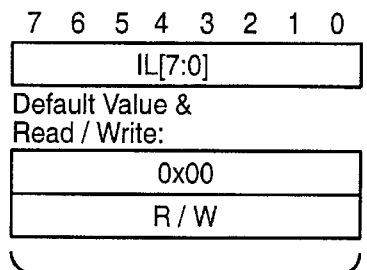

FIG._81a

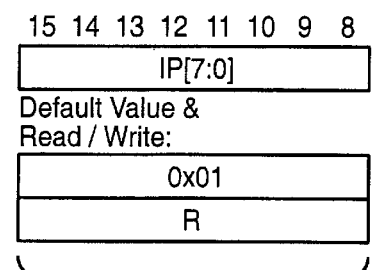

FIG._82a

| Name | Bit Position | Description |
|---|---|---|
| IL[7:0] | 7:0 | Interrupt Line - The Interrupt Line register is provided for PCI system initialization. The value of IL[7:0] has no effect on RAP operation. |

FIG._81b

| Name | Bit Position | Description |
| --- | --- | --- |
| BA2[31:25] | 31:25 | Base Address 2- BA1[31:25] specifies the PCI base address for local memory connected to the RAP's Local Memory Bus. Up to 32MB of local memory is accessible by the PCI bus. |
| PF2 | 3 | Prefetchable - The PF2 bit is hardwired to 1, indicating local memory is prefetchable. |
| TYPE[1:0] | 2:1 | Base Address Type - TYPE[1:0] is hardwired to 0b00, indicating Base Address Register 2 is 32 bits long and base address is locatable anywhere in the 32-bit memory space. |
| MSI | 0 | Memory Space identifier - MSI is hardwired to 0, indicating Base Address 2 is in Memory Space, rather than I/O Space. |

*FIG._79b*

| Name | Bit Position | Description |
| --- | --- | --- |
| BA3[31:12] | 31:12 | Base Address 3- BA3[31:12] specifies the PCI base address for the RAP's PCI Configuration registers. The RAP utilizes 4KB of PCI memory space for access of these locations. |
| PF1 | 3 | The RAP does not support burst reads of the Configuration registers. The PF1 bit is always set to 0. |
| TYPE[1:0] | 2:1 | Base Address Type - TYPE[1:0] is hardwired to 0b00, indicating Base Address Register 3 is 32 bits long and base address is locatable anywhere in the 32-bit memory space. |
| MSI | 0 | Memory Space identifier - MSI is hardwired to 0, indicating Base Address 3 is in Memory Space, rather than I/O Space. |

*FIG._80b*

| Name | Bit Position | Description |
|---|---|---|
| IP[7:0] | 15:8 | Interrupt Pin - Since the RAP is a single function device, IP[7:0] is hardwired to 0x01, indicating PCI_INTn corresponds to PCI INTA#. |

*FIG._82b*

```
23 22 21 20 19 18 17 16
     MAXLA[7:0]
```
Default Value &
Read / Write:

| 0x00 |
|---|
| R |

*FIG._83a*

```
31 30 29 28 27 26 25 24
     MINGNT[7:0]
```
Default Value &
Read / Write:

| 0x00 |
|---|
| R |

*FIG._84a*

| Name | Bit Position | Description |
|---|---|---|
| MAXLAT[7:0] | 23:16 | Maximum Latency - No specific requirements or recommendations are made for maximum PCI bus latency. MAXLAT[7:0] is hardwired to 0x00. |

*FIG._83b*

| Name | Bit Position | Description |
|---|---|---|
| MINGNT[7:0] | 31:24 | Minimum Grant - No specific requirements or recommendations are made for minimum PCI grant duration. MINGNT[7:0] is hardwired to 0x00. |

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| LM_PCI[31:27] | | | | | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |

Default Value & Read / Write Access:

| 0 | 0 | 0 | 0 | 0 | R | R | R | R | R | 0 | 0 | 0 | 0 | 0 | 0 | 0 | 0 | 0 | 0 | 0 | 0 | 0 | 0 | 0 | 0 | 0 | 0 | 0 | 0 | R | R |
|---|---|---|---|---|---|---|---|---|---|---|---|---|---|---|---|---|---|---|---|---|---|---|---|---|---|---|---|---|---|---|---|
| R/W | | | | | | | | | | | | | | | | | | | | | | | | | | | | | | | |

FIG._86a

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| I2O_BA[31:0] | | | | | | | | | | | | | | | | | | | | | | | | | | | | | | | |

Default Value & Read / Write Access:

| 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
|---|---|---|---|---|---|---|---|---|---|---|---|---|---|---|---|---|---|---|---|---|---|---|---|---|---|---|---|---|---|---|---|
| R/W | | | | | | | | | | | | | | | | | | | | | | | | | | | | | | | |

FIG._87a

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| I2O_LEN[31:0] | | | | | | | | | | | | | | | | | | | | | | | | | | | | | | | |

Default Value & Read / Write Access:

| 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
|---|---|---|---|---|---|---|---|---|---|---|---|---|---|---|---|---|---|---|---|---|---|---|---|---|---|---|---|---|---|---|---|
| R/W | | | | | | | | | | | | | | | | | | | | | | | | | | | | | | | |

| Name | Bit Position | Description |
|---|---|---|
| LM_PCI[31:12] | 31:12 | Local Memory to PCI Memory Map - PCI_LM[31:27] specifies the base PCI address for RAP accesses to the 128 MB PCI memory space. When the 4011 or PCI DMA engine accesses PCI memory space, they supply A26:A0, the LM_PCI register supplies A31:A27 |

FIG._85b

| Name | Bit Position | Description |
|---|---|---|
| I2O_BA[31:0] | 31:0 | I2O Base Address - I2O_BA[31:0] specifies the base address for the I2O shared memory. |

FIG._86b

| Name | Bit Position | Description |
|---|---|---|
| I2O_LEN[31:0] | 31:0 | I2O Length - I2O_LEN[31:0] specifies the length in bytes of the I2O shared memory. |

FIG._87b

| Name | Bit Position | Description |
|---|---|---|
| I2O_B_DIF[31:0] | 31:0 | I2O Base Difference - I2O_B_DIF[31:0] specifies the difference (in bytes) between the system bass address and the local base address. |

FIG._88b

| Name | Bit Position | Description |
|---|---|---|
| LM_MaxBurst[1:0] | 3:2 | LM_MaxBurst[1:0] selects the maximum number of words in a PCI DMAC or Multichannel DMAC burst or PCI Slave Write burst. Bit encoding is the same as PCI_MaxBurst. |
| PCI_MaxBurst[1:0] | 1:0 | PCI_MaxBurst[1:0] selects the maximum number of words in a burst when the PCI DMA controller is active. Bit encoding is in the following table. |

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| I2O_B_DIF[31:0] | | | | | | | | | | | | | | | | | | | | | | | | | | | | | | | |

Default Value & Read / Write Access:

| 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
|---|---|---|---|---|---|---|---|---|---|---|---|---|---|---|---|---|---|---|---|---|---|---|---|---|---|---|---|---|---|---|---|
| R/W | | | | | | | | | | | | | | | | | | | | | | | | | | | | | | | |

FIG._89a

| 7 | 6 | 5 | 4 | 3 | 2 | 1 | 0 |
|---|---|---|---|---|---|---|---|
| | | | | LM_Max Burst | | PCL_Max Burst | |

Default Value & Read / Write:

| 0 | 0 | 0 | 0 | 0 | 0 | 0 | 0 |
|---|---|---|---|---|---|---|---|
| R | R | R | R | R/W | R/W | R/W | R/W |

FIG._89c

| PCI_MaxBurst | Burst Length |
|---|---|
| 00 | Unlimited |
| 01 | 16 32-Bit Words Maximum |
| 10 | 24 32-Bit Words Maximum |
| 11 | 32 32-Bit Words Maximum |

FIG._90a

XPCI_Ctrl Register - 0x44

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| CPU_Reset | Boot Fault | | En_Int | | | | | En_Arb | MbxRx-Full | MbxRx-THLD | MbxRx-Empty | MbxTx-Full | MbxTx-THLD | MbxTx-Empty |

Default Value & Read / Write Access:

| A[a] | 0 | 0 | 0 | 0 | 0 | 0 | 0 | 0 | B[b] | 0 | 0 | 0 | 0 | 0 | 1 |
|---|---|---|---|---|---|---|---|---|---|---|---|---|---|---|---|
| R/W | R | R | R/W | R | R | R | R | R/W | R/W | R | R | R | R | R | R | a. Default Dependent On State Of SYS_Boot Pins
b. Default Dependent On TBD

| Name | Bit Position | Description |
|---|---|---|
| CPU_Reset | 15 | CPU_Reset holds the 4011 core in cold reset. RAP modules are held in the reset state by PCI_RSTn. When CPU_Reset is cleared, the CW4011 will initiate the boot sequence. CPU_Reset is initialized based on the state of the SYS_Boot pin when PCI_RSTn is deasserted. This allows the PCI host to control the start of the boot sequence. When booting from EPROM, the boot sequence starts when PCI_RSTn is deasserted, not requiring PCI host initiation. |
| BootFault | 14 | BootFault sets when a bus error occurs and CPU_Reset (bit 31) of the CPU_AddrMap register is set. This bit is used to notify the PCI host of possible boot failure, since the bus error may have occurred before the exception vectors were initialized. |
| Reserved | 13 | |
| EnInt | 12 | EnInt enables assertion of the PCI interrupt pin, PCI_INTn, when the Transmit Mailbox FIFO is not empty. |
| Reserved | 11:7 | |
| En_Arb | 6 | When En_Arb is active, the RAP is the PCI Bus Arbiter. PCI_Req[1:0] are inputs, PCI_Gnt[1:0] are outputs. When inactive, the PCI bus has an external arbiter. PCI_Req[0] is an output and PCI_Gnt[0] is an input. |
| MbxRxFull | 5 | MbxRxFull is asserted when the receive mailbox is full. |
| MbxRxTHLD | 4 | MbxRxTHLD is asserted when the receive mailbox has reached the programmed threshold. |
| MbxRxEmpty | 3 | MbxRxEmpty is asserted when the receive mailbox is empty. |
| MbxTxFull | 2 | MbxTxFull is asserted when the transmit mailbox is full. |
| MbxTxFull | 1 | MbxTxTHLD is asserted when the transmit mailbox has reached the programmed threshold. |
| MbxTxEmpty | 0 | MbxTxEmpty is asserted when the transmit mailbox is empty. |

*FIG._90b*

PCI Interrupt Register - Configuration Space 0x48

| 7 | 6 | 5 | 4 | 3 | 2 | 1 | 0 |
|---|---|---|---|---|---|---|---|
| MB_INT | DMA_INT | BERR | Reserved | | | | |

Default Value & Read / Write:

| 0 | 0 | 0 | 0x00 | | | | |
|---|---|---|---|---|---|---|---|
| R / W | | | | | | | |

FIG._91a

| Name | Bit Position | Description |
|---|---|---|
| MB_INT | 7 | MB_INT - The interrupt from the mailbox to the PCI master is active. |
| DMA_INT | 6 | DMA_INT - The interrupt from the DMA engine to the PCI master is active. |
| BERR | 5 | BERR - Indicates an error occurred on the PCI bus. |
| Reserved | 4:0 | Reserved bits. |

FIG._91b

RAP Interrupt Register - Configuration Space 0x4A

| 7 | 6 | 5 | 4 | 3 | 2 | 1 | 0 |
|---|---|---|---|---|---|---|---|
| MB_INT | DMA_INT | BERR | Reserved | | | | |

Default Value & Read / Write:

| 0 | 0 | 0 | 0x00 | | | | |
|---|---|---|---|---|---|---|---|
| R / W | | | | | | | |

FIG._92a

| Name | Bit Position | Description |
|---|---|---|
| MB_INT | 7 | MB_INT - The interrupt from the mailbox to the RAP CPU is active. |
| DMA_INT | 6 | DMA_INT - The interrupt from the DMA engine to the RAP CPU is active. |
| BERR | 5 | BERR - Indicates an error occurred on the PCI bus. |
| Reserved | 4:0 | Reserved bits. |

FIG._92b

| PCI Memory | Module | Size |
|---|---|---|
| 0600 | Mailbox Tx FIFO | Up To 512W |
| 0604 | Mailbox Rx FIFO | Up To 512W |
| 0608 | XPCI_Control Reg | 1B |
| 0609 | MBoxSize | 1B |
| 060A | MboxThrshld | 1B |
| 060C-06FF | Reserved[a] | <256B | a. PCI slave writes to reserved area are completed normally, but data is ignored. PCI slave reads of reserved area return all 1s.

FIG._93

Mailbox Tx Register - 0x0600

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| MBTX[31:2] | | | | | | | | | | | | | | | | | | | | | | | | | | | | | | RSVD | |

Default Value & Read / Write Access:

| 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
|---|---|---|---|---|---|---|---|---|---|---|---|---|---|---|---|---|---|---|---|---|---|---|---|---|---|---|---|---|---|---|---|
| R / W | | | | | | | | | | | | | | | | | | | | | | | | | | | | | | R | |

FIG._94a

| Name | Bit Position | Description |
|---|---|---|
| MBTX[31:2] | 31:2 | Mailbox Tx - MBTX[31:2] is the location where the RAP writes to the Tx FIFO. The PCI Master reads the FIFO from this address. All accesses are word accesses. |

FIG._94b

Mailbox Rx Register - 0x0604

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| MBRX[31:2] | | | | | | | | | | | | | | | | | | | | | | | | | | | | | | RSVD | |

Default Value & Read / Write:

| 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
|---|---|---|---|---|---|---|---|---|---|---|---|---|---|---|---|---|---|---|---|---|---|---|---|---|---|---|---|---|---|---|---|
| R/W | | | | | | | | | | | | | | | | | | | | | | | | | | | | | | R | |

FIG._95a

| Name | Bit Position | Description |
|---|---|---|
| MBRX[31:2] | 31:2 | Mailbox Rx - MBTX[31:2] is the location where the RAP reads from the Rx FIFO. The PCI Master writes to the FIFO at this address. All accesses are word accesses. |

FIG._95b

Mailbox Size Register - 0x0608

| 23 | 22 | 21 | 20 | 19 | 18 | 17 | 16 |
|---|---|---|---|---|---|---|---|
| MBSIZ[7:0] | | | | | | | |

Default Value & Read / Write Access:

| 0 | 0 | 0 | 0 | 0 | 0 | 0 | 0 |
|---|---|---|---|---|---|---|---|
| R/W | | | | | | | |

FIG._96a

| Name | Bit Position | Description |
|---|---|---|
| MBSIZ[7:0] | 23:16 | Mailbox Size- MBSIZ[7:0] is the location where the FIFO size is set. The Tx and Rx FIFO size is programmable up to 256 words. |

FIG._96b

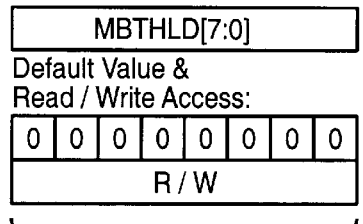
FIG._97a
| Name | Bit Position | Description |
|---|---|---|
| MBTHLD[7:0] | 31:24 | Mailbox Threshold - MBSIZ[7:0] is the location where the FIFO threshold interrupt level is set. The Tx and Rx FIFO interrupt threshold (e.g. the number of pending messages) is programmable up to 256 words. |
FIG._97b
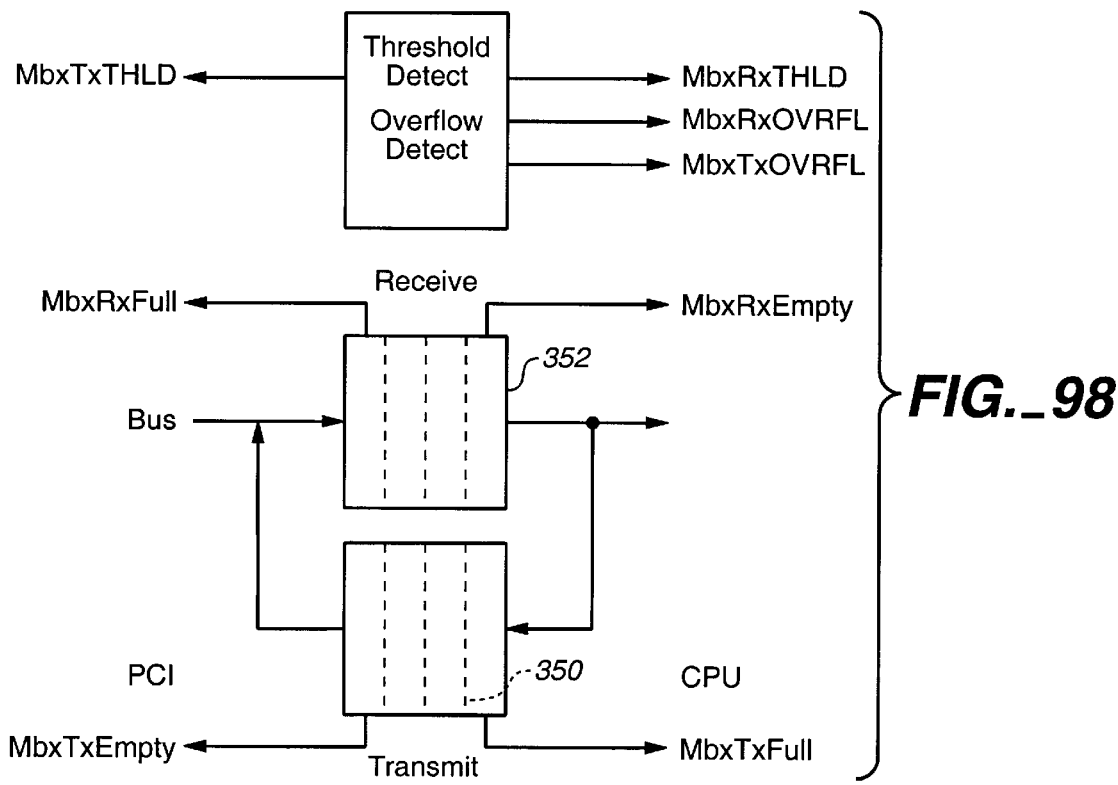
FIG._98

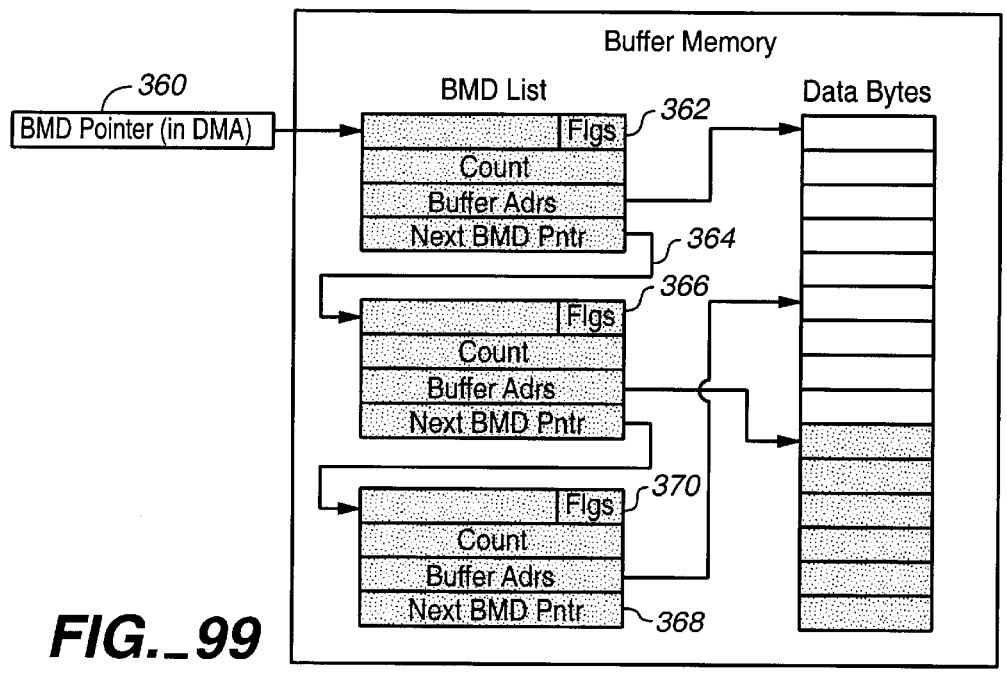
FIG._99 BMD Pointer and Linked BMD List Structure
Buffer Memory Descriptor (BMD) Definition
| Hex Offset | Description | msb 31 Byte 0 24 | 23 Byte 1 16 | 15 Byte 2 8 | 7 Byte 3 lsb 0 |
|---|---|---|---|---|---|
| 0000 | Word 0 | Not Used | | Flags | |
| 0004 | Word 1 | Byte Count | | Not Used | |
| 0008 | Word 2 | Buffer Memory Address | | | |
| 000C | Word 3 | Next BMD Pointer | | | |
FIG._100

PCI DMA Control Register

| 31 | 7 | 6 | 5 | 4 | 3 | 2 | 1 | 0 |
|---|---|---|---|---|---|---|---|---|
| Unused | | | | RST | EN | DIR | LRDY | LREQ |

Default Value & Read / Write Access:

| 0 | 0 | 0 | 0 | 0 | 0 |
|---|---|---|---|---|---|
| R | R/W | R/W | R/W | R | R/W |

FIG._101a

PCI DMA Interrupt Register

| 31:18 | 17 | 16 | 15 | 10 | 9 | 8 | 7 | 2 | 1 | 0 |
|---|---|---|---|---|---|---|---|---|---|---|
| Unused | List_Int clr | Err_Int clr | Unused | | List_Int | Err_Int | Unused | | List_IntEn | Err_IntEn |

Default Value & Read / Write Access:

| 0 | 0 | 0 | 0 | 0 | 0 | 0 | 0 | 0 |
|---|---|---|---|---|---|---|---|---|
| R | W | W | R | R | R | R | R/W | R/W |

FIG._102a

PCI DMA PCI Address Register

| 31:0 |
|---|
| adrs |

Default Value & Read / Write Access:

| 0 |
|---|
| R/W |

FIG._103a

| Name | Bit Position | Description |
|---|---|---|
| DMA_RST | 4 | DMA Reset<br>When set to a 1, DMA_RST holds the DMA Controller in a reset state. |
| EN | 3 | Enable<br>When set, the DMA engine will start transferring data. Writing a 0 to this bit will stop the DMA transfer. All of the other registers must be ready for a DMA to start when this bit is written. |
| DIR | 2 | DMA Reset<br>When set to a 1, the DMA will transmit data from RAP local memory to the PCI address. When cleared to a 0, the DMA will read data from the PCI address and put the data in the RAP local memory according to the BMDs. |
| LRDY | 1 | Lock Out Ready<br>The DMA sets LRDY to a 1 in response to a lock out request. LRDY = 1 indicates the DMA has suspended operation and it is safe to update buffer descriptors. Software must clear this bit by writing a 0 to the LREQ bit. |
| LREQ | 0 | Lock Out Request<br>LREQ when set to a 1, causes the DMA to suspend operation when a buffer descriptor access is required. When the CPU has finished its access it must clear this bit to a 0 to restart the DMA. |

FIG._101b

| Name | Bit Position | Description |
|---|---|---|
| adrs | 31:0 | adrs<br>The address that the DMA will use on the PCI bus. |

FIG._103b

| Name | Bit Position | Description |
|---|---|---|
| adrs | 28:0 | adrs<br>The address that the DMA will use to fetch the BMD. The internal bus of the RAP only uses 29 bits of address. |

FIG._104b

| Name | Bit Position | Description |
| --- | --- | --- |
| List_Int_clr | 17 | List Completion Interrupt Clear<br>Writing a one to this bit will clear the List_Int bit. Writing a zero will do nothing. This bit will always return a 0 on a read. |
| Err_Int_clr | 16 | Error Interrupt Clear<br>Writing a one to this bit will clear the Err_Int bit. Writing a zero will do nothing. This bit will always return a 0 on a read. |
| List_Int | 9 | List Completion Interrupt<br>This is the current state of the List Completion Interrupt. A one indicates that the interrupt is active. This is a level sensitive interrupt. |
| Err_Int | 8 | Error Interrupt<br>This is the current state of the Abnormal Completion Interrupt. A one indicates that the interrupt is active. This is a level sensitive interrupt. |
| List_IntEn | 1 | List Completion Interrupt Enable<br>When set, List_IntEn enables interrupt generation when the DMA has completed processing of a BMD and the Next BMD Pointer is zero. |
| Err_IntEn | 0 | Abnormal Completion Interrupt Enable<br>When set, Err_IntEn enables interrupt generation when an error condition occurs during BMD processing. |

FIG._102b

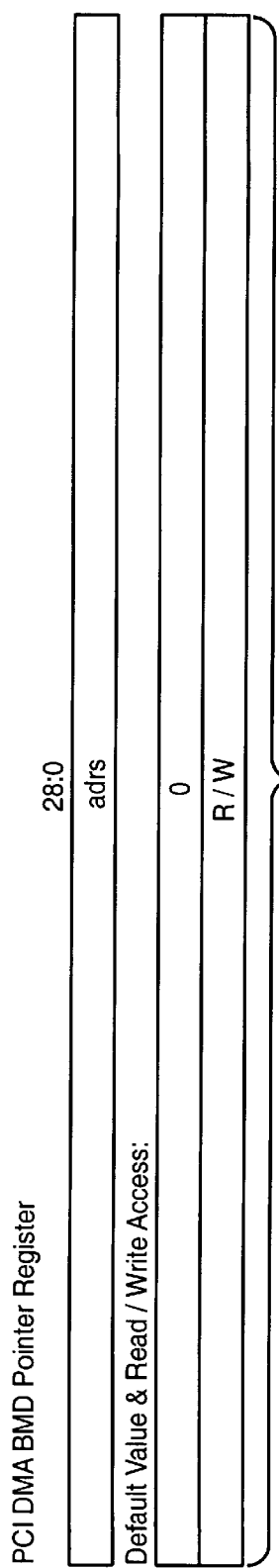

PCI DMA BMD Pointer Register

| | 28:0 |
|---|---|
| | adrs |

Default Value & Read / Write Access:

| | |
|---|---|
| 0 | |
| R / W | |

FIG._104a

| Address | Size (Bits) | Register |
|---|---|---|
| 00 | 32 | Timer 0 Initialization Value |
| 04 | 32 | Timer 1 Initialization Value |
| 08 | 32 | Timer 2 Initialization Value |
| 0C | 32 | Timer 3 Initialization Value |
| 10 | 32 | Timer 0 |
| 14 | 32 | Timer 1 |
| 18 | 32 | Timer 2 |
| 1C | 32 | Timer 3 |
| 20 | 8 | Timer 0 Configuration |
| 24 | 8 | Timer 1 Configuration |
| 28 | 8 | Timer 2 Configuration |
| 2C | 8 | Timer 3 Configuration |
| 30 | 8 | Watchdog Timer Configuration |

FIG._105

SINGLE CHIP REMOTE ACCESS PROCESSOR

BACKGROUND OF THE INVENTION

The present invention relates to integrated circuits, network devices and systems, and more particularly to a single integrated remote access processor circuit for communication between a plurality of networks having different protocols.

Electronic data networks are becoming increasingly widespread for the communication of divergent types of data including computer coded text and graphics, voice and video. Such networks enable the interconnection of large numbers of computer work stations, telephone and television systems, video teleconferencing systems and other facilities over common data links or carriers.

Personal computers and computer work stations are typically interconnected by local area networks (LANs) such as Ethernet, Token Ring, DECNet and RS-232, whereas remote systems are interconnected by wide area networks (WANs) such as V.34, ISDN Basic Rate Interface (BRI), and Frame Relay (T1/E1 or fractional T1/E1) networks. LANs and WANs can be interconnected by devices known as hubs, bridges and routers in unlimited configurations.

Interconnect devices are typically bulky and expensive units which operate at a low performance, offer limited connectivity options, and allow minimal end user programmability thus creating a bottleneck between LANs and WANs. For example, many of the current edge routing devices are based on integration at the board level of various components. Transfer operations at the board level require multiple system clock cycles which fundamentally limit the transfer speed. In addition, multiple latencies are present in the various paths by which data moves through the device. The degree by which such latencies can be reduced, as well as the degree by which the size and cost of a multi-chip device can be reduced, are also fundamentally limited.

End users today need a myriad of WAN connectivity options ranging from dial up modems (28.8/33.6 Kb/s) to low speed Frame Relay (56 Kb/s) to ISDN basic rate (128 Kb/s) to high speed Frame Relay (1.5 Mb/s, 45 Mb/s), depending upon the application. However, interconnect devices typically focus on selected LAN and WAN interfaces, such as an "ISDN edge router". This leads to installation of multiple devices at a high cost to meet all of the connectivity needs for small office-home office (SOHO), branch office and mobile office remote access applications.

In addition, interconnect devices today offer limited or no programmability for end users to customize their applications and minimize network usage costs through optimization or channel utilization.

A remote access processor having higher performance, multiprotocol connectivity options, and higher programmability is desired.

SUMMARY OF THE INVENTION

The single chip integrated remote access processor of the present invention has a plurality of communication interface units, including a local area network (LAN) interface unit, a first multi-protocol serial wide area network (SWAN) interface unit, a telephony coder-decoder interface unit and a peripheral component interface (PCI) unit. A data routing control circuit is coupled to the plurality of communication interface units for controlling data transfer between the interface units.

In one embodiment, the data routing control circuit includes an internal transfer bus, a multi-channel direct memory access (DMA) controller, a central processing unit (CPU), an internal memory, a local memory interface, a local memory controller and a bridge circuit. The internal transfer bus is coupled to the DMA controller, CPU, local memory controller and bridge circuit for passing data, address and control information to and from the various elements. The DMA controller has a first channel coupled to the LAN interface unit, a second channel coupled to the multi-protocol SWAN interface unit and a third channel coupled to the telephony coder-decoder interface unit. The internal memory is coupled to the DMA controller and the CPU for maintaining buffer memory descriptor lists for each DMA channel.

The local memory controller is coupled between the internal transfer bus and the local memory interface for storing data packets received at one of the communication interfaces in an external local memory and then retrieving the data packets for transmission through one or more of the other communication interfaces, under the control of the CPU. The bridge circuit is coupled between the PCI interface unit and the local memory controller for transferring data packets between the PCI interface unit and the local memory.

The single chip integration enables high performance and low cost. A scalable CPU and a fast local memory interface creates a robust programmable platform for end users to customize their applications. Combinations of multi-protocol SWAN interface units can provide a host of WAN connectivity options from the same chip.

BRIEF DESCRIPTION OF THE DRAWINGS

FIG. 1 is a block diagram of a communication system in which the present invention is useful.

FIGS. 2a and 2b are block diagrams illustrating applications of the remote access processor of the present invention.

FIG. 3 is a block diagram of the remote access processor of the present invention.

FIGS. 4a–4c are block diagrams illustrating various WAN port configurations of the remote access processor shown in FIG. 3.

FIG. 5 is a block diagram of the WAN port configuration shown in FIG. 4c.

FIGS. 6a–6e are pin list tables for the remote access processor.

FIG. 7 is a table illustrating pin multiplexing of a local memory interface.

FIG. 8 is a table listing system boot sources.

FIG. 9 is a block diagram of a CPU in the remote access processor.

FIG. 10 is a table of registers in the CPU shown in FIG. 9.

FIGS. 11–13 are diagrams illustrating the registers listed in FIG. 10.

FIG. 14 is table of a remote access processor memory map.

FIG. 15 is a vectored interrupt table.

FIG. 16 is table of memory page address assignments.

FIG. 17 is a table of local memory interface pin usage.

FIGS. 18 and 19 are tables of SDRAM configuration registers.

FIG. 20 is a table of SDRAM configurations.

FIG. 21 is a diagram of an EPROM control register.

FIG. 22 is a diagram of a PHY control register.

FIG. 23 is a block diagram of a DMA controller within the remote access processor of the present invention.

FIGS. 24 and 25 are diagrams illustrating a BMD list structure for the DMA controller shown in FIG. 23.

FIGS. 26 and 27 are diagrams of DMA controller error flag definitions.

FIGS. 28a–36a are diagrams of DMA controller registers.

FIGS. 28b–36b are tables defining the bits of the registers shown in FIGS. 28a–36a.

FIG. 37 is a diagram of a receive frame action register.

FIG. 38 is a table defining the bits of the receive frame action register shown in FIG. 37.

FIG. 39 is a block diagram of V.34 interface coupled to an off-chip line and voice Codec/DAA circuit.

FIG. 40 and FIGS. 41a–41p are diagrams illustrating Ethernet controller registers.

FIG. 42 is a block diagram of a SWAN controller within the remote access processor of the present invention.

FIG. 43 and FIGS. 44a–56a are diagrams illustrating registers in the SWAN controller shown in FIG. 42.

FIGS. 44b–56b, 47c and 53c are bit definition tables for the registers shown in FIGS. 44a–56a.

FIG. 57 is a receive data waveform diagram illustrating a zero bit measurement for automatic band rate detection.

FIG. 58 is a block diagram of zero bit measurement logic.

FIG. 59 is a state diagram on an automatic baud rate detector circuit.

FIG. 60 is a table illustrating typical values expected from an automatic baud rate detector circuit.

FIG. 61 is a block diagram of a time slot multiplexer and SWAN port configuration within the remote access processor of the present invention.

FIG. 62 is a diagram of a SWAN port configuration register.

FIGS. 63a–63c are port select tables.

FIG. 64 is a diagram of a switch table RAM definition.

FIG. 65 is a diagram of a time slot multiplexer configuration register.

FIGS. 66 and 67 are tables illustrating a receive frame synch delay and a transmit frame synch delay.

FIGS. 68 and 69a–85a are diagrams illustrating PCI configuration registers.

FIGS. 69b–85b and 71c are bit definition tables for the registers shown in FIGS. 69a–85a.

FIGS. 86a–88a are diagrams illustrating I20 control registers.

FIGS. 86b–88b are bit definition tables for the registers shown in FIGS. 86a–88a.

FIGS. 89a–90a are diagrams illustrating PCI port control registers.

FIGS. 89b–90b are bit definition tables for the registers shown in FIGS. 89a–90a.

FIG. 89c is a table illustrating a PCI maximum burst length.

FIGS. 91a–92a are diagrams illustrating PCI and RAP CPU interrupt control registers.

FIGS. 91b–92b are bit definition tables for the registers shown in 91a–92a.

FIG. 93 is a table showing an RAP PCI slave memory map.

FIGS. 94a–97a are diagrams illustrating PCI mail box registers.

FIGS. 94b–97b are bit definition tables for the registers shown in FIGS. 94a–97a.

FIG. 98 is block diagram of a PCI mailbox register.

FIGS. 99 and 100 are diagrams illustrating a BMD list structure for a PCI/local memory bridge and DMA circuit.

FIGS. 101a–104a are diagrams illustrating PCI DMA registers.

FIGS. 101b–104b are bit definition tables for the registers shown in FIGS. 101a and 104a.

FIG. 105 is a table of general purpose timers within the remote access processor of the present invention.

DETAILED DESCRIPTION OF THE PREFERRED EMBODIMENTS

FIG. 1 is a block diagram of a communication system in which the present invention is useful. The remote access processor of the present invention provides connectivity from end users 10 to a variety of destinations 12 over a communications network 14. The end users 10 can include a stand alone personal computer (PC), a stand alone work station or several PCs or work stations on a local area network (LAN). These devices can be located in a corporate branch office 16, a small business office or school 18, a home office 20 or a mobile office (e.g. hotel or auto) 22. The destinations 12 include a corporate headquarter LAN 24, an internet service provider 26 or a peer location 28, for example. Communication network 14 includes an internet or intranet connection, for example.

FIG. 2a is a block diagram illustrating a particular application of the remote access processor of the present invention which provides diverse connectivity to a network server 30 at a corporate headquarter or ISP server site. Remote access processor 34 includes local area network (LAN) interface 36, peripheral component interface (PCI) 38, and a plurality of serial wide area network (SWAN) interfaces 40, 42 and 44. Remote access processor 34 is preferably implemented on a single semiconductor integrated circuit within network server 30. PCI interface 38 allows communication between remote access processor 34 and the host processor within network server 30.

LAN interface 36 can be configured to support a variety of protocols, such as IP and IPX over Ethernet. In the embodiment shown in FIG. 2, LAN interface 36 is an Ethernet interface which supports 10 Mb/s and 100 Mb/s data transfer rates in either full or half-duplex mode according to IEEE standards 802.3 and 802.3u. LAN interface 36 is coupled to a file server 46 and a compute server 38, for example, over Ethernet network 50.

SWAN interfaces 40, 42 and 44 provide connectivity to remote devices 51, 52 and 53 over wide area networks 54. Remote access processor 34 provides simultaneous connectivity to all three SWAN interfaces 40, 42 and 44 from file server 46, compute server 48 and network server 30.

Device 51 includes a video server or other high speed receiver device such as a PC or a television which is coupled to SWAN interface 40 over a high speed switched digital communication link. This link can include a Frame Relay interface over a leased switched digital network or an ADSL TA interface over a public switched telephone network, for example. The Frame Relay interface transfers data at rates of 56 Kb/s to 45 Mb/s, and the ADSL interface transfers data at rates of 6–8 Mb/s with an external ADSL terminal adapter. Device 52 includes a personal computer or a work station located at a small office or home office, and is coupled to SWAN interface 42 over an Integrated Switched Digital Network-Basic Rate Interface (ISDN-BRI). The ISDN-BRI interface transfers data at a rate of 128 Kb/s. Device 53 includes a portable PC which is coupled to SWAN interface 42 or SWAN interface 44 over an ISDN-BRI or a V.34 analog network, for example.

In alternative embodiments, remote access processor 34 can be located within PC 52 or portable PC 53 to provide LAN and WAN port expansion, which allows connectivity to a diverse set of network interfaces. In FIG. 2b, remote access processor 34 is implemented within an edge router 63. LAN interface 36 is coupled to a plurality of PCs 52a–52c over Ethernet network 50, which allows connectivity to WAN 54 over a variety of SWAN interfaces 40, 42 and 44. Edge router 63 can be located in a stand-alone box, in network server 30 or in any one of the PCs 52a–52c.

FIG. 3 is a block diagram of remote access processor 34. Remote access processor 34 is implemented on a single integrated circuit chip having a plurality of inputs and outputs. In one embodiment, the integrated circuit chip is manufactured with a 3.3 volt, 0.35 micron CMOS fabrication technology and is packaged within a 256 position plastic ball grid array having nominal dimensions of 27 mm×27 mm×2.1 mm. The communication interfaces include LAN interface 36, PCI interface 38 and SWAN interfaces 40, 42a, 42b and 44. SWAN interface 40 is a multi-protocol SWAN interface. SWAN interfaces 42a and 42b are time division multiplexer (TDM) serial interfaces for supporting two ISDN-BRI networks. SWAN interface 44 is a V.34 coder-decoder (CODEC) interface for coupling to a V.34 CODEC modem. The remaining inputs and outputs of remote access processor 34 include serial peripheral interface (SPI) 55, reference clock input 56, real time clock (RTC) input 57, battery back-up input 58, UART compatible serial I/O port 60, 40 Mhz clock input 62, boundary scan test I/O 64, 32-bit local memory interface 66 and general purpose interrupt/control I/O 70.

V.34 CODEC interface 44 is coupled to V.34 interface controller 72, which provides a serial digital interface to an external V.34 CODEC and digital-to-analog converter. V.34 CODEC interface 44 can also be routed to an external ISDN-BRI channel.

Ethernet controller 74 is coupled to Ethernet interface 36. Ethernet controller 74 is based on the E-110 Core Logic, which is available from LSI Logic Corporation, and provides a connection to an external Media Independent Interface (MII). Multi-protocol SWAN controllers 76a, 76b, 76c and 76d support four multi-protocol WAN interfaces. SWAN controller 76a is coupled directly to multi-protocol serial WAN interface 40 and is coupled to TDM serial interfaces 42a and 42b through 4-to-1 time slot multiplexers 78a and 78b. SWAN controller 76a can support a Frame Relay protocol over a leased line that is coupled to Multi-protocol WAN interface 40, for example. SWAN controllers 76b, 76c and 76d are coupled to TDM serial interfaces 42a and 42b through time slot multiplexers 78a and 78b. Time slot multiplexers 78a and 78b provide independent transmit and receive TDM interfaces at data rates of up to 8 Mhz, for example. These interfaces support ISDN, IOM2, IDL, Mitel ST-Bus, AT&T P7270 and T1/E1 communication applications, for example. Four-bit serial controller 80 is coupled to SPI interface 55 for providing synchronous, a bidirectional serial peripheral interface control for external ISDN transceivers coupled to TDM serial interfaces 42a and 42b.

Multi-channel DMA controller 82 is coupled between interface controllers 72, 74 and 76a–76d and memory 84. In a preferred embodiment, memory 84 includes a static random access memory (SRAM). DMA controller 82 is also coupled to internal transfer bus 86, which includes a data bus, an address bus and a control bus. DMA controller 82 has six channels which are coupled to respective controllers 72, 74 and 76a–76d for directing data from any one of the controllers to memory 84 or to transfer bus 86. DMA controller 82 also transfers data from transfer bus 86 and memory 84 to any one of the controllers 72, 74 and 76a–76d. Although any multi-channel DMA controller can be used with the present invention, DMA controller 82 preferably includes a contents addressable memory (CAM) which determines the destination of received data packets based on the address header of the data packet. An example of a DMA controller having a CAM is described in more detail in U.S. Ser. No. 08/761,986, filed Dec. 11, 1996, and entitled DMA CONTROLLER WITH ENHANCED DATA FRAME PROCESSING, which is hereby incorporated by reference.

Remote access processor 34 further includes central processing unit (CPU) 90. In a preferred embodiment, CPU 90 includes a MIPS CW4011 MiniRISC™ Superscalar processor core designed and manufactured by LSI Logic Corporation. Similar features can be implemented using other processors such as the Intel I960 processor, the Motorola PowerPC processor or the ARM processor manufactured by Texas Instruments, Incorporated. CPU 90 is coupled to a 16 KB instruction cache 92, a direct map or two-way set associative 8 KB data cache 94 and a multiply and accumulator circuit 96. CPU 90 is also coupled to memory 84 and internal transfer bus 86.

CPU 90 preferably has a robust programmable platform with low level drivers and middleware to enable users to install their network layer protocols and Internet/Intranet applications. In a preferred embodiment, CPU 90 supports popular real time operating systems, such as (pSOS, VxWORKS, OS2, and LYNX), signaling software such as Q.931 and routing software such as TCP/IP.

Timer circuit 100 is coupled between reference clock input 54 and internal transfer bus 86. Timer circuit 100 includes four general purpose 16-bit timers and a 32-bit watch dog timer, for example. Real time clock circuit 102 is coupled to real time clock input 56, voltage backup input 58 and internal transfer bus 86. This circuit provides the day, date and time with 0.1 second resolution, and provides a battery backup for supplying power to remote access processor 34.

UART circuit 104 is coupled between serial I/O 60 and internal transfer bus 86. Phase locked loop circuit 106 is coupled to 40 Mhz clock input 62 and provides various clock signals for sequencing the operations of remote access processor 34. Boundary scan circuit 108 is coupled to boundary scan input 64 and provides a scan test function for the various logical elements within remote access processor 34 according IEEE standard 1149.1, for example.

Memory controller 110 is coupled between local memory interface 66 and internal transfer bus 86. Memory controller 110 is also coupled to DMA controller and bridge circuit 112. Memory controller 110 is an integrated memory controller for supporting various local peripheral memory devices, such as a 32-bit SDRAM or an 8-bit PROM, which may be coupled to local memory interface 66. DMA controller and bridge circuit 112 is coupled between memory controller 110 and PCI interface circuit 114, and has data, address and control buses coupled to internal transfer bus 86. Circuit 112 transfers data packets between PCI interface 114 and local memory, through memory controller 110 and under the control of CPU 90. PCI interface circuit 114 is coupled between PCI interface 38 and internal transfer bus 86. PCI interface 114 is a 33 Mhz, 32-bit (3.3 Volt/5.0 Volt) interface which allows connection to external devices such as a host processor, additional LAN and WAN ports, multiple remote access processors, or network servers, for example. Finally, general purpose interrupt and control circuit 116 is coupled between interrupt and control interface 70 and internal transfer bus 86. In one embodiment, circuit 116 includes twelve programmable, bidirectional pins for serving additional interrupt inputs or control outputs.

I. OPERATION

A. Data Flow From PCI Interface To WAN Or LAN Interfaces.

When a data packet is received on PCI interface 38 from a peripheral device, DMA controller and bridge circuit 112 transfers the data packet from PCI interface circuit 114 to local memory through memory controller 110. Memory controller 110 then notifies CPU 90 that there is a data packet residing in local memory, which is to be transferred to one of the communication interfaces. Based on the address of the data packet and the routing software executed, CPU 90 maps the data packet to one or more of the communication interfaces by updating one or more linked lists in memory 84.

DMA controller 82 and CPU 90 maintain at least one "transmit" linked list of buffer memory descriptors (BMDs) in memory 84 for each channel. The BMDs in each list point to a data packet stored in local memory that are to be transmitted through that DMA channel. DMA controller 82 has a buffer memory descriptor (BMD) pointer register for each channel, which point to the first BMD in the corresponding list. When CPU 90 is notified by memory controller 110 that there is a packet in local memory to be transferred, CPU 90 appends a new BMD to the transmit linked lists of the channel or channels through which the data packet is to be transmitted. CPU 90 then notifies DMA controller 82 that the data packet is ready to be transmitted. Each channel of DMA controller 82 then transfers the packets identified in its transmit linked list to the corresponding controller 72, 74, 76a, 76b, 76c or 76d.

In addition, when the first packet is sent through a particular communication interface, CPU 90 performs a call sequence to setup the desired connection through the corresponding controller. For example, CPU 90 provides SWAN controllers 76a–76d with a telephone number and other data to initiate a call over interface ports 40, 42a and 42b.

If the data packet is being transferred through V.34 interface controller 72, CPU 90 executes a V.34 modem algorithm (e.g. a data pump algorithm) which performs the digital signal processing or "modulation" portion of the conversion between the digital data packets and the analog signals that are transmitted over the public switched telephone network. The modulated digital signals are then provided from CPU 90 to V.34 interface controller 72 for serial transfer to an external V.34 Codec and digital-to-analog converter which is coupled to interface 44. The V.34 Codec performs the final digital-to-analog conversion. Multiply and accumulator circuit 96 supports the digital signal processing performed by CPU 90 with the V.34 modem algorithm.

For ISDN-BRI interfaces, voice, data and facsimile information are integrated over a single serial output. This is accomplished by transferring the corresponding data packets through separate SWAN controllers, such as SWANs 76b, 76c and 76d and then time-multiplexing the data packets together through one of the time slot multiplexers 78a and 78b.

B. Receive Data Flow From WAN Or LAN Interfaces.

When a data packet is received at one of the serial WAN interfaces 40, 42a or 42b or at LAN interface 36, the data packet is passed to DMA controller 82 which temporarily stores the data packets in local memory. CPU 90 maintains at least one, and preferably two, "receive" linked lists in memory 84 for each channel of DMA controller 82. The receive linked list includes a BMD for each received data packet that is stored in local memory and corresponds to that DMA channel.

As each data packet is received by DMA controller 82, the header address is extracted from the data packet and applied to the CAM within DMA controller 82. Based on the header address, the CAM provides an output to DMA controller 82 that identifies the receive linked list or lists to which the data packet should be appended. DMA controller 82 uses the receive linked list to access the BMD which points to the local memory destination of that packet, which is reserved for storing received data packets. DMA controller 82 then moves the data packet into the local memory destination through memory controller 110. In one embodiment, each channel of DMA controller 82 has a corresponding segment of local memory in which to store its received data packets.

When the data packet is in local memory, DMA controller 82 interrupts CPU 90. CPU 90 looks at the receive linked list, determines the packet destination, and if the packet destination is one of the LAN or WAN interfaces, the CPU appends a BMD to the transmit linked list of the channel of DMA controller 82 that corresponds to the destination. The BMD has a buffer address that points to the data packet in local memory. DMA controller 82 then transfers the packet through the corresponding channel and LAN or WAN controller. If the packet destination is a host processor or other device coupled to PCI interface 38, CPU 90 transfers the packet from the local memory through DMA/bridge circuit 112 to PCI interface circuit 114. The DMA portion of circuit 112 has linked list for controlling the transfer of data packets to PCI interface circuit 114. This link list is updated by CPU 90.

When serial data is received at V.34 Codec interface 44, the data represents a sampling of the analog signal transmitted over a public switched telephone network. The sampling is performed by an external V.34 Codec (not shown) coupled to V.34 Codec interface 44. As in the case where serial data is received at one of the LAN or WAN ports DMA controller 82 collects the serial data and stores the data in local memory, through memory controller 110. Once the data samples have been stored in local memory, CPU 90 retrieves the data samples and demodulates the samples into digital data packets by performing a digital filter and data pump function through the V.34 digital signal processing algorithm. CPU 90 then stores the data packets back into local memory through memory controller 110, and notifies the routing software executed by CPU 90 to look for the packets in local memory. The routing software then retrieves the packets from local memory and determines their destination, as discussed above.

The software executed by CPU 90 is typically stored in a flash read only memory (ROM) which is coupled to local memory interface 66. The software instructions are then moved to a dynamic random access memory (DRAM) as needed, which is also coupled to local memory interface 66. During an execution, instructions are transferred from the DRAM to instruction cache 92 through memory controller 110.

FIGS. 4a–4c are block diagrams illustrating various WAN port configurations of remote access processor 34 shown in FIG. 3. In FIG. 4a, remote access processor 34 is configured to communicate between one Ethernet port and four SWAN ports. In FIG. 4b remote access processor 34 is configured to communicate between one Ethernet port, two ISDN-BRI ports and one V.34 port. In FIG. 4c remote access processor 34 is configured to communicate between one Ethernet port, one multi-protocol SWAN port, one ISDN-BRI port and one V.34 port.

FIG. 5 is a block diagram of an application of remote access processor 34 according to the configuration shown in FIG. 4c. PCI interface 38 is coupled to PCI bus 150, which is coupled to host processor 152. LAN interface 36 is coupled to an Ethernet physical layer device 154, such as a DP83840VCE PHY device which is available from National Semiconductor Corporation. Isolation transformer circuit 156 is coupled between Ethernet physical layer device 154 and LAN network 158 for communication over LAN network 158. Local memory interface 66 is coupled to local memory bus 160, which is coupled to DRAM 162, flash ROM 164, DS-1/E1 Frame Relay framer 166 and Siemens 2186 ISDN transceiver 168. DRAM 162 and flash ROM 164 form the local memory for storing the software algorithms executed by remote access processor 34 and for storing data packets received from the various communications ports of remote access processor 34.

TDM serial interface port 42a is coupled to ISDN transceiver 168. ISDN front end circuit 170 is coupled between ISDN transceiver 168 and ISDN network 172. Similarly, multi-protocol SWAN interface 40 is coupled to framer 166. A DS-1 CSU/E1 isolation transformer circuit 176 is coupled between framer 166 and SWAN network 178. Flash ROM 164 provides 8-bits of instruction data over local memory bus 160. Remote access processor 34 controls the operation of ISDN transceiver 168 and framer 166 using 8-bit bus 174. In an alternative embodiment, in which a Motorola ISDN transceiver is used, SPI interface 55 provides control for the transceiver.

V.34 Codec interface 44 is coupled to V.34 Codec 180. In one embodiment, V.34 Codec 180 is a SGS/Thompson 7546 V.34 Codec. V.34 DAA interface front end circuit 182 is couple between V.34 Codec 180 and public switched telephone network 184. Circuits 180 and 182 receive the serial V.34 processed digital signals from remote access processor 34 and perform the final digital-to-analog conversion for sending the data over network 184.

II. EXAMPLE
1. Introduction to Example

The following example outlines the functionality of the Remote Access Processor (RAP) of the present invention according to one embodiment of the present invention. The RAP provides wide area connectivity to an ethernet LAN, as illustrated in FIG. 2. Up to four WAN ports are supported. WAN technologies and protocols include analog V.34, Basic Rate ISDN, fractional or full DS-1/E1, ADSL, cable modem or other high speed technologies up to the STS-1data rate of 52 Mbps. A PCI interface is provided for server based applications and LAN/WAN port expansion.

2. Remote Access Processor (RAP) Block Diagram

The block diagram of RAP 34 is shown in FIG. 3, and the general flow of data through the block diagram is discussed above.

3. RAP Chip Pin-Out 3.1 Pin List

FIGS. 6a–6e provide a pin list for RAP chip 34.

3.2 Pin Descriptions 3.2.1 PCI Interface 38

RAP 34 supports bus master and slave transfers on the PCI Interface 38. The PCI Interface 38 conforms to PCI Local Bus Specification 2.1. The PCI bus is defined as little endian, which means that: byte address 0 is the address of the least-significant byte (LSB) of the 32-bit PCI data word, which is the data byte on PCI_AD[7:0]; and byte address 3 is the address of the most-significant byte (MSB) of the 32-bit PCI data word, which is the data byte on PCI_AD[31:24]. The PCI Interface signal descriptions are provided below:

PCI_CLK (PCI Clock): PCI_CLK is the 33 MHz clock that provides timing for all transactions on the PCI bus. All PCI input signals, except PCI_RSTn, are sampled on the rising edge of the PCI_CLK. PCI_CLK also provides the clock source to the E110 ethernet controller.

PCI_RSTn (PCI Reset): PCI_RSTn is an asynchronous signal that resets PCI specific registers, state machines, and signals to an initial state. All PCI Interface signals are held 3-state when PCI_RSTn is asserted. This signal is also the master reset for the RAP; deasserting PCI_RSTn causes CPU90 90 (CW4011) to initiate the boot process.

PCI_AD[31:0] (PCI Address and Data Bus): The PCI 32-bit address and 32-bit data are multiplexed on PCI_AD[31:0]. The address phase is the clock cycle in which PCI_FRAMEn is asserted. During the address phase PCI_AD[31:0] contains a physical memory address. The least significant byte (LSB) of the 32-bit data word is transferred on PCI_AD[7:0], and the most significant byte (MSB) is transferred on PCI_AD[31:24]. Write data is stable when PCI_IRDYn is asserted, and read data is stable when PCI_TRDYn is asserted.

PCI_CBEn[3:0] (PCI Bus Commands and Data Byte Enables): The PCI Bus commands and data byte enables are multiplexed on PCI_CBEn[3:0]. During the address phase, PCI_CBEn[3:0] contains the bus command. During the data phase, PCI_CBE[3:0] contains the byte enables. PCI_CBE[0] enables data writes on PCI_AD[7:0], which is the LSB, where PCI_CBE[3] enables data writes on PCI_AD[31:24], which is the MSB. The PCI bus is defined as little endian, which means that byte address 0 is the address of the least-significant byte (LSB) of the 32-bit PCI data word, and byte address 3 is the address of the most-significant byte (MSB) of the 32-bit PCI data word.

PCI_PAR (PCI_Parity): PC_PAR is set or reset to create even parity for the 36 bits that include PCI_AD[31:0] and PCI_CBEn[3:0]. Even parity means that the total number of 1's (bits set to logic one) on PC_AD[31:0], PCI_CBEn[3:0], and PC_PAR equals an even number.

PCI_FRAMEn (PCI Cycle Frame): PCI_FRAMEn is asserted by the current master to indicate the beginning and duration of an access. PCI_FRAMEn is asserted to indicate the start of a bus transaction. Bus transfers continue while PCI_FRAMEn is asserted, and they terminate when PCI_FRAMEn is deasserted. When the RAP deasserts PCI_FRAMEn, it will drive it to a high level for one clock cycle and then 3-state it in the following cycles.

PCI_IRDYn (PCI Initiator Ready): The initiator, which is the current bus master, asserts PCI_IRDYn to indicate when there is valid data on PCI_AD[31:0] during a write cycle, or that it is ready to accept data from PCI_AD[31:0] during a read cycle. A data phase (transfer) is completed on any clock cycle where both PCI_IRDYn and PCI_TRDYn are asserted. Wait cycles are inserted until both PCI_IRDYn and PCI_TRDYn are asserted. When the RAP deasserts PCI_IRDYn, it will drive it to a high level for one clock cycle and then 3-state it in the following cycles.

PCI_TRDYn (PCI Target Ready): The target, which is the current bus slave, asserts PCI_TRDYn to indicate when there is valid data on PCI_AD[31:0] during a read cycle, or that it is ready to accept data from PCI_AD[31:0] during a write cycle. The data phase of a transfer completes on any clock cycle when both PCI_IRDYn and PCI_TRDYn are asserted. The RAP inserts wait cycles until both PCI_IRDYn and PCI_TRDYn are asserted. When the RAP deasserts PCI_TRDYn, it will drive it to a high level for one clock cycle and then 3-state it in the following cycles.

PCI_STOPn (PCI Stop): The target asserts PCI_STOPn to stop the current data transfer. As a master, the RAP will terminate the data transfer when PCI_STOPn is asserted. As a slave, the RAP will assert PCI_STOPn under the following conditions:

1. PCI Slave Write FIFO is full; and
2. PCI Slave Read FIFO is empty.

When the RAP deasserts PCI_STOPn, it will drive it to a high level for one clock cycle and then 3-state it in the following cycles.

PCI_IDSEL (PCI Initialization Device Select): PCI_IDSEL is a chip select, which is input to the RAP during configuration read and configuration write cycles (bus command=1010 or 1011).

PCI_DEVSELn (PCI Device Select): The target, whose address was specified in the address phase of the current transfer, asserts PCI_DEVSELn. As a target, the RAP asserts PCI_DEVSELn two clock cycles after the PCI bus master asserts PCI_FRAMEn (medium DEVSEL timing). When the RAP deasserts PCI_DEVSELn, it will drive it to a high level for one clock cycle and then 3-state it in the following cycles. As a master, the RAP aborts the transfer if PCI_DEVSELn is not asserted within 6 clock cycles after PCI_FRAMEn is asserted.

PCI_REQn[0] (PCI Request_0): The RAP asserts PCI_REQn[0] to request a master transfer on the PCI bus when the RAP is not the bus arbiter. In this mode, PCI_REQn[0] is tri-stated when RSTn is asserted. When the RAP is the bus arbiter, PCI_REQn[0] is an input indicating another bus master desires to use the bus. The RAP asserts an internal PCI_REQ line to request a master transfer on the bus. The RAP and the two external masters share the PCI bus resources in a round robin arbitration scheme. PCI_REQn[0] is ignored when RSTn is asserted.

PCI_REQn[1] (PCI Request_1): When the RAP is not the bus arbiter, PCI_REQn[1] is not used. When the RAP is the bus arbiter, PCI_REQn[1] is an input indicating another bus master desires to use the bus. PCI_REQn[1] is ignored when RSTn is asserted.

PCI_GNTn[0] (PCI Grant_0): If the RAP is not the bus arbiter, after RAP detects PCI_GNTn[0] asserted and PCI_FRAMEn and PCI_IRDYn de-asserted, it asserts PCI_FRAMEn and then initiates the bus transfer. If the RAP is the bus arbiter, after the RAP detects PCI_REQn[0] asserted and agent [0] is the next agent to receive the bus, RAP de-asserts PCI_GNTn to the current active agent and asserts PCI_GNTn[0].

PCI_GNTn[1] (PCI Grant_1): If the RAP is not the bus arbiter, PCI_GNTn[1] is inactive. If the RAP is the bus arbiter, after the RAP detects PCI_REQn[1] asserted and agent [1] is the next agent to receive the bus, RAP de-asserts PCI_GNTn to the current active agent and asserts PCI_GNTn[1].

PCI_PERRn (PCI Parity Error): PCI_PERRn indicates data parity errors have occurred. During a master read or slave mode write, the RAP asserts PCI_PERRn within 2 clock cycles after detecting a parity error. In both cases, it asserts PCI_PERRn for one cycle. PCI_PERRn is asserted for more than one cycle if multiple parity errors occur on burst transactions. When the RAP deasserts PCI_PERRn, it will drive it to a high level for one clock cycle and then 3-state it during the following cycles. During a master write, the RAP checks for parity errors by monitoring PCI_PERRn from the target. If the target asserts PCI_PERRn during a master write, the RAP interrupts CPU 90 (CW4011).

PCI_SERRn PCI (System Error): RAP asserts PCI_SERRn when a parity error is detected on PCI_AD[31:0] and PCI_CBE[3:0] during the address phase of a transfer.

PCI_INTn (PCI Interrupt): RAP asserts PCI_INTn when the Transmit Messaging Mailbox is not empty and the interrupt is enabled in the Primary Port Control Register. Additional information is provided in Section 9.2.3, below, which is entitled "Primary Port Control Registers".

3.2.2 Local Memory Interface 66

The Local Memory Interface directly controls access to synchronous DRAM, EPROM, and some physical layer devices. The pins are shared between the different type of devices. The pins have a different use depending on the memory page addressed. The muxing of the pins is shown in FIG. 7.

3.2.3 Clocks and Utility Signals

This section defines the clock and clock select signals as well as miscellaneous control signals.

SYS_CLK_PCI (PCI Clock Select), when high, selects PCI_CLK as the system clock source for the RAP. When low, SYS_CLK is selected as the system clock source. SYS_CLK_PCI must be tied to power or ground and must not change during operation of the RAP.

SYS_CLK (System Clock) is the system clock input for the RAP. The maximum clock frequency is 40 MHz. The system clock frequency internal to the RAP can optionally be multiplied by 2 by asserting the SYS_PLL input.

SYS_PLL (PLL Select), when high, selects an internal system clock that is twice the frequency of the external clock selected by SYS_CLK_PCI. When SYS_PLL is low, the internal system clock is the same rate as the external clock. This signal must be tied to power or ground and must not change during device operation.

PLL_IDDQn (PLL Test): PLL_TEST enables manufacturing test of the internal phase lock loop. This pin should be tied to logic ground (VSS).

PLL_LP2 (PLL Loop Filter Input): PLL_IN connects the PLL's phase detector charge pump output and VCO input to an external loop filter. The external loop filter consists of one resistor and two capacitors.

TM_CLK (Timer Reference Clock) may be used as a reference clock for the seven timers or timestamp counter. TM_CLK has a maximum frequency of one-third the internal system clock rate and may be asynchronous to the system clock.

RTC_CLK (Real Time Clock Reference Clock): The RTC_CLK input may be used as a reference clock for the Real Time Clock counter. RTC_CLK is 32 KHz. a maximum frequency of one-third the internal system clock rate and may be asynchronous to the system clock.

SBRG_CLK (SWAN Baud Rate Generator Reference Clock): SBRG_CLK is the reference clock for the SWAN baud rate generators.

UBRG_CLK (UART Baud Rate Generator Reference Clock): UART_CLK is the reference clock for the UART baud rate generator.

SYS_OE (System Output Enable): SYS_OE, when deasserted, will 3-state all outputs of the RAP.

SYS_NMIn (System Non-Maskable Interrupt): This signal provides a non-maskable interrupt to CPU 90 (CW4011 MiniRISC™). When asserted, it causes CPU 90 to unconditionally execute the non-maskable interrupt handler.

SYS_BOOT (System Boot Source): SYS_BOOT selects the boot source SYS_BOOT is sampled on the rising edge of PCI_RSTn (deassertion). SYS_BOOT sources are listed in FIG. 8.

SYS_PSTALLn (System Pipeline Stalled): SYS_PSTALLn, when asserted, indicates the CPU 90 internal pipeline is stalled. This signal is for system performance tuning.

3.2.4 UART Serial Interface 60

The Serial UART Interface provides a serial port for connecting to a console and allows for RAP system monitor and debug.

U_DTRn (UART Data Terminal Ready): When low it informs the external device that the UART is ready to establish the communications link. It can be set to an active low by programming bit 0 of the MODEM Control Register.

U_RTSn (UART Request To Send): When low it informs the external device that the UART is ready to exchange data. The RTSn output can be set to an active low by programming bit 1 of the MODEM Control Register.

U_DCDn (UART Data Carrier Detect): When low it indicates that the data carrier has been detected by the MODEM status input.

U_DSRn (UART Data Set Ready): When low it indicates that the external device is ready to establish the communications link with the UART.

U_CTSn (UART Clear To Send): When low it indicates that the external device is ready to exchange data.

U_SDIN (UART Serial Data Input): Serial data to the UART from the external device.

U_SDOUT (UART Data Serial Output): Serial data from the UART to the external device.

3.2.5 SWAN Interface 40

S_DTRn (SWAN Data Terminal Ready): S_DTRn is a general purpose modem control output programmed by the RAP CPU. It can be used as DTR or another modem control function.

S_RTSn (SWAN Request To Send): The RAP asserts S_RTSn (low) prior to transmit data transfer.

S_DCDn (SWAN Data Carrier Detect): S_DCDn is a low active modem control input that inhibits data reception and conditionally will generate a CPU interrupt.

S_DSRn (SWAN Data Set Ready): S_DSRn is a general purpose modem control input that will conditionally generate a CPU interrupt. It can be used as DSR or another modem control function.

S_CTSn (SWAN Clear To Send): When deasserted (high), S_CTSn inhibits data transmission and will conditionally generate an interrupt to the RAP CPU.

S_RXD (SWAN Receive Data): Receive serial data.

S_RXC (SWAN Receive Clock): Receive serial clock for synchronous connections.

S_TXD (SWAN Transmit Data): Transmit serial data.

S_TXCI (SWAN Transmit Clock Input): Transmit serial clock input for synchronous connections.

S_TXCO (SWAN Transmit Clock Output): Transmit serial clock output from baud rate generator.

3.2.6 TDM Serial Interface 42a and 42b

TDM_RXD (TDM Receive Data): Receive serial data.

TDM_RCLK (TDM Receive Clock): Receive serial clock.

TDM_RSYNC (TDM Receive Frame Sync Pulse): Receive frame sync pulse.

TDM_TXD (TDM Transmit Data): Transmit serial data.

TDM_TCLK (TDM Transmit Clock): Transmit serial clock.

TDM_TSYNC (TDM Transmit Frame Sync Pulse): Transmit frame sync pulse.

3.2.7 Ethernet 110 Interface 36

The Ethernet 110 Interface provides the connection to an external MII compatible physical larger (PHY) device such as the National DP83840VCE for 10/100 Mb/s Ethernet.

ECOL (Ethernet Collision Detected): The PHY asserts the ECOL signal asynchronously with minimum delay from the start of collision on the media. The PHY deasserts ECOL to indicate no collision. ECOL is internally synchronized to the ETXC clock and in the worst case may take up to two or three clock cycles to be detected by the MAC Transmit Function.

ECRS (Ethernet Carrier Sense): The PHY asserts the ECRS signal asynchronously with minimum delay from the detection of a non-idle medium. The PHY deasserts ECRS when it detects an idle medium. The PHY also asserts ECRS with minimum delay in response to the ETXEN. The PHY assures that ECRS remains asserted throughout the duration of the collision condition.

EDC (Ethernet Management Data CLock): The EDC signal is sent to the PHY as a timing reference for the transfer of information on the MDI and MDO signal lines. MDC is a periodic signal that has no maximum HIGH or LOW times. The minimum HIGH and LOW times are 200 ns each.

EDI (Ethernet Management Data In): The PHY transfers status on the EDI signal to the RAP's Ethernet core. The PHY places status information on the EDI synchronously. EDI is driven through an open drain circuit that enables either the RAP or the Ethernet PHY to deassert the signal. The PHY must provide a resistive pull-up to restore the signal to a HIGH value. The RAP incorporates a weak pull-down on the EDI signal and thus may use the quiescent state of the EDI to determine if the Ethernet PHY device is connected to the RAP.

EDO (Ethernet Management Data Output) The RAP transfers Ethernet control information on the EDO signal to the EThernet PHY device The RAP places control information of the EDO synchronously to the HCLK and the PHY samples the information synchronously. EDO is driven through an open collector or open drain circuit that allows either the PHY or RAP to deassert the signal. The PHY must provide a resistive pull-up to assert the signal.

ERXC (Ethernet Receive Nibble or Symbol Clock): The ERXC signal is a continuous clock that provides a timing reference for transfer of the ERXDV, ERXD[3:0], and ERXER signals from the PHY to the RAP's Ethernet core. ERXC is an input from the PHY. The PHY deasserts the ERXDV signal to make the transition of the ERXC clock between nominal clock frequency and recovered clock frequency. AT the start of a frame, the PHY may extend a cycle of the ERXC clock. Between the time the PHY asserts ECRS and the time it asserts ERXDV, the PHY can extend ERXC by keeping it LOW until the PHY has successfully locked onto the recovered clock and is ready to assert ERXDV. Successive cycles of the ERXC must meet the duty cycle requirement While ERXDV is asserted, the PHY recovers ERXC from the received data. ERXC has a frequency equal to 25% of the data rate of the received signal and is synchronous to recovered data. The duty cycle is between 60% and nominally 25 MHz+/−100 ppm, and ERXC HIGH and LOW times are each between 16 nsec and 24 nsec. For 10 Mbit/s operation, ERXC is nominally 2.5 MHz+/−100 ppm, and the ERXC HIGH and LOW times are each between 160 ns and 240 ns. Some PHYs may have tighter clock tolerances.

When the ECRS signal is deasserted, the PHY provides ERXC at the PHY's nominal clock frequency and with nominal duty cycle. The minimum HIGH and LOW times are each 40% of the nominal ERXC period except for the transition between recovered clock frequency and nominal clock frequency, which occurs while ERXDV is deasserted. Following the transition from ERXDV asserted to ERXDV deasserted, the PHY can keep ERXC in either the HIGH or LOW condition to extend the ERXC clock by one cycle until the PHY is ready to provide ERXC from a nominal clock source. The maximum HIGH or LOW time for ERXC during this transition is two times the nominal clock period.

ERXD[3:0] (Ethernet Receive Nibble Data): ERXD[3:0] consists of four data signals that the PHY drives synchronously to the rising edge of the ERXC clock. For each ERXC period in which ERXDV is asserted, the PHY transfers for bits of data over the ERXD[3:0] signals to the RAP's Ethernet core. ERXD0 is the least significant bit. When ERXDV is deasserted, the ERXD[3:0] signals have no effect on the RAP's Ethernet core. For a frame to be correctly interpreted by the RAP's Ethernet core, a completely formed start of frame delimiter (SFD) must be passed across the interface.

ERXDV (Ethernet Receive Data Valid): The PHY asserts the ERXDV signal to indicate that the PHY is presenting recovered and decoded nibbles on the ERXD[3:0] signals and that the ERXC is synchronous to the recovered data. The PHY asserts ERXDV synchronously to the rising edge of the ERXC. The PHY keeps ERXDV asserted from the first recovered nibble of the frame through the final recovered nibble and deasserts it prior to the first ERXC that follows the final nibble. ERXDV encompasses the frame, starting with the Start-of-Frame delimiter and excluding any End-of-Frame delimiter. The PHY may also assert ERXDV for transferring a validly decoded preamble.

ERXER (Ethernet Receive Error): The PHY asserts the ERXER signal to indicate to the RAP's Ethernet core that a media error (for example a coding error) was detected somewhere in the frame presently being transferred to the PHY. The PHY asserts ERXER synchronously to the rising edge of ERXC for one or more ERXC periods.

ETXC (Ethernet Transmit Nibble or Symbol Clock): The ETXC signal operates at a frequency of 25 MHz or 2.5 MHz. ETXC is a continuous clock that provides a timing reference for transfer of the ETXER signals from the RAP's Ethernet core to the PHY. The PHY provides the ETXC. The ETXC frequency is 25% of the transmit data rate. A PHY operating at 100 Mbit/s provides an ETXC frequency of 25 MHz+/−100 ppm. A PHY operating at 10 Mbit/s provides a ETXC frequency of 2.5 MHz+/−100 ppm having a duty cycle between 40% and 60% inclusively.

ETXD [3:0] (Ethernet Transmit Nibble Data): The ETXD [3:0] signals are synchronous to the rising edge of ETXC. ETXD[3:0] consists of four data signals that are synchronous to ETXC. For each ETXC period in which ETXEN is asserted, the PHY accepts the ETXD[3:0] signals for transmission. ETXD0 is the least significant bit. When ETXEN is deasserted, the ETXD[3:0] signals have no effect on the PHY.

ETXEN (Ethernet Transmit Enable): The ETXEN signal indicates that the RAP's Ethernet core is presenting ETXD [3:0] nibbles on the MII for transmission. The Ethernet core asserts ETXEN synchronously with the first nibble of the preamble. ETXEN remains asserted while all nibbles are presented to the MII. The Ethernet core deasserts MTXEN prior to the first ETXC following the final nibble of the frame. The EThernet core generates ETXEN synchronously to the rising edge of ETXC, and the PHY samples ETXEN synchronously.

ETXER (Ethernet Transmit Coding Error): The RAP's Ethernet core asserts the ETER signal synchronous to the rising edge of the ETXC, and the PHY samples ETXER synchronously. When the Ethernet core asserts ETXER for one or more ETXC periods while ETXEN is also asserted, ETXER causes the PHY to transmit one or more symbols that are not part of the valid data or delimiter set somewhere in the frame being transmitted to indicate that there has been a transmitter coding error. The effect of the assertion of ETXER upon the PHY while EXTEN is deasserted is unspecified.

3.2.8 V.34 Interface 44

This section lists the interface signals to the modem analog section, for example, a SGS-Thompson ST7546 V.34 Codec with DAA Interface front end.

VSCLK (Serial Bit Clock): This pin clocks the data into VDIN and out of VDOUT during the frame synchronization interval.

VFS (Frame Synchronization): This frame synchronization is used to indicate that the device is ready to send and receive data. The data transfer begins on the falling edge of the frame-sync signal during the rising edge of VSCLK.

VMCLK (Master Clock): This signal is used to provide all the clocks of the V.34 interface device. The input varies from 0.5 MHz to 2.88 MHz maximum.

VHC1 (Hardware Control 1): This pin is for the hardware control and configuration of the V.34 front end device.

VHC0 (Hardware Control 0): This pin is for the hardware control and configuration of the V.34 front end device.

VIN (Serial Data Input): This pin is used to transfer the data from the V.34 front end device to the RAP.

VOUT (Serial Data Output): This pin is used to transfer the data from the RAP to the V.34 front end device.

3.2.9 Test Interface 64

The Boundary Scan Test Interface conforms to IEEE 1149.1. The interface signals are described below.

BS_TCLK (Boundary Scan Test Clock): BS_TCLK shifts the boundary scan register and has a maximum frequency of 40 MHz.

BS_TDI (Boundary Scan Test Data Input): The test data input, BS_TDI, is sampled on the rising edge of BS_TCLK.

BS_TDO (Boundary Scan Test Data Output): BS_TDO provides the output for the boundary scan register's data.

BS_TM (Test Mode): BS_TM provides the shift enable to the boundary scan register.

BS_TRSTn (Test Reset): BS_TRSTn, when asserted, resets the Boundary Scan Test Access Port controller.

TEST_EN (Factory Test Enable): TEST_EN enables factory test. This signal must be tied to ground during normal operation.

3.2.10 Power and Ground Pins

This section lists the power and ground pins. The number of power and ground pins has been selected to provide reliable operation and high I/O signal integrity.

VSS (Logic Ground): Thirteen pins are dedicated to reference ground for internal core logic.

VDD (Logic Power): Twelve pins are dedicated to the 3.3 V supply voltage for internal core logic.

VSS2 (I/O Ground): Nine pins are dedicated to reference ground for the I/O pad ring.

VDD2 (I/O Power): Nine pins are dedicated to powering the I/O pad ring. Nominal voltage is 3.3 V.

PLL_VSS (PLL Logic Ground): The PLL uses one isolated reference ground pin.

PLL_VDD (PLL Power): The PLL uses one isolated 3.3 V power pin.

PLL_AGND (PLL Analog Ground): A separate reference ground pin is provided for the analog section of the PLL.

PCI_CLAMP (PCI Clamp Voltage) Seven pins provide voltage to the PCI input clamp diodes. This voltage is required 11 V overvoltage specification of PCI Local Bus Specification 2.1, chapter 4.2.1.3.

V_BAC (Real Time Clock Back-up Voltage 58): 3.3 volts input provides battery backup of Real Time Clock during power interruptions to the RAP.

4. Functional Description 4.1 RAP CPU & CW4011 MiniRISC™ Processor 90

The RAP's Central Processing Unit (CPU 90) is based upon LSI Logic Corporation's CW4011 MiniRISC™ high performance processor core. CW4011 is the G10 implementation of the LSI Logic CW4010 superscalar MIPS processor. A block diagram of CPU 90 is shown in FIG. 9. CPU 90 interfaces to RAP logic via two interfaces. The SC-bus 220 is a 32-bit bus for accessing PCI, Local Memory and RAP internal registers. The On Chip Access (OCA) 222 bus provides high speed access to the SRAM 84 used as shared memory with the DMA Controller 82. In addition to the CW4011 core, CPU 90 provides: direct-mapped or two way set associative instruction cache, direct-mapped or two-way set associative data cache, a writeback buffer for writeback cache mode, reset control and address translation hardware. The RAP Chip and CW4011 core are configured such that all data structures are big endian.

4.1.1 RAP CPU Register Set

In addition to the CW4011 registers, CPU 90 contains the registers identified in FIG. 10. CPU 90 directly accesses external devices on either the PCI or Local Memory Bus. The slave address space reflected on the PCI is 128 Mbytes and, together with Internal Memory SRAM 84 and hardware registers results in internal address buses [31:0]. Address bits [31:30] define whether the operation is a PCI bus, local memory, internal SRAM 84 or hardware registers. The CPU_AddrMap register holds the most significant bits of an address for an CPU access through the PCI or Local Memory Port in order to extend external address buses to 32 bits.

The CPU_AddrMap Register is shown in FIG. 11. The CPU_Boot bit is copied from the SYS_BOOT signal when PCI_RSTn is deasserted. The bits specify where the exception vector virtual address 0xbfc0 0000 is mapped. Note that CPU may change this bit during runtime as it may write the register CPU_AddrMap.

The CPU_Reset bit is set when the hardware PCI_RSTn signal is asserted. All hardware modules remain in an idle state as long as this bit is set. The CPU should initialize all hardware registers and memory resident data structures before clearing the CPU_Reset bit. Note that CPU may set the bit during operations, effectively performing a software reset.

The 5-bit wide field, CPU_PciMSB, is concatenated with the 27 bit wide internal address to form 32 bit wide external address on the PCI bus. The 5-bit wide field, CPU_LmMSB, is concatenated with the 27 bit wide internal address to form 32 bit wide external address on the Secondary Port.

The 6-bit field, CPU_IntAck, is used to reset the corresponding bit of the non-vectored interrupts. Pending interrupts are cleared by writing a "1" bit in the corresponding bit position of CPU_IntAck. The status of non-vectored interrupts is contained in CPU 90 (CW4011) cause register.

FIG. 12 illustrates the PCI and Local Memory address formation. The exception vector space located at virtual address 0xbfc0 0000 is further remapped using the field CPU_ExcMap as shown in FIG. 13. This space may be mapped on the Secondary Port for booting from byte wide EPROM or SRAM/DRAM code downloaded from PCI. FIG. 13 illustrates the Local Memory address formation for exception vectors.

CPU 90 supports three types of interrupt signals:
1. Cold/Warm Resets (CRESETn and WRESETn) and Non-Maskable Interrupt (NMIn);
2. External Interrupts EXiNTn[5:0]; and
3. External Vectored Interrupt EXiNTn.

The RAP integrates an interrupt controller to efficiently support External Vectored Interrupts.

4.2 RAP Memory Map

FIG. 14 shows the RAP memory map.

4.2.1 External Vectored Interrupt sources

The possible sources of vectored interrupts are listed in the table shown in FIG. 15. Interrupt number 15 has the highest priority while the interrupt number 0 the lowest priority. The interrupts are level sensitive. Interrupts are cleared by removing the condition at the source of the interrupt.

Looking at FIG. 15, Int_DMA is the buffer completion/exception interrupt from the DMA controller; Int_EN is an exception interrupt from the ethernet controller; Int_V.34 triggers the V.34 datapump; the Int_PCI interrupt is asserted whenever a PCI error has occurred, to report PCI related Mailbox interrupts or to signal PCI DMA completion; Int_SWANn indicate an exception by the associated SWAN controller; Int_RTC is the Real Time Clock interrupt; an enabled Timer time-out event generates the Int_Timer interrupt; Int_GPI/O are external interrupts from the General Purpose I/O port; and Int_UART is the UART interrupt.

4.3 Local Memory Interface 66

The Local Memory Controller (LMC) 110 provides access to external memory used for packet buffers, CPU instructions and data structures Synchronous DRAM devices and SGRAM used as an SDRAM are supported. The LMC is also used to access byte-wide EPROM for CPU boot and the control port of external PHY devices.

The LMC supports three memory pages. The SDRAM page can be configured from 1 MB to 16 MB using 1 physical bank of ×4, ×8, ×16 and ×32 parts. Another memory page supports 8-bit boot prom. The third memory page is the 8-bit interface used to access external PHY devices. Memory page address assignments are summarized in FIG. 16.

The three memory pages share the same I/O pins. The SDRAM is directly connected to the RAP, the EPROM and PHY pages are connected through transceiver parts. FIG. 17 is a table which shows the pin usage based on which memory page is being accessed.

There are 4 bus masters that access the local memory: the CPU, the multi channel DMA engine, an external PCI bus master, and the PCI DMA engine. Priority will be a simple round robin between the CPU, the multi channel DMA and one of the PCI masters. The PCI bus master and the PCI DMA engine will have a round robin priority between them to see who gets to arbitrate for memory. The CPU is the only master that can access the PHY page. The CPU and the PCI masters can access the EPROM, but the multi channel DMA cannot. Burst transfers are not allowed to the EPROM or PHY pages.

The RAP has an internal refresh controller for the DRAM. DRAM typically requires all rows be refreshed at least once every 64 ms. If there are 4,096 rows this requires a refresh interval time of roughly 15,625 ns. If the RAP's clock frequency is 80 MHz, a refresh command must be issued every 1,250 clock cycles. This would need an 11 bit counter, The DRAM Controller actually has a programmable 12-bit refresh interval timer that is used to initiate refresh cycles. This counter should be big enough for any DRAM. The refresh counter is loaded with the number of clocks between refresh cycles. The counter will then decrement to 0. When the refresh counter reaches 0 it will start a refresh cycle and reload the refresh counter. The refresh is started when the current memory transfer completes. The refresh will always take precedence over other memory requestors.

4.3.1 SDRAM Configuration

SDRAM configuration settings are dependent on the RAP's clock frequency and the SDRAM speed grades. The default setting (reset state) of the SDRAM Control Register corresponds to NEC 16 Mb SDRAM with −A10 speed grade and a system clock of 80 MHz. The SDRAM must be initialized before it can be used. The SDRAM parts must be programmed to a burst of 8, normal operation mode, and sequential burst sequence. The CAS latency depends on system configuration. A typical SDRAM would have all banks precharged, two CBR refresh cycles, and then the mode register would be programmed. Then the SDRAM would be ready. There are bits in the SDRAM control register that allow software to initiate the precharge, refresh, and mode register set commands.

The CPU 90 has a low power mode where it is waiting for an interrupt. When this state is active the memory controller may put the SDRAMs in a low power state by taking CLKE low. The SDRAM will do an internal refresh to keep the data valid in this mode. Entering the low power state is controlled by the LP bit in the SDRAM control register.

The DRAM Refresh Register (CPU address 0xB800 0100) is shown in FIG. 18. RIC[11:0] (Refresh Interval Count) selects the number of system clock cycles between refresh commands. For 80 MHz operation, RIC[11:0] should be programmed to a value no greater than 0d1250 to ensure refresh occurs within 64 ms. RIC[11:0] is write only. RCV [11:0] (Refresh Counter Value) is the state of the Refresh counter. The LMC issues a CBR Refresh command when the Refresh Counter wraps. RCV[11:0] is read only.

Following reset, the Refresh Interval Count and Refresh Counter are both 0. The Refresh Interval Timer is activated by writing a non-zero value to RIC[11:0]. Starting from the value, RIC[11:0], the Refresh Counter decrements each system clock cycle. When the Refresh Counter expires, the LMC will arbitrate for a refresh cycle and load the count from RIC[11:0]. The refresh has a higher priority than the rest of the bus masters that are in round robin mode so the refresh should complete in a timely fashion. The refresh for the DRAM is always CAS before RAS refresh.

FIG. 19 shows the SDRAM Control Register (CPU address 0xB800 0108), which has several bits:

LP Low Power bit 31
When LP is set to a one the memory will put the SDRAMs in a low power mode when the CPU is in the wait for interrupt state.

PC Manual Precharge Command bit 30
When PC is set, it causes the LMC to generate one precharge cycle for both SDRAM banks. This bit is automatically cleared on completion of the precharge command. When MRS (Mode Register Set) bit 29 is set, the subsequent Store Word operation to the SDRAM bank generates a mode register set command. The SDRAM mode register bits are loaded from the row address bits, therefore the format for the Store Word address is dependent on the SDRAM configuration. The bits of the virtual address that map to the row address are shown in the table below for the RBS field of this register. The Store Word data is not used. The LMC will clear the MRS bit when the mode register write operation is complete.

REF Refresh Cycle Command bit 28
Manual refresh command. When set, it causes the LMC to generate one refresh cycle to both SDRAM banks, independent of the state of the refresh timer. This bit is automatically cleared on completion of the refresh command.

CL[1:0] CAS Latency bits 21–20
CAS latency is selectable from 1–3 cycles. The default setting is 3 cycles corresponding to 80 MHz operation with NEC SDRAMs with −10 speed grade.

RC[3:0] Refresh to Refresh/Active Command Period bits 15–12
RC[3:0] selects the minimum number of cycles between the CBR refresh command (REF) and the next command. That is, if REF occurs in cycle n, then the soonest the next command will occur is cycle n+RC [3:0]. RC[3:0] is also the minimum number of cycles between row activate commands. Valid settings are 2–10. The default setting is 8.

DPL2 Dat-in to Precharge Command Period bits 11
DPL selects the number of clocks from the last write to the Precharge command. DPL2, when set causes one cycle delay between the last word of a write and the Precharge. Otherwise, the write will be terminated by a Precharge command in the cycle following the last valid write data cycle.

RAS[2:0] Active to Precharge Command Period bits 10–8
The number of clock cycles between the Row Activate and Precharge commands is specified by RAS[2:0]. That is, if RAS occurs in clock cycle n, PRE will not occur before clock cycle n+RAS[2:0]. Valid settings are 3–7. The default setting of 5, is required for NEC SDRAMs with −10 speed grade at 80 MHz.

RRD2 Bank to Bank Delay bit 7
When set to a 1, the bank to bank delay is 2, that is one cycle is skipped between bank activate commands. When set to 0 the bank to bank delay is 1.

RL[2:0] RAS Latency bits 6–4

RBS[1:0] Row address Bit position Select bits 1-0
RBS selects which internal transfer bus bits are put on which LB_A address lines. The row and column addresses are multiplexed onto the LB_A[11:0] pins. The row address can be configured to be internal transfer bus address bits [23:12], [22:11], [21:10] or [19:10] depending on the memory configuration. The bits that drive in the RAS cycle are determined by the number of column address bits. The selections above correspond to column address widths of 10, 9, 8 and 8 bits. The address is for a 32 bit word so the internal transfer bus address bits [1:0] are never put on the LB_A lines. Internal transfer bus bits [1:0] are used to set the LB_DQMn pins. The column address will always be internal transfer bus address bits [11:21]. The upper bits of the column address may not be used by all SDRAMs in which case they are also output in the RAS cycle. The smallest SDRAM configuration supported has 8 CAS and 10 RAS address bits. Twelve bits of address are needed for a SDRAM with 12 bits of row address and 10 bits of column address. This is the maximum address size the RAP supports. The maximum column address is 10 bits. The maximum row address is 12 bits. The maximum of the row and column address bits added together is 22. The table of FIG. 20 shows the various configurations.

4.3.2 EPROM Configuration

The EPROM interface is provided for boot code. The CPU 90 and the PCI external master can access the EPROM page. The port is only 8 bits so the LMC 110 will convert word accesses to 4 byte accesses transparent to the CPU 90 or PCI master. Byte accesses are also allowed. The RAP is big endian, so address 3 will go to the least significant byte of a word transfer, address 0 will go to the most significant byte. A byte read of address 3 will have data valid on the least significant byte of data. A byte read of address 0 will have data valid on the most significant byte of data. Even though the port is 8 bits, the LMC will move data to the proper byte lane as seen by the CPU and PCI.

For writing/erasing a flash part, one of the general purpose programmable I/O pins will need to be used for the WP pin on the FLASH. The timing of the long write/erase times is done in software. The timing of the interface is controlled by a programmable wait state generator. The EPROM control register is programmed to match the read and write timing of the part used. The number of cycles to use for these parameters depends on the flash device used and the RAP clock frequency.

FIG. 21 illustrated the EPROM Control Register (CPU address 0xB800 0110), which has the following bits:

WH_T Write High Time bits 21:20
  Sets the number of cycles for the high portion of the write enable pulse.
WL_T Write Low Time bits 19:16
  Sets the number of cycles for the low portion of the write enable pulse.
RR_T Read Recovery Time bits 6:4
  Sets the number of cycles from CS and OE going high to when the device stops driving data. The RAP will not start another memory cycle until this time has passed.
R_T Read Time bits 3:0
  Sets the number of cycles from the OE going low to where the read data is sampled in the RAP.

4.3.3 PHY Configuration

The PHY interface is provided to allow access to 8 bit chips. The CPU is the only master that can access the PHY page. The port only allows byte transactions. Any word transaction will complete on the internal chip bus but reads will always return 0 and nothing will be written on a write. The address and data may be muxed or not muxed. The control signals for this port are CSn, OEn, WEn, and ALE. The timing is governed by a programmable wait state generator. No ready or acknowledge signals will be checked. If there are multiple devices on the PHY port then an external PAL will be needed to generate the chip selects. An external PAL will probably be needed to convert the timing of the CSn, OEn, WEn, and ALE signals to what the device needs.

The PHY Control Register (CPU address 0xB800 0118) is shown in FIG. 22, which has the following bits:

MUX MUX bit 31
  If set to a one the address and data lines are multiplexed.
ALE Address Latch Enable bits 30:27
  Sets the number of cycles for the high portion of the ALE pulse.
WH_T Write High Time bits 21:20
  Sets the number of cycles for the high portion of the write enable pulse.
WL_T Write Low Time bits 19:16
  Sets the number of cycles for the low portion of the write enable pulse.
RR_T Read Recovery Time bits 6:4
  Sets the number of cycles from CS and OE going high to when the device stops driving data. The RAP will not start another memory cycle until this time has passed.
R_T Read Time bits 3:0
  Sets the number of cycles from the OE going low to where the read data is sampled in the RAP.

4.4 DMA Controller (DMAC) 82

DMA Controller 82 is illustrated in FIG. 23. DMAC 82 moves data between the serial communications controllers (SWANs 76a–76d, E110 ethernet controller 74 and V.34 codec interface 72) and either the integrated SRAM 84 or Local Memory Interface 66. The DMAC buffers data to and from the byte-wide communications controllers and bursts 1,2,4 or 8 words to the Local Memory Interface 66. Arbitrary byte alignment is supported.

The DMAC 82 supports 6 transmit and 12 receive link list buffers. Transmit buffers are assigned on a per channel basis, whereas receive buffers are assigned based on channel # and frame address. Up to 6 bytes of frame address can be used to determine receive buffer, or if the frame should be discarded.

DMAC arbitration for the RAP internal bus 86 alternates between input and output. Arbitration for channel service uses a two priority method based on communication channel FIFO status. Each serial port has programmable thresholds. Those channels with data levels exceeding threshold on receive, or below threshold during transfer are given higher priority than other channels. This allows the DMAC 82 to adapt to peaks in data transfer rate and allows high speed and low speed channels to peacefully coexist.

Data frames are transferred between the serial interface controllers and the 32-bit Local Memory or internal SRAM 84. Both interfaces are maintained and monitored by DMAC 82. An additional End Of Frame (EOF) bit is transferred with each byte through each queue 250 and 252. The EOF bit is active (one), one byte after the last data byte of a frame.

For multiplexed operations, Buffer Memory Control sections 254 and 256 govern which multiplexed channel is transmitting and receiving from or to the Local Memory Interface over bus 86. In order to prevent overruns and underruns on any particular channel, each channel is given an equal time share to access Buffer Memory. This process is achieved in DMAC 82 by using word groups.

A Word Group is a collection of 1 to 32 bytes that are transferred to or from Buffer Memory. The DMA burst length can be programmed to be 1, 2, 4, or 8 words. The number of bytes transferred is dependent on the address and byte count of the data buffer that's being accessed as well as the programmed burst size. When the data buffer address starts on an odd boundary, DMAC 82 will transfer the appropriate number of bytes to reach the boundary specified by the burst size.

In the transmit direction, one Transmit Data Queue 250 is required per multiplexed channel. The Channel Number (Chan #) is an input to the Transmit Word Group Queue and selects the appropriate queue in which to write transmit data into.

Buffer Memory Control 254 will transfer one word group per DMA channel from Buffer Memory into the Transmit Word Group Queue 250. The specified Channel Number (Chan #) accompanies each data word through the Transmit Word Group Queue 250. Four Byte Enable flags also accompany each data word through the Transmit Word Group Queue 250.

While Buffer Memory Control 254 is getting another word group from Buffer Memory, Word Group To Byte Separation logic will move the word group into the appropriate Transmit Data Queue within circuit 250. This is performed one byte at a time. A byte is discarded if it does not have its respective Byte En flag active.

Servicing of the Transmit Data Queues is based on the status signals of each queue. Once a frame has begun transmission to a given queue, the almost empty status flag is used to determine when to request another burst length of data for replenishing. At the beginning of a frame, the physical device should not begin reading the Tranismit Data Queue until the alrnosc full flag is detected or the end of frame is seen (EOF). This elasticity should ensure that all Transmit Data Queues do not underun once a frame has begun.

In the receive direction, each channel of DMAC 82 has an associated byte wide Receive Data Queue within circuit 252. In additicn to the 8 bits of data, the Receive Data Queues have 1 bit indicating the End of Frame (EOF). The EOF bit is set in the Receive Data Queue byte location immediately following the last data byte of a frame. Bits 0–7 of the byte associated with the EOF bit are used as error flags from the serial interface controller.

Servicing (reading) of the Receive Data Queues is based on the status of the queues. Each queue provides an empty and a half-full flag to Receive Buffer Memory Control 256. Non-empty receive queues are serviced sequentially, one byte per clock. Half-full queues will be given priority over non half-full queues. Arbitration for the queues occurs in parallel with the read operations such that all clock cycles can be used for data transfer.

A Byte To Word Group Collection circuit within circuit 252 will get a byte of data from the Receive Data Queue. The Byte To Word Group Collection circuit will collect data bytes for all enabled channels. When a word group is reached, the Byte To Word Group Collection circuit will notify Buffer Memory Control 256, and the word group will be written to Buffer Memory through output 258.

While a word group is being transferred to Buffer Memory, Byte To Word Group Collection will continue to collect data bytes for all enabled channels.

Circuit 252 further includes a Header Offset Lookup Table. The Header Offset Lookup Table provides a parameter for indexing the beginning of the receive frame header on a per channel (RxQue channel) basis. This 4-bit parameter is an integer offset into the incoming frame to indicate the byte number of the first header byte. If the first byte of the frame is the beginning of the Frame Header field, then Header Offset parameter is set to zero.

Circuit 252 includes a Receive Frame Header Array, which is a small memory array used for incoming (receive) data frames. Four bytes of information are stored per incoming channel number. For each frame received, the DMAC captures the 4 byte Frame Header field and then routes the field to the Receive Frame Action CAM 260. The Header Offset parameter defines the absolute offset to the Frame Header field in the receive data frame.

The Receive Frame Action CAM 260 is a Contents Addressable Memory (CAM) array used for incoming (receive) data frames. Up to six bytes of information can be compared, depending on a MASK field which has been programmed in the CAM. When a 6 byte Frame Header field has been captured in the Receive Word group Queue, the Frame Header is routed to the Receive Frame Action CAM 260. The Frame Header is masked off with the MASK field, the CAM is searched, and the result of the CAM search (Cmp Out) is routed to the Buffer Memory Control logic 256. If a match is found in the CAM 260, the frame is routed to the receive buffer linked list specified in the Cmp Out field.

Eight receive errors (Error Flags) are routed through the Receive Data Queue 252 and are valid when the EOF flag is also set. At the end of a data frame, the DMAC 82 will write these flags to Buffer Memory into the Flag field of the current Buffer Memory Descriptor. In addition to the errors reported via the Receive Data Queues, an error is signalled if a receive frame exceeds 64K bytes. Data errors are reported in this manner to allow higher layer entities to process the errored frames (for example, by maintaining statistics & discarding errored frames).

As mentioned above, DMAC 82 and CPU 90 maintain one Linked Buffer Memory Descriptor (BMD) List in SRAM 84 for each transmit channel and two linked BMD lists for each receive channel of DMAC 82. Configuration Registers/Processor Interface 270 includes one BMD pointer register for each BMD list maintained in SRAM 84, which points to the addresses of the active transmit or receive buffer memory descriptor in SRAM 84. These descriptors provide the transmit and receive parameters for the data presently being transmitted and received. The BMD pointer registers are updated by DMA controller 82.

A linked BMD list is a set of link accessed BMDs. The Linked BMD Lists are located in Buffer Memory and each BMD is aligned on a 16 byte boundary. The BMD Pointers in DMA controller 82 point to the first BMD in each linked list. An example of a BMD Pointer and a Linked BMD List Structure is shown in FIG. 24. Data bytes 268 are located in Local Memory, which is coupled to local memory interface 66 (shown in FIG. 3). The first BMD in the list has a Next BMD Pointer 270, which points to the next BMD in the list. When the DMAC reaches the end of a BMD List, the Next BMD Pointer of the last BMD is equal to zero, as shown at 272.

When DMAC 82 removes one or more BMDs from the linked list, it sets its current BMD Pointer 274 (in the DMAC) equal to the Next BMD Pointer of the current BMD:

BMD Pointer←Next BMD Pntr

When the RAP CPU 90 adds one or more BMDs to the end of the linked list, it sets the Next BMD Pointer of the last BMD equal to the Buffer Memory address of the first BMD that's being added:

Next BMD Pntr←Address of BMD

The host microprocessor can also add one or more BMDs to the middle of a linked list by modifying the Next BMD Pointer of the BMD to insert the next link. It must also modify the Next BMD Pointer of the last added BMD to complete the link operation.

4.4.1 Buffer Memory Descriptor Format

FIG. 25 illustrates the buffer memory descriptor format. Each Buffer Memory Descriptor (BMD) is 16 bytes long and resides in Buffer Memory (such as SRAM 84 in FIG. 3), which is aligned on an 16 byte boundary.

RxErr[7:0] are the receive error flags from the Serial Ports. The Error flag definition from the ethernet port 36 is shown in FIG. 26. RSV22 indicates a carrier event was detected some time after the last receive frame. A carrier event is defined as activity on the channel that does not result in a packet receive attempt. An example is receiving a preamble, but no SFD, or receiving more than 7 bytes of preamble. RSV20 indicates a bad packet is received. RSV19 indicates a long event was previously seen. RSV18 indicates an invalid preamble (not 55hex or code 5055hex was received with this frame). RSV15 indicates a CRC error was detected with the receive frame. RSV14 indicates a dribble nibble (odd number of nibbles) was received in is this frame. RSV13 indicates a 4B/5B code violation was detected on receive.

The Error flag definition from the SWAN ports is shown in FIG. 27. CRC_Err indicates a CRC error was detected for synchronous protocols or a parity error was detected for asynchronous protocol. Frame_Err indicates the HDLC trailing flag was received off byte boundary or a missing stop bit was detected in asynchronous mode. Abort_Err indicates the HDLC frame ended with an abort or Data Carrier Detect was deasserted prior to the trailing HDLC flag in synchronous mode. For async, Abort_Err indicates detection of a break condition or the Deassertion of DCD.

4.4.2 DMAC Registers

DMAC 82 maintains several registers in block 270. These registers include a DMAC Control Register, a DMAC Transmit Channel Enable Register, a DMAC Receive Channel Enable Register, a DMAC Interrupt Enable Register, a DMAC Interrupt Queue Register, a DMAC Header Offset Lookup Table, Receive Frame Action CAM Compare Data Registers 1 and 2, a Receive Frame Action CAM Compare Mask Register, and a Receive Frame Action Register. These registers are illustrated in FIGS. 28a–38a, and individual bits are defined in FIGS. 28b–38b, respectively.

4.5 V.34 Modem

The V.34 Modem in RAP 34 includes CW4011 resident software, a 16-bit multiply/accumulate 96 (shown in FIG. 3) and the V.34 Codec Interface 44. The V.34 Codec Interface 44 provides a serial interface to an external V.34 Codec.

The LSI Logic V.34 SoftModem core is a software function ported to the RAP chip. All of the V.34 modulation/demodulation and call control intelligence is contained in the V.34 software available trom LSI Logic Corporation. This software, however, needs certain ports to communicate with the logic and access circuitry that is Implemented external to the chip in order to drive the telephone line. The RAP chip provides an integrated set of controls and interface ports designed to connect directly to preferred codec/DAA circuitry located external to the RAP. This integrated set of controls and interface ports is referred to as the "V.34 Interface Block 72".

The V.34 interface block 72 is the interface between RAP 34 and the off-chip line and voice codec/DAA combination, as shown in FIG. 39. The design of the V.34 interface block is optimized for the LSI Logic codec/DAA reference design, but other implementations are possible. The V.34 interface includes a serial Line Data path 280 (this is the path for the digital samples coming from and going to the telephone line), a serial Voice Data path 282 (this is the path for digital samples coming from and going to the microphone and speaker), and a set of control and status signals. The serial Line Data path includes FIFOs 284a and 284b and serial interface 286, which are located on RAP 34 and communicate with DMAC 82 (shown in FIG. 3), and external Line Codec 288. The serial Voice Data path includes FIFOs 290a and 290b, serial interface 292, and external Voice Codec 294. The Line Data interface and Voice Data interface are serial connections to external Codecs 288 and 294. The interfaces are based on Time Division Multiplexed protocols specific to the codecs used. V.34 Codec Interface Block 72 further includes an modem control register 296 which is coupled to an external DAA/Line control circuit 298 that is associated with Codecs 288 and 294.

4.6 Ethernet Controller

Ethernet Controller 74 (FIG. 3) is based on LSI Logic Corporation's E-110 Core. The E-110 core provides the MAC layer for Fast Ethernet (100BASE-T) networks. The physical layer interface conforms to the Media Independent Interface specification. The Ethernet controller block contains 128 byte transmit and receive FIFOs. Transmit FIFO roll-back and automatic retransmission is supported when an ethernet collision occurs within the first 64 bytes of the frame. Late collisions are reported to CPU 90 for software initiated retransmission.

4.6.1 MAC address recognition

In the group type of address recognition, the Ethernet controller determines whether the group address is a broadcast address. If the broadcast addresses are enabled, the frame is accepted. If the group address is a multicast address, the user can perform address recognition using a multicast filter hash table.

In the has table algorithm, the hash value is used as an index to the multicast filter hash table. The hash value includes the six most significant bits of a CRC generator calculated on the 48-bit multicast address and maps into one of the 64 bits of the multicast table. Bit 5,4,3 of the hash value select a byte of the multicast table, while bits 2,1,0 select the bit within the byte selected.

When a frame is received by the Ethernet controller, if the CRC generator selects a bit that is set in the hash table, the frame is accepted; otherwise, it is rejected. The result is that the hash table prevents certain multi.cast address frames from reaching memory. Those that do reach memory must be further filtered by the processor to determine if they contain one of the preferred addresses. An IP group address (32-bit address) can be mapped to an Ethernet multicast address by placing the low-order 23-bits of the IP address into the lower-order 23 bits of the Ethernet multicast address.

4.6.2 Statistics

Statistics should be RMON compliant. Listed below are the statistics counters required to build an RMON ether Stats Table. The Ethernet controller will maintain these statistics separately for both receive and transmit. The 17 statistics will be implemented in 34 32-bit counters. In addition, non-RMON 32-bit counters will be use to maintain non-RMON statistics (such as Transmission Collision Count, Receive Collision Count, Late Collision Count, etc.).

The RMON Statistics Counters include an Events Dropped Counter, a Byte Counter, a Packet Counter, a Broadcast Packet Counter, a Multicast Packet Counter, an Alignment Error Counter, a Runt Packet Counter, an Oversize Packet Counter, a Fragment Packet Counter, a Jabber Counter, a Total Collision Counter, a 64 Byte Packet Counter, a Counter for 65–127 Byte Packets, a Counter for 128–255 Byte Packets, a Counter for 256–511 Byte Packets, a Counter for 512–1023 Byte Packets and a Counter for 1024–1518 Byte Packets.

4.6.3 Collision Handling

If a collision is detected during a frame transmission, the transmission is not terminated immediately. The preamble and start of frame delimiter are transmitted unmodified. If a collision is detected after the preamble and start of frame delimiter are transmitted, the data transmitted a "jam" pattern of alternating ones and zeros for 32 bits before the transmission is terminated.

In the Retry Algorithm, when a transmission attempt has terminated due to a collision, the transmission is retried until either it is successful or 15 retries (16 attempt total) have been terminated due to collisions A controlled randomization process called "truncated binary exponential backoff" schedules the retransmission. At the end of a jamming, the transmitter waits a random number of slot times before attempting to retransmit the frame. A slot time is 512 bit times. A Random Number Generator is used to generate a random number for transmit backoff.

4.6.4 Ethernet Register Description

Ethernet controller 74 includes a plurality of registers 300, which are shown in FIG. 40. FIGS. 41a–41p show the individual registers in greater detail, which include an Ethernet Control/Status Register, an Ethernet Register Address Register, an Ethernet Control Data Register, an Ethernet Status Data Register, an Ethernet Receive Status Register, an Ethernet Receive CRC Register, an Ethernet RNG Seed Register, an Ethernet Transmit Control Register, an Ethernet IPG Part 1 Register, an Ethernet IPG Part 2 Register, an Ethernet Back to Back IPG Register, an Ethernet Rx Statistics Vector, an Ethernet Rx Statistics Vector, an Ethernet Tx Statistics Vector, an Ethernet Tx Statistics Vector, and an Ethernet Rx Interrupt Register.

4.7 Serial WAN Controllers

Four SWAN Controllers 76a–76d (FIG. 3) provide multiprotocol framing for up to four WAN ports. Two or three SWAN controllers may be required for an ISDN BRI connection for 2B or 2B+D configurations, respectively, at TDM interfaces 42a and 42b. Maximum data rates are protocol dependent. Clocked synchronous connections have a maximum data rate of 52 Mbps. Non-clocked synchronous connections are supported up to 2.048 Mbps, while asynchronous (start/stop) connections are limited to 500 Kbps.

A block diagram of one of the SWAN Controllers 76a–76d is shown in FIG. 42, In the transmit direction, SWAN Controller 76 includes a transmit FIFO 302 and transmit framing logic 304. In the receive direction, SWAN Controller 76 includes receive framing logic 306 and a receive FIFO 308. SWAN Controller further includes modem control logic 310, clock recovery and generation circuit 312 and configuration and status registers block 314. Each Serial WAN (SWAN) Controller supports one full duplex communications link with one of the following data link (layer 2) protocols.

4.7.1 Data Link Protocols

High Level Data Link Control (HDLC) links at data rates up to 52 Mbps (STS-1) are supported. HDLC framing conforms to ITU Q.921. Transmission of shared leading and trailing flags is a programmable option. Data transmission may also be paced with insertion of 0–131,072 idle characters between frames. The idle character is programmable, Either CRC-CCITT (16-bit), CRC-32 (32-bit) or no cyclic redundancy check generation/checking is selectable for bit or burst error detection.

Point to Point (PPP) Protocol packet encapsulation conforms to Internet Engineering Task Force (IETF) RFC 1549. PPP is a byte oriented synchronous protocol similar to HDLC. Frames are delimited with flag characters (7E). Control characters embedded in the PPP frames are delimited by a Control Escape (7D). This character transparency mode is supported on transmit and receive. Invalid frames are discarded when received.

Bisynchronous communication framing conforms to International Standards Organization specifications 2111 and 1745. Sync and idle values are programmable. 16-bit Cyclic Redundancy Check (CRC-16) generation and checking are optional.

Asynchronous communications is supported with the Start-Stop protocol. 7-bit or 8-bit characters with odd, even or no parity bits are selectable. Transmission of 1 or 2 stop bits is programmable.

4.7.2 Clock Generation and Recovery

The transmit and receive sections of each SWAN controller are independently clocked. Transmit and receive clocks are typically generated by external PHY devices and are inputs to the RAP chip. Alternately, a Digital Phase lock Loop (DPLL) internal to the SWAN in clock recovery and generation circuit 312 recovers clock from the receive data for non-clocked synchronous interfaces. Transmission of a preamble prior to start of frame is programmable.

Each SWAN includes a Baud Rate Generator (BRG) in circuit 312 for generating the sampling clock for the DPLL and Start/Stop receiver. The BRG also generates the transmit clock for asynchronous mode or when selected in synchronous mode.

4.7.3 Line Interface

The Line Interface in circuits 310 and 312 supports the following functions: data loopback; NRZ, NRZI, FM0 and FM1 line coding; 5 modem signals (DTR, DSR, RTS, CTS and DCD); and independent transmit and receive clock inputs and transmit clock output.

4.7.4 Swan Register Descriptions

The SWAN Memory Map 320 is shown in FIG. 43, and includes several registers. SWAN Configuration Register 320a is shown in FIGS. 44a and 44b, SWAN Baud Rate Generator Register 320b is shown in FIGS. 45a and 45b, SWAN Reset/Halt Register 320c is shown in FIGS. 46a and 46b, SWAN Status Register 320d (bits 15–0) is shown in FIGS. 47a–47c, SWAN Status Register 320d (bits 31–16) is shown in FIGS. 48a and 48b, SWAN Sync Character Register 320e is shown in FIGS. 49a and 49b, SWAN Idle Character Register 320f is shown in FIGS. 50a and 50b, SWAN Interval Timer Register 320g is shown in FIGS. 51a and 51b, SWAN Idle Count Register 320h is shown in FIGS. 52a and 52b, SWAN Channel Configuration Register 320i is shown in FIGS. 53a–53c, SWAN Channel Pacing Register 320j is shown in FIGS. 54a and 54b, SWAN Rate Indication Register 320k is shown in FIGS. 55a and 55b, and SWAN FIFO Threshold Register 320l is shown in FIGS. 56a and 56b.

4.7.5 Automatic Baud Rate Detection (ABRD):

This section describes the logical components associated with Automatic Baud Rate Detection (ABRD) for use with a SWAN or UART core.

A Zero Value Measurement is shown in FIG. 57. FIGS. 58 and 59 illustrate a block diagram of the zero bit measurement logic and an automatic baud rate detection state machine, respectively. The Baud Rate can be determined on an input serial data stream 332 by measuring the time duration 330 that the line is low during exactly one bit time. This measurement is valid for Asynchronous, NRZ, and NRZI encoded data streams. For FM0 or FM1 encoded data streams, the measurement must be multiplied by 2.

A Sample counter starts counting up from zero (at the SysClk rate) at the falling edge of the input stream. The counter is halted when the rising edge of the input stream is detected. At this point, the value of the counter is a Sample measurement of the line's zero time. The Sample measurement is then compared against an accumulated Min_Sample value. If the value of Sample is found to be less than Min_Sample, then Min_Sample is replaced by Sample. Since the input stream can frequently be zero for several consecutive bit times, Min_Sample is accumulated over a period of time. After this period of time, the input data stream is guaranteed to have been low during exactly one bit time.

The Baud Rate is calculated as: Baud Rate=1/(Min_Sample Value*Clock Cycle Time). For example, if Min_Sample was 66,666 and SysClk was 80 MHz: 1/(66,666*12.5 nsec)=1200 Baud. Sample is also compared against a Constant integer value, which acts as an RxData noise filter. Constant is set to a value smaller than the maximum allowable Baud Rate. After a reset, Min_Sample is loaded by the first valid Sample measurement. If the input stream is zero for many consecutive bit times, the Sample counter will overflow, generating a carry out. When this occurs, a compare against Min_Sample is not made.

The Min_Sample value can be read by the RISC CPU 90. When the Min_Sample value is shifted left by 4 bits (multiplied by 16), it can then be used as the value written to the SWAN Baud Rate Count Register.

4.8 Time Slot Multiplexer & WAN Port Configuration

FIG. 61 is a block diagram which illustrates WAN port configurability. Two Time Slot Multiplexers (TSMs) 340 and 342 provide TDM highways for ISDN BRI, channelized T1/E1and other TDM applications. The four SWAN controllers 76a–76d and two Serial Peripheral Interfaces (SPI) 80 connect to both TSMs. Serial Channel to time slot mapping is programmed in the Switch Table RAM associated with each TSM. Alternately, SPI #1 may be mapped to external signal pins as a general purpose serial port.

Each SWAN controller may be directly mapped out to external signal pins, bypassing the TSMs. SWAN controller 3 (76b) is multiplexed over the V.34 Codec Interface 72 and SWAN controller 4 is multiplexed over the General Purpose I/O interface 340.

WAN Port configuration is programmable in the WAN Port Conf iguration Register, which is shown in FIG. 62. SPI1SEL[1:0] (SPI 1 Port Select bits 11-10) select which WAN Port SPI #1 is connected to as defined in FIG. 63a. SPI2SEL[1:0] (SPI 2 Port Select bits 9-8) select which WAN Port SPI #2 is connected to as defined in FIG. 63b. SWANnSEL[1:01] (SWAN Port Selects bits 7–0) select which WAN Port each SWAN is connected to as defined in FIG. 63c.

4.8.1 Switch Table RAM Definition

FIG. 64 defines the transmit and receive switch table RAMs. the switch table RAMs have the following bits:

CHEN Channel Enable bit 15
  Channel Enable, when asserted, enables the channel designated by CH#[4:0] onto the transmit TDM bus for the time slot duration specified by CNT[7:0]. When CHEN is clear, no channel is enabled on the transmit TDM bus. The value of CHEN is available on core output signal CHN_EN for use in tristate control of the Transmit TDM interface pin. For receive, the CHEN pin acts as an enable to the decode of channel selects.

XTR Switch Transmit & Receive bit 14
  When asserted, XTR switches the transmit and receive TDM interfaces. This can be used for data loopback and other inrtrachip communications. The transmit and receive clocks must be locked together when this mode is enabled.

STRB Strobe bit 13
  STRB is programmed to generate an external waveform used for interfacing to external layer 1 devices.

CH#[2:0] Channel Number bits 12-8
  CH#[2:0] identifies the physical channel assigned to the time slot.

CNT[7:0] Time Slot Duration bits 7–0
  CNT[7:0] specifies the duration of the time slot in bits. CNT[7:0]=0x00 corresponds to time slot length of 1 bit and CNT[7:0]=0XFF corresponds to length of 256 bits.

FIG. 65 provides a definition of the TSM Configuration Register, which has the following bits:

TSME Time Slot Mux Enable bit 8
  TSME, when asserted, enables the switch table RAM counters to index through the time slots when Frame Sync is received. When clear, Frame Sync is ignored and the counters are held in a reset state.

1CLK Common Tx/Rx Clocks bit 7
  When set, 1CLK specifies both the receive and transmit TDM highways are synchronized to the receive clock and framing signals.

2XCLK 2X Clock Rate bit 6
  2XCLK is set to indicate the transmit and receive clock rate is twice the data rate. When clear the clock inputs are the same frequency as the data rate.

CLKP Clock Polarity bit 5
  When CLKP is clear, data is transmitted on the rising edge of the transmit clock and receive data is sampled on the falling edge of the receive clock. Vice versa when CLKP is set.

FSP Frame Sync Polarity bit 4
  The transmit and receive frame sync pulses are sampled on the respective transmit and receive clock edge as specified by FSP. If FSP=0, sampling is on the falling edge. If FSP=1, sampling is on the rising edge.

RFSD[1:0] Receive Frame Sync Delay bits 3-2
  RFSD[1:0] specifies the delay from the frame sync pulse to the start of the receive frame. RFSD bit encoding is summarized in FIG. 66.

TFSD[1:0] Transmit Frame Sync Delay bits 1-0
  TFSD[1:0] specifies the delay from the frame sync pulse to the start of the transmit frame. TFSD bit encoding is summarized in FIG. 67.

4.9 PCI Interface 38

RAP Chip 34 supports 33 Mhz, 32-bit PCI master and slave transactions. The PCI Interface 38 is synchronized to the PCI clock, which is asynchronous to the RAP's system clock. The PCI Interface generates PCI master transactions when the RAP CPU 90 accesses PCI memory space or when the PCI DMA 112 is active. PCI Slave transactions are supported to RAP's Mailbox FIFO and to external memory residing on the ILocal Memory Bus 160 (FIG. 5).

Independent master (initiator) and slave (target) state machines and FIFOs allow concurrent (although interleaved) transactions on the PCI bus 150 (FIG. 5). Master and slave FIFO size and control strategy optimizes PCI utilization. The recommended PCI system architecture is based on the Producer—Consumer model. The PCI Interface is designed for write-optimized systems such as the Intelligent I/O architecture. A high performance interface allows the PCI host (e.g. host 152) to burst transmit packets to memory (slave write). An internal DMA 112 can be programmed to burst data between the PCI bus and external memory using master transactions.

PCI Interface configuration is set in the registers accessible in PCI configuration space. These registers are not visible to the RAP CPU 90. In addition to the PCI Configuration Registers, two other registers control PCI Interface operation. Maximum burst size on the PCI Bus and Secondary Bus is set by the CPU in the PCI_Ctrl register. PCI burst size will be limited to the maximum allowed by the PCI_Ctrl register or PCI latency timer. The XPCI_Ctrl register is accessible both in PCI memory space and by the CPU 90. The XPCI_Ctrl register allows the PCI host 152 to control the RAP boot process and PCI interrupts.

4.9.1 PCI Configuration Space Registers

The RAP Chip supports type 0 Configuration Space access. PCI Configuration space registers are shown in FIG. 68. Configuration Space writes to unused registers are completed normally, although data is ignored. Configuration Space reads of unused registers are completed normally with all data bits 0. The configuration space registers are documented in the PCI bus little endian format (least significant byte is byte 0).

The following sections describe the configuration space control and status registers. Registers initialize to the default values identified when PCI_RSTn is asserted. PCI Control bits not used by the RAP are shaded. FIGS. 69a and 69b illustrate the Vendor ID Register (Configuration Space 0x01–0x00). FIGS. 70a and 70b illustrate the Device ID Register (Configuration Space 0x03–0x02). FIGS. 71a–71c illustrate the Command Register (Configuration Space 0x05–0x04). FIGS. 72a and 72b illustrate the Status Register (Configuration Space 0x07–0x06). The R/W bits of the Status Register behave as follows. A status register is cleared by writing a 1 to the corresponding bit position. Writing a 0 will cause the bit position to remain unchanged.

FIGS. 73a and 73b illustrate the Revision ID Register (Configuration Space 0x08). FIGS. 74a and 74b illustrate the Class Code (Configuration Space 0x0B–0x09). FIGS. 75a and 75b illustrate the Cache Line Size Register (Configuration Space 0x0C). FIGS. 76a and 76b illustrate the Latency Timer Register (Configuration Space 0x0D). FIGS. 77a and 77b illustrate the Header Type (Configuration Space 0x0E). FIGS. 78a and 78b illustrate the Base Address Register 1 (Conf iguration Space 0x10). FIGS. 79a and 79b illustrate the Base Address Register 2 (Configuration Space 0x14). FIGS. 80a and 80b illustrate the Base Address Register 3 (Configuration Space 0x18). FIGS. 81a and 81b illustrate the Interrupt Line Register (Configuration Space 0x3C) FIGS. 82a and 82b illustrate the Interrupt Pin Register (Configuration Space 0x3D). FIGS. 83a and 83b illustrate the Maximum Latency Register (Configuration Space 0x3E). FIGS. 84a and 84b illustrate the Minimum Grant Register (Configuration Space 0x3F). FIGS. 85a and 85b illustrate the Local_to_PCI Address Register (Configuration Space 0x84).

4.9.2 I2O Control Registers

Three registers control I2O Interface operation. The I2O_BA register (0x0500), shown in FIGS. 86a and 86b, determines the base address for the I2O shared memory. The I2O_LEN register (0x0504), shown in FIGS. 87a and 87b, determines the length of (size of) the I2O shared memory. The I2O_B_DIF register (0x0508), shown in FIGS. 88a and 88b, determines the difference between the system base address and the local base address for the I2O shared memory.

4.9.3 Port Control Registers

Two registers control PCI Interface operation. The PCI_Ctrl register (Configuration Space 0x0040) limits burst size on the PCI Bus and Local Memory Bus, and is shown in FIGS. 89a–89c. The XPCI_Ctrl register (Configuration Space 0x44), shown in FIGS. 90a and 90b, provides PCI host control of PCI interrupts and the RAP boot process.

For most applications, RAP 34 is connected to PCI systems that may have high latency. The PCI DMA Controller 112 (FIG. 3) optimizes performance by allowing long bursts. PCI burst length may need to be fine tuned with Local Memory Bus burst length to achieve optimum system performance. The PCI Interface 114 and Local Memory controller 110 integrate maximum burst timers which are controlled by the PCI_Ctrl register. The Primary Port maximum burst size timer works independently from the PCI latency timer. The main purpose of these maximum burst size counters is to break up long packet transfers so the comm DMA channels do not stall.

4.9.4 PCI and RAP CPU Interrupt Control Registers

Two registers report PCI and RAP CPU interrupt operation. The PCI_Int register (Configuration Space 0x48), shown in FIGS. 91a and 91b, collects interrupts going to the PCI bus. The RAP_Int register (Configuration Space 0x4A), shown in FIGS. 92a and 92b, collects interrupts going to the PCI bus 150. The registers provide a single point for the PCI master or RAP CPU 90 to query to determine the source of the interrupt. Interrupts must be cleared at their source.

4.9.5 PCI Slave Transactions

The PCI Interface 114 (FIG. 3) implements two base address registers to support access to the Mailbox or local memory. PCI slave transfers to the Mailbox FIFO and XPCI_Control register are defined by Base Address Register 1. The memory map for this address range is contained in a Table shown in FIG. 93. Base Address Register 2 maps the RAP's local memory into PCI Memory Space. The memory map has several registers, including a Mailbox Tx Register (0x0600) shown in FIGS. 94a and 94b, a Mailbox Rx Register (0x0604) shown in FIGS. 95a and 95b, a Mailbox Size Register (0x0608) shown in FIGS. 96a and 96b, and a Mailbox Threshold Register (0x0609) shown in FIGS. 97a and 97b.

4.9.6 Mailbox FIFO

The mailbox consists of two 32-bit wide by 256 word deep FIFOs designed to speed-up communication between the RAP CPU 90 and external PCI bus master. One FIFO is used for CPU 90 to PCI host messaging (Tx FIFO), the other for PCI host to CPU messaging (Rx FIFO). From the CPU side, it is seen as a memory mapped hardware register CPU_MailBox and from the external PCI bus master it is mapped at address 0Xpppp 0600.

The PCI master may access the Mailbox by a word read at address 0X0600 and a word write to location 0X0604. All PCI slave reads of the transmit mailbox must be single word transfers. Burst transfers are supported on PCI slave writes to the receive FIFO. The RAP CPU 90 writes the transmit mailbox at memory 0Xb800 0600 and reads the receive mailbox at memory address 0Xb800 0604. RAP CPU 90 writes to the receive mailbox and reads from the transmit mailbox are not supported.

The mailbox register is shown in FIG. 98. The signal MbxTxEmpty is used to generate the PCI_INTn signal. The PCI_INTn is asserted ashen enabled in the Primary Port Control Register and the transmit mailbox is not empty. An external controller is expected to isolate the mailbox register from events that cause overflow of the Fifo. If an external bus master on the PCI bus reads an empty Transmit FIFO 350, value 0 is returned. If the PCI master attempts to write to a full Receive FIFO 352, the written data is dropped and a non-vectored interrupt is asserted to the CPU. The external master is expected to prevent overflow of the mailbox register. If the Rx FIFO 352 overflows, the interrupt MxRxOVRFL is sent to the CPU 90. The CPU 90 sends a message to the PCI master indicating that the FIFO overflowed. The Mailbox status signals are visible to the PCI bus master in the PCI_Control register. If the CPU 90 reads an empty Receive FIFO 352, value 0 is returned. If the CPU 90 attempts to write into a full Transmit FIFO 350, the CPU is stalled until the FIFO becomes non-empty and the interrupt MbxTxOVRFL is generated. The signals MbxRxFull, MbxRxTHLD and MbxRxEmpty generate a vectored interrupt to the CPU 90.

4.9.7 PCI/Local Memory Bridge and DMA 112

When transferring data between the PCI 114 and Local Memory, the RAP 34 utilizes the PCI Interface's DMA controller 112 (FIG. 3). The PCI DMA 112 is a bidirectional linked list DMA controller which transfers data between the PCI Master Read/Write FIFOs and the Local Memory Interface 66. Software executed by CPU 90 sets up a list of BMDs (Buffer Memory Descriptors) in local memory. The BMDs point to buffers in local memory where the data will be read from or written to. The DMA engine has a PCI address register where the data will be written to or read from. The data is stored in one continuous address range on the PCI side and is scattered in the RAP local memory space.

A PCI master can also directly access the RAPs local memory. Byte, word, and burst transfers are allowed. Since the PCI is little endian and the RAP is big endian format, data bytes may need to be swapped by software.

As discussed above, a Linked BMD List is a set of link accessed BMDs. A Linked BMD List for DMA controller 112 is located in Buffer Memory (Local Memory) and each BMD is aligned on a 16 byte boundary. An example of a BMD pointer and Linked BMD List structure is shown in FIG. 99. The BMD Pointer points 360 to the first BMD 362 in the linked list. The Next BMD Pointer 364 points to the next BMD 366 in the linked list. When the DMA 112 reaches the end of a BMD List, the Next BMD Pointer 368 of the last BMD 370 is equal to zero.

When the DMA 112 removes one or more BMDs from the linked list, it sets its current BMD Pointer 360 (in the DMA) equal to the Next BMD Pointer of the current BMD:

BMD Pointer←Next BMD Pntr

When the RAP CPU 90 adds one or more BMDs to the end of the linked list, it set the Next BMD Pointer 368 of the last BMD 370 equal to the Buffer Memory address of the first BMD that's being added:

Next BMD Pntr←Address of BMD

The host microprocessor can also add one or more BMDs to the middle of a linked List by modifying the Next BMD Pointer of the BMD to insert the link thereafter. It must also modify the Next BMD Pointer of the last added BMD to complete the link operation.

The Buffer Memory Descriptor (BMD), shown in FIG. 100, is 16 bytes long and resides in Buffer Memory, aligned on an 16 byte boundary. Word 0, bits 0–3 and 8–12, are the BMD Flags. These flags are not used in the PCI DMA engine. They may be used in the n-channel DMA controller. Word 0, bits 4–7 and 13–31 are not used and may be reserved for future use. Word 1, bits 16–31, is the Byte Count field for this data buffer and specifies the number of bytes that are to be transferred to or from this data buffer. Word 1, bits 0–15 are not used. Word 2, bits 0–31 contains the Buffer Memory Address of this data buffer. The data buffer can start on any address byte boundary. Word 3, bits 0–31 contains a Next BMD Pointer. This is the Buffer Memory address of the next BMD in the linked list. Since a BMD must start on a 16 byte address boundary, bits 0–3 of the Next BMD Pointer are expected to be zero. The end of the linked BMD list is reached when the Next BMD Pointer is zero.

The DMA operation is started by writing to the PCI address register, the BMD pointer register and then the DMA control register. The DMA 112 engine will copy the BMD into internal DMA registers and then start transferring data. The transfer will stop on a bus error or when a BMD has used all of its byte count and the next BMD pointer is 0.

4.9.8 DMA Registers

The PCI DMA Control Register is shown in FIGS. 101*a* and 101*b*. The PCI DMA Interrupt Register is shown in FIGS. 102*a* and 102*b*. The PCI DMA PCI Address Register is shown in. FIGS. 103*a* and 103*b*. The PCI DMA BMD Pointer Register is shown in FIGS. 104*a* and 104*b*.

4.9.9 RAP Arbitrator Logic

The RAP PCI arbiter can support up to two external PCI masters (w/PCI_REQ/GNT[1:0]). The RAP34 determines whether it is the arbiter by the state of bit 6 (En_Arb) in the XPCI_Ctrl register (Config. Register @0x44). The register bit is set at reset by the state of TBD pin.

4.10 RAP Reset and Boot Sequence

PCI_RSTn holds the CPU_Reset active and the entire RAP in cold reset. CPU_Reset is initialized based on the state of the SYS_Boot pin when PCI_RSTn is deasserted. If SYS_Boot is a logic '0', CPU_Reset is cleared and both CPU 90 and all RAP modules are enabled. CPU 90 will initiate the boot sequence from EPROM. The boot sequence starts when PCI_RSTn is deasserted, not requiring PCI host initiation. If SYS_Boot is a logic '1', CPU_Reset is held active (which holds the 4011 core in cold reset) but the RAP modules are enabled. This allows the PCI host to initialize (RAP) local memory, selected RAP modules and to control the start of the boot sequence. When CPU_Reset is cleared (under PCI host control), CPU 90 will initiate the boot sequence.

4.11 General Purpose I/O 116

The General Purpose I/O port provides 12 signals that are programmable as inputs or outputs. The outputs are directly mapped to the CPU register space and are useful as control signals to external devices, modem control signals, or LED drivers. As inputs, the General Purpose I/O pins may be used as CPU vectored interrupts.

4.12 Timers 100

The RAP provides four 32-bit general purpose timers. Each timer decrements at each clock event. An input clock event is programmed for each timer using its configuration register Following timer initialization, the timer is loaded with the value contained in its initialization register. It is then decremented when each clock event occurs. The clock event can be the RAP system clock, an external clock or another timer time-out event. The timer decrements until it reaches 0. It then continues decrementing or halts depending upon the setting of the tm_periodic bit in the timer configuration register. Once stopped, the timer can be restarted by setting the tm_enable bit of the timer configuration register high. In addition, the tm_stop bit will stop the timer and the tm_reset will reset the timer value.

The timer count, its initialization register and its configuration register are all accessible by CPU 90. These registers are illustrated in FIG. 105.

4.13 UART 104

A 16550 compatible UART 104 (FIG. 3) is provided to facilitate general purpose monitoring and debug functions.

III. CONCLUSION

The remote access processor of the present invention can be manufactured as a low cost, high performance standard product that enables edge routers or similar edge devices for small office/home office, branch office and mobile office remote access applications. The remote access processor provides connectivity from a stand alone PC or several PCs on a local area network to a wide area network. In other embodiments, the remote access processor can be used on a remote access server at corporate headquarter site or at an internet service provider's server location. The remote access processor of the present invention supports diverse remote access technologies on a single integrated semiconductor circuit. Although the particular configurations discussed above support Ethernet, ISDN-BRI, V.34 and Frame Relay interfaces, the remote access processor of the present invention can also be configured to support ADSL, ISDN-PRI, T1/E1, T3/E3, wireless, cable modem and ATM interfaces, for example. This provides low cost connectivity with high overall performance due to low power consumption, high speed and small size. Such a structure has a high reliability since it can be manufactured with proven chip design and fabrication methodologies.

The remote access processor of the present invention provides a robust programmable platform which enables users to install a variety of network layer protocols and internet/intrainet applications. The remote access processor platform can support popular real time operating systems such as pSOS, VxWORKS, JavaOS, and LYNX and signaling software such as Q.931 and Java Virtual Machine. In addition, these applications are supported on the samne processor as the V.34 digital signal processing software. In an alternative embodiment, the remote access processor can be integrated at the board level by assembling components from different vendors.

Although the present invention has been described with reference to preferred embodiments, workers skilled in the art will recognize that changes may be made in form and detail without departing from the spirit and scope of the invention.

What is claimed is:

1. A single chip remote access processor for receiving and transmitting data packets having headers with destination addresses, the processor comprising:
   a plurality of communication interface units adapted to transmit and receive the data packets and comprising a local area network (LAN) interface unit, a first multi-protocol serial wide area network (SWAN) interface unit, a telephony coder-decoder interface unit and a peripheral component interface (PCI) unit;
   a multi-channel direct memory access (DMA) controller which is coupled to the plurality of communication interface units and comprises a plurality of channels and a contents addressable memory (CAM), wherein each channel comprises a transmit queue and a receive queue and wherein the CAM comprises a contents compare input coupled to the receive queues so as to receive the destination address of each received data packet and comprises a compare output that identifies which of a plurality of receive linked lists each data packet received by the receive queues is to be appended based on a comparison of the respective destination address;
   a central processing unit (CPU) is adapted to maintain a transmit linked list of transmit buffer memory descriptors (BMDs) for each channel of the DMA controller and to maintain the plurality of receive linked lists of receive BMDS, wherein each transmit BMD corresponds to a data packet to be transmitted through the respective channel and wherein each receive BMD corresponds to a data packet received through one of the channels.

2. The single chip remote access processor of claim 1 and further comprising:
   an internal transfer bus which is coupled to the DMA controller, the CPU and the PCI interface unit;
   a memory coupled to the DMA controller and the CPU.

3. The single chip remote access processor of claim 2 and further comprising:
   a local memory interface;
   a local memory controller coupled between the internal transfer bus and the local memory interface; and
   a bridge circuit coupled between the PCI interface unit and the local memory controller.

4. The single chip remote access processor of claim 3 wherein the bridge circuit comprises a bridge DMA controller.

5. The single chip remote access processor of claim 2 wherein:
   the plurality of communication interface units further comprises second, third and fourth multi-protocol SWAN interface units; and
   the plurality of channels of the DMA controller comprises a first channel coupled to the LAN interface unit, a second channel coupled to the multi-protocol SWAN interface unit, a third channel coupled to the telephony coder-decoder interface unit, a fourth channel coupled to the second multi-protocol SWAN interface unit, a fifth channel coupled to the third multi-protocol SWAN interface unit and a sixth channel coupled to the fourth multi-protocol SWAN interface unit.

6. The single chip remote access processor of claim 5 and further comprising:
   a time division multiplexer interface port; and
   a time division multiplexer coupled between the time division multiplexer interface port and the first, second, third and fourth multi-protocol SWAN interface units.

7. The single chip remote access processor of claim 6 and further comprising a multi-protocol SWAN interface port coupled to the first multi-protocol SWAN interface unit.

8. The single chip remote access processor of claim 1 wherein:
   the DMA controller comprises means for maintaining a transmit BMD pointer for each transmit linked list, which points to the first BMD of the corresponding transmit linked list; and
   the DMA controller comprises means for maintaining a receive BMD pointer for each receive linked list, which points to the first BMD of the corresponding receive linked list.

9. The single chip remote access processor of claim 1 wherein:
   the CPU comprises means for appending individual ones of the BMDs in the receive linked lists to at least one of the transmit linked lists.

10. The single chip remote access processor of claim 1 and further comprising:
    means for receiving an incoming data packet at one of the communication interface units; and
    wherein the CPU comprises means for modulating the data packet for transmission through the telephony coder-decoder interface unit and routing the modulated data packet to the telephony coder-decoder interface unit.

11. The single chip remote access processor of claim 10 wherein:
    the telephony coder-decoder interface unit comprises a serial interface for receiving modulated digital samples; and
    the CPU comprises means for demodulating the digital samples, translating the digital samples into data packets, and routing the data packets to a selected one of the communication interface units.

12. The single chip remote access processor of claim 1 wherein the telephony coder-decoder interface unit comprises a V.34 Codec interface unit.

13. The single chip remote access processor of claim 1 wherein the LAN interface unit comprises an Ethernet controller.

14. A remote access processor comprising:
    an internal transfer bus;
    a plurality of communication interface units comprising a local area network (LAN) interface unit, a first multiprotocol serial wide area network (SWAN) interface unit, a telephony coder-decoder interface unit and a peripheral component interface (PCI) unit, wherein the telephony coder-decoder interface unit comprises a serial interface for receiving modulated digital samples;

a multi-channel direct memory access (DMA) controller coupled to the internal transfer bus and having a first channel coupled to the LAN interface unit, a second channel coupled to the multi-protocol SWAN interface unit and a third channel coupled to the telephony coder-decoder interface unit;

a central processing unit (CPU) coupled to the internal transfer bus which is adapted to receive a first data packet through the first or second channel of the DMA controller, modulate the first data packet for transmission through the telephony coder-decoder interface unit and route the modulated first data packet to the telephony coder-decoder interface unit, through the third channel of the DMA controller and is adapted to receive the modulated digital samples from the telephony coder-decoder through the third channel of the DMA controller, demodulate the digital samples, translate the demodulated digital samples into a second data packet, and route the second data packet to the LAN interface unit or the multi-protocol SWAN interface unit, through the first and second channels, respectively, of the DMA controller;

a memory coupled to the DMA controller and the CPU; and wherein the PCI interface unit is coupled to the internal transfer bus.

15. A method of routing a data packet in a circuit comprising a plurality of communication interfaces and a direct memory access (DMA) controller having multiple channels, comprising:

coupling the plurality of communication interfaces to corresponding channels of the DMA controller;

receiving the data packet at a first of the plurality of communication interfaces;

passing the data packet to the DMA channel that is coupled to the first communication interface;

storing the data packet in a buffer memory;

maintaining a plurality of receive linked buffer memory description (BMD) lists;

maintaining a transmit linked BMD list for each channel of the DMA controller;

determining a destination of the data packet;

appending a buffer memory descriptor (BMD), which corresponds to the data packet, to at least one of the receive linked BMD lists, as a function of the destination;

appending the BMD to the transmit linked BMD list of a second channel of the DMA controller as a function of the destination;

passing the data packet from the buffer memory to the second channel; and transmitting the data packet from the second channel to the communication interface that is coupled to the second channel.

16. The method of claim 15 wherein the step of maintaining a plurality of receive linked BMD lists comprises maintaining a plurality of receive linked BMD lists for each channel of the DMA controller.

17. The method of claim 16 wherein the step of maintaining a plurality of receive linked BMD lists comprises maintaining two receive linked BMD lists for each channel of the DMA controller.

18. The single chip remote access processor of claim 1 wherein the CPU comprises means for maintaining a plurality of receive linked BMD lists for each channel of the DMA controller.

* * * * *